(12) United States Patent
Tonnison et al.

(10) Patent No.: US 10,296,920 B2
(45) Date of Patent: May 21, 2019

(54) ONLINE E-COMMERCE AND NETWORKING SYSTEM/GENERATING USER REQUESTED SPONSOR ADVERTISEMENTS TO CENTRALIZE SILOED AND DISTRIBUTED USER DATA IN THE INTERNET AND BUSINESS SYSTEMS

(76) Inventors: Wenxuan Tonnison, Oneida, NY (US); James Ian Tonnison, Oneida, NY (US)

( * ) Notice: Subject to any disclaimer, the term of this patent is extended or adjusted under 35 U.S.C. 154(b) by 1828 days.

(21) Appl. No.: 12/154,241

(22) Filed: May 21, 2008

(65) Prior Publication Data

US 2009/0292595 A1 Nov. 26, 2009

(51) Int. Cl.
*G06Q 40/00* (2012.01)
*G06Q 30/02* (2012.01)
*G06Q 50/00* (2012.01)
*G06Q 50/18* (2012.01)

(52) U.S. Cl.
CPC ......... *G06Q 30/02* (2013.01); *G06Q 30/0207* (2013.01); *G06Q 30/0215* (2013.01); *G06Q 30/0279* (2013.01); *G06Q 50/01* (2013.01); *G06Q 50/188* (2013.01)

(58) Field of Classification Search
USPC ......................................................... 705/14
See application file for complete search history.

(56) References Cited

U.S. PATENT DOCUMENTS

| | | | |
|---|---|---|---|
| 2,007,010 A * | 7/1935 | Thearle | G01H 9/00 356/154 |
| 6,486,891 B1 | 11/2002 | Rice | |
| 6,757,661 B1 | 6/2004 | Blaser et al. | |

(Continued)

OTHER PUBLICATIONS

Education, heterogeneity, and productive efficiency in Peru's informal sector Tueros Arias, Mario Fernando. Stanford University, ProQuest, UMI Dissertations Publishing, 1993. 9317804.*
Two-timers tell all Goff, Lisa. Home Office Computing 16.3 (Mar 1998): 54-58.*
To boldly go where no consumer marketer has gone before Egolf, Karen. Advertising Age's Business Marketing 82.4 (May 1997): 14.*

(Continued)

*Primary Examiner* — Hani M Kazimi
*Assistant Examiner* — Hatem M Ali
(74) *Attorney, Agent, or Firm* — Bond Schoeneck & King, PLLC; Frederick Price; George R. McGuire

(57) ABSTRACT

A new generation online e-commerce and networking system is disclosed. According to the embodiments of the present invention, the system is based at least on: 1) a new digital model of meeting individuals' work and life needs and integrating entities' processes to create large online networks that centralize individuals' siloed and distributed data in the Internet and business systems; and 2) a disruptive and innovative advertising model of associating online advertisements with goods services, activities, and incentives that meet users' needs to allow users to solicit or request sponsorships so as to significantly improve online advertising response rates, increase membership reach rates of websites, and at the same time, act as a digital nerve or blood system to seamlessly connect Internet web applications and business systems. These are revolutionary technologies to disrupt the traditional isolated access to distributed websites on the Internet and traditional static online advertising technologies, to create a favorable digital infrastructure environment or user-data-interconnected Internet fabric for the rapid acceleration of the next generation Internet.

18 Claims, 41 Drawing Sheets

(56) References Cited

U.S. PATENT DOCUMENTS

| | | |
|---|---|---|
| 6,898,598 B2 | 5/2005 | Himmel et al. |
| 6,928,615 B1 | 8/2005 | Haitsuka et al. |
| 7,181,415 B2 | 2/2007 | Blaser et al. |
| 7,191,147 B2 | 3/2007 | Heene et al. |
| 7,225,142 B1 | 5/2007 | Apte et al. |
| 7,363,300 B2 | 4/2008 | Davis et al. |
| 2001/0025254 A1 | 9/2001 | Park |
| 2002/0073034 A1 | 6/2002 | Wagner et al. |
| 2003/0120607 A1 | 6/2003 | Piotrowski |
| 2003/0220835 A1* | 11/2003 | Barnes, Jr. ......... G06Q 10/1053 705/14.36 |
| 2005/0033668 A1 | 2/2005 | Garcia et al. |
| 2005/0065806 A1 | 3/2005 | Harik |
| 2005/0197164 A1 | 9/2005 | Chan |
| 2006/0122879 A1 | 6/2006 | O'Kelley |
| 2007/0078718 A1* | 4/2007 | Gorodyansky ........ G06Q 30/02 705/14.67 |
| 2007/0100801 A1 | 5/2007 | Celik et al. |
| 2007/0100867 A1 | 5/2007 | Celik et al. |
| 2007/0112630 A1* | 5/2007 | Lau ..................... G06K 9/72 705/14.1 |
| 2007/0192784 A1* | 8/2007 | Postrel ................. G06Q 20/10 725/23 |
| 2007/0233566 A1 | 10/2007 | Zlotin et al. |
| 2008/0015935 A1 | 1/2008 | Ford |
| 2008/0077595 A1 | 3/2008 | Leebow |
| 2008/0082416 A1 | 4/2008 | Kotas et al. |
| 2008/0097844 A1* | 4/2008 | Hsu ...................... G06Q 10/087 705/14.3 |
| 2008/0103894 A1 | 5/2008 | Liang et al. |
| 2008/0103896 A1* | 5/2008 | Flake .................... G06Q 30/02 705/14.43 |
| 2008/0126476 A1* | 5/2008 | Nicholas ............... G06Q 10/10 709/203 |
| 2008/0201225 A1* | 8/2008 | Maharajh .......... G06F 17/30035 705/14.43 |
| 2009/0063983 A1* | 3/2009 | Amidon et al. ............. 715/733 |

OTHER PUBLICATIONS

Sciulli, Lisa M; Taiani, Vincent, Advertising content for the global audience: A research proposal. Competitiveness Review; Bingley vol. 11, Iss. 2, (2001): 3 (Year: 2001).*

Kalra, Ajay; Goodstein, Ronald C.The impact of advertising positioning strategies on consumer price sensitivity.JMR, Journal of Marketing Research; Chicago Vol. 35, Iss. 2, (May 1998): 210-224 (Year: 1998).*

Meirick, Patrick. Cognitive responses to negative and comparitive political advertisingJournal of Advertising; Abingdon Vol. 31, Iss.1, (Spring 2002): 49-59. (Year: 2002).* http://www.google.com/intl/en/ads/, "Google Advertising Programs", 1 page, printed from the Internet on May 19, 2008.

http://www.facebook.com/home.php?, "Facebook User Home Page", 1 page, printed from the Internet on May 19, 2008.

http://www.myspace.com/, "Myspace Home page", 2 pages, printed from the Internet on May 19, 2008.

* cited by examiner

FIG. 2

*HotTerrain*   A Place for your needs!
Free to join to earn free HT money and get sponsorship for your needs

| Buy | Sell | My HT | Community | Help |

Search: _200_

All Categories [ ▼ ]   [ Go ]   _201_

Advanced Search

| Categories ▼ | Welcome!  _202_ |

- Antiques
- Apparel
- Art
- Baby
- Books
- Business & Industry
- Cameras & Photo
- Cars, Boats, Vehicles & Parts
- Cell Phones, iPhones & PDAs
- Coins & Paper Money
- Collections
- Computers & Networking
- Consumer Electronics
- Crafts
- Dolls & Bears
- DVDs & Movies
- Entertainment
- Gift Certificates
- Health & Beauty
- Home & Garden
- Jewelry & Watches
- Music
- Musical Instruments

*Welcome to HotTerrain – a place for your needs!*   _203_

Individual Logon                Free to register ▼

Email: [          ]                 Full Name: [          ]
Password: [          ]              Your Email: [          ]
☐ Remember me                       Password: [          ]
[ Sign In ]   Forget Password?      [ Register ]

You have read and agreed to the Terms of Use and Privacy Policy

Log-on Links for:   _204_

- Business
- Charity
- Education
- Government
- Organization

_205_

*HotTerrain*   HotTerrain is a web platform system for your life, work and social networking needs.

Use HotTerrain to:
- Earn free HT Money that is convertible to cash and improve your HT Score at the same time
- Get sponsorship for things you want and join exciting virtual events to acquire knowledge and skills
- Use Virtual Mail for free to obtain your free collector e-stamps
- Get your free digital photo and stamp albums and buy the matching physical albums using your HT money
- Share your customized photo, stamp, collection albums, videos, treasure, and other assets
- Connect with friends, relatives, fans, and colleagues.

More

Find your Friends on HotTerrain:

[ Type your friend's name here ]   [ Go ]

FIG. 7

*HotTerrain*                                                                 Home | My Account | Options ▼ | Blog | Privacy | Support

| Check Mail | Compose ▼ |                                                                              Log Out |

Search: [        ] Go

| Home | Inbox View ✕ |

700

| | | Subject | From | Time/Date | Size | Stamps | Stickers |
|---|---|---|---|---|---|---|---|
| ☐ | ✉ | xxxxxx | xxxxx | xxxxx | xxx | New (*) | N/A |
| ☐ | ✉ | xxxxxx | xxxxx | xxxxx | xxx | New | New |
| ☐ | ✉ | xxxxxx | xxxxx | xxxxx | xxx | Already Cut | N/A |
| ☐ | ✉ | xxxxxx | xxxxx | xxxxx | xxx | New | N/A |
| ☐ | ✉ | xxxxxx | xxxxx | xxxxx | xxx | New (*) | New (*) |
| ☐ | ✉ | xxxxxx | xxxxx | xxxxx | xxx | Already Cut | N/A |
| ☐ | ✉ | xxxxxx | xxxxx | xxxxx | xxx | New | N/A |
| ☐ | ✉ | xxxxxx | xxxxx | xxxxx | xxx | Already Cut | N/A |

702

Home
Inbox (5) *701*
Folder View
Envelope View
Draft (3)
Sent (5)
Spam (5)
Trash (3)
Contacts
Calendar
▲ My Folders     Add

| Cut Stamp/Sticker ▼ *703* | Reply ▼ *704* | Forward *705* | Print *706* | Compose *707* | Delete *708* |

Advertisements *709*

HotTerrain © 2008

About HotTerrain | Advertisers | Developers | Businesses | Terms | Privacy | NeatExpense |
NeatClerk | SmartOffice | HotTerrainSoft | Community Standards | Help | Contact Us

FIG. 15

*HotTerrain*   *A place for your needs!*

Home | My Account | Options ▼ | Blog | Privacy | Support

[Log Out]

Search: [_____] [Go]

Services:
- Virtual Mail ▼
- My Assets ▼
  - Stamps ▼
  - Photos ▼
  - Videos ▼
- Treasure ▼
  - Others ▼
- Groups ▼
- My HT Money ▼
- Gifts ▼
- HT Market ▼
- HT Mall ▼
- Sponsors ▼
- Developer ▼
- HotTerrainSoft ▼
- Sister Webs ▶
  - NeatExpense
  - NeatClerk
  - SmartOffice

*1500*

| Home | My Treasure ✕ | Necklaces ✕ | | | | | |
|---|---|---|---|---|---|---|---|
| | Name | Picture | Description | Purchase Price | Market Price | Source | Metal Color |
| | ☐ 20-inch 14K gold + 1 karat diamond pendant necklace | Picture of the diamond gold necklace | Beautifully cut 1 Karat diamond G grade. Guarantee a distinctive look | $599 | $680 | Macy's | Gold |
| | ☐ 18-inch 18K platinum + Emerald genius stone pendant necklace | Picture of the emerald platinum necklace | A smooth, straight, simple line of round Emerald descends along the 18K platinum chain | $3,000 | $9,586 | Kay Jewelry | White |
| | | | Total: | $3,599 | $10,266 | | |

*1501*

[Add to Treasure Box *1502*]   [Buy Treasure and Add to List ▼ *1503*]   [Sell Treasure *1504*]   [Solicit Sponsorship ▼ *1505*]   [Gift to Someone *1506*]

[Donate to Charity *1507*]

HotTerrain © 2008

About HotTerrain | Advertisers | Developers | Businesses | Terms | Privacy | NeatExpense |
NeatClerk | SmartOffice | HotTerrainSoft | Community Standards | Help | Contact Us Advertisements *1508*

FIG. 17

*HotTerrain*  A place for your needs!  — 1700

Home | My Account | Options ▼ | Blog | Privacy | Support

Search: [_____] Go   [Log Out]

Services:
- Virtual Mail ▼
- My Assets ▼
  - Stamps ▼
  - Photos ▼
  - Videos ▼
  - Treasure ▼
  - Others ▼
    - Properties *1701*
    - Cars
    - Hobby
    - Storage Room
    - Customization  Add
- Groups ▼
- My HT Money ▼
- Gifts ▼
- HT Market ▼
- HT Mall ▼
- Sponsors ▼
- Developer ▼
- HotTerrainSoft ▼
- Sister Webs ▼

Advertisements *1710*

| Home | My Other Assets × | Properties × | | | | | |
|---|---|---|---|---|---|---|---|
| | Name | Picture | Address | Purchase Price | Appraisal Price | Description | Condition |
| | ☐ 3-bed room house | Picture of the house | 123 Main Street, Syracuse, NY 13202 | $120,770 | $153,890 | Built in 1978; Brick structure with wooden roof; 2200 square feet | Well maintained |
| | ☐ 2-bed room apartment at beach | Picture of the apartment | 8 Elm Street, Clinton, NY 13323 | $89,999 | $135,746 | Built in 1981; Concrete cement structure; on 21st floor with 800 square feet | Great Condition |
| | | | Total: | $210,769 | $289,636 | | |

— 1702

[Lease this property *1703*]  [Look for rental property *1704*]  [Buy property and add to list ▼ *1705*]  [Sell this property *1706*]  [Solicit Sponsor ▼ *1707*]  [Gift to someone *1708*]  [Donate to Charity *1709*]

HotTerrain © 2008

About HotTerrain | Advertisers | Developers | Businesses | Terms | Privacy | NeatExpense | NeatClerk | SmartOffice | HotTerrainSoft | Community Standards | Help | Contact Us

FIG. 20

HotTerrain — A place for your needs!

Home | My Account | Options ▼ | Blog | Privacy | Support

Log Out

Search: [      ] Go

Services:
- Virtual Mail ▼
- My Assets ▼
- Groups ▼
- My HT Money ▼
  - My Summary *2002*
  - My Balance
  - Detailed Report
  - Bank My HT Money
  - My HT Credit
- Gifts ▼
- HT Market ▼
- HT Mall ▼
- Sponsors ▼
- Developer ▼
- HotTerrainSoft ▼
- Sister Webs ▼
  - NeatExpense
  - NeatClerk
  - SmartOffice Advertisements *2007*

| Home | My Summary ✕ | Bank My HT Money ✕ | My HT Credit ✕ |

Summary Report of My HT Money as of 3/31/08  *2001*

| Source of My HT Money | Type | Exchange Rate ▼ | Amount | USD Amount ▼ |
|---|---|---|---|---|
| From HotTerrain | Free Money | 10000% | HT 119 | $1.19 |
| From sponsors | Free Money | 10000% | HT 586 | $5.86 |
| From HT member donation | Free Money | 10000% | HT 75 | $0.75 |
| From purchasing activities on HT | Earned Money | 10000% | HT 642 | $6.42 |
| From buying HT Money | Buying | 10000% | HT 1000 | $10.00 |
| | | Total: | HT 2422 | $24.22 |

[ Get Free HT Money ▼ *2003* ]    [ Donate HT Money to Charity *2004* ]    [ Give HT Money to Someone *2005* ]    [ Buy HT Money *2006* ]

HotTerrain © 2008

About HotTerrain | Advertisers | Developers | Businesses | Terms | Privacy | NeatExpense | NeatClerk | SmartOffice | HotTerrainSoft | Community Standards | Help | Contact Us

HotTerrain   *A place for your needs!*

Home | My Account | Options ▼ | Blog | Privacy | Support          [ Log Out ]

Search: [_____] [ Go ]

Services:
- Virtual Mail ▼
- My Assets ▼
- Groups ▼
- My HT Money ▼
- Gifts ▼
- HT Market ▼
  - Buy *2101*
  - Sell
  - Report
- HT Mall ▼
- Sponsors ▼
- Developer ▼
- HotTerrainSoft ▼
- Sister Webs ▼
  - NeatExpense
  - NeatClerk
  - SmartOffice

2100

| Home | Buy ✕ | Sell ✕ |

| Name of item for sell: | Apple iPod | Category of the item: | iPod ▼ |
| Picture of the item: | Here shows the picture | Description: | Apple iPod shuffle 1 GB Green (second generation) |

*2103*

| Your Desired Buying Price: | $50.00 | | |
| Automatically set your initial negotiation price: | | $42.00 *2104* | |
| Amount of increase during each negotiation: | | $1.00 *2105* | |
| Solicit Sponsorship: | Sent to my favorite sponsors *2106* ▼ | Yes *2107* ▼ | |
| Allow System to assign your sponsor: | Wal-Mart Inc. *2108* ▼ | | |
| Choose you own sponsor: | | Medium *2109* ▼ | |
| Chances of getting sponsorship by yourself: | | Yes *2110* ▼ | |
| Ask seller to solicit Sponsorship for you: | | High *2111* ▼ | |
| Chances of getting sponsorship through seller: | | | |

*2102*

Seller Profile:
Seller abc108 (269 ★) Gold Seller
Feedback: 100% positive
Member: Since May 2008
Sponsorship obtained: 12
Communities: 3
Communities Members: 10253
See detailed feedback
See detailed communities

[ View My HT Score *2112* ]

[ Add to My Asset upon Purchasing ▼ *2113* ]

HotTerrain © 2008

Advertisements *2114*

About HotTerrain | Advertisers | Developers | Businesses | Terms | Privacy | NeatExpense | NeatClerk
| SmartOffice | HotTerrainSoft | Community Standards | Help | Contact Us

FIG. 27

NeatExpense
*Manage your POS for free!*

Home | My Account | Options ◀ | Blog | Privacy | Support

Log Out

2700

Search: [    ] Go

Services:

NeatExpense (Entities)
  Home
  Create e-Receipts *2702*
  Create e-Invoices
  Customize e-Receipts
  Customize e-Invoices
  Create Databases
  HT Money
  Reports Sister Webs ▼
  HotTerrain
  NeatClerk
  SmartOffice

| Home | Create e-Receipts ✕ |
|---|---|

Oriental Supermarket
123 Main Street
Syracuse, NY 13202

Store Owner: Simon Deng
Tel: 315-555-2870

*2701*

*2703*

| Code | Item Name | Unit Price | Unit | Amount |
|---|---|---|---|---|
| 001 | Pork Rib | 13.63 | 1 | 13.63 |
| 002 | Cauliflower | 1.50 | 1.32 | 1.98 |
| 003 | Chinese cabbage | 1.80 | 1.53 | 2.75 |

Total: $18.36

Payment Method: HT Money
Status of Payment: Paid   *2704*
e-Receipt sent to: [joeblowe@neatexpense.com]

| Add Item *2705* | Delete Receipt *2706* | Print Receipt *2707* | List of All Receipts *2708* | e-Receipt View *2709* | View My HT Money Account *2710* | Solicit Sponsorship ▼ *2711* |

NeatExpense e-Receipts creation instruction
*2712*

Advertisements *2713*

HotTerrain © 2008

About HotTerrain | Advertisers | Developers | Businesses | Terms | Privacy | NeatExpense | NeatClerk
| SmartOffice | HotTerrainSoft | Community Standards | Help | Contact Us

FIG. 28

NeatClerk  *Simplify your business processes!*

Home | My Account | Options ▼ | Blog | Privacy | Support

Search: [      ] Go

Log Out

Services:
NeatClerk (Entities)
  Home
  E-Log ▼
    Create *2801*
    E-logs ▼
    Reports
  Signature ▼
    E-Initial/Signoff
    Certified Signature
  E-Saver ▼
    Create
    Distribute
    Reports
  E-contract/agreement
  Sister Webs ▼
    HotTerrain
    NeatExpense
    SmartOffice

| Home | E-Logs ✕ | Night Deposit Box ✕ |

*2802*

| Branch # | Date | Envelope | Amount | Customer Name | Verified By | Confirmed By |
|---|---|---|---|---|---|---|
| 123 | 5/1/08 | 1 | $300.00 | Mari Smith | Joe Blown | Jane Plain |
| 123 | 5/1/08 | 1 | $800.00 | Amy Well | Joe Blown | Jane Plain |
| 123 | 5/1/08 | 1 | $1500.00 | Steven Shoemaker | Joe Blown | Jane Plain |
| 123 | 5/1/08 | 1 | $150.00 | Kathy Deng | Joe Blown | Jane Plain |
| 123 | 5/1/08 | 1 | $600.00 | John Turvey | Joe Blown | Jane Plain |
|  | Total | 5 | $3350.00 |  |  |  |

Append *2803*  Insert *2804*  Delete *2805*  Save *2806*  Print Preview *2807*  Print *2808*  Signature *2809*

View Logs of Night Deposit Box ▼ *2810*

Check Missing Signoffs *2811*

HotTerrain © 2008

About HotTerrain | Advertisers | Developers | Businesses | Terms | Privacy | NeatExpense | NeatClerk | SmartOffice | HotTerrainSoft | Community Standards | Help | Contact Us

| File Edit View Create Action Word Spreadsheet Slide Flowchart Graphics Project Unhide Help |||||||||||
|---|---|---|---|---|---|---|---|---|---|---|
| Mail for Steven Brown | | Workflow *2901* | Approval *2902* | Evaluation *2903* | | Notes | Properties | | Reports | |
| File Edit View Insert Format Tools Table Window Help |||||||||||
| Spreadsheet Office Application Tool Bar |||||||||||

A1 ▼ =

| | A | B | C | D | E | F | G | H | I | J |
|---|---|---|---|---|---|---|---|---|---|---|
| 1 | xxxxxxx | xxxxxxx | xxxxxxx | xxxxxxx | xxxxxxx | xxxxxxx | xxxxxxx | xxxxxxx | xxxxxxx | xxxxxxx |
| 2 | xxx | | | xx | xxxxxxx | xxxxxxx | xxxxxxx | xxxxxxx | xxxxxxx | xxxxxxx |
| 3 | xxx | File in Progress → | | *2904* xx | xxxxxx | xxxxxxx | xxxxxxx | xxxxxxx | xxxxxxx | xxxxxxx |
| 4 | xxx | Review Stage → | | xx | xxxxxxx | | | | | |
| 5 | xxx | Modification Stage → | | xx | xxxxxxx | File Quality: | | | | *2906* |
| 6 | xxx | Mark as Completed → | | xx | xxxxxxx | | | | | |
| 7 | xxx | Mark as Reviewed → | | xx | xxxxxxx | Excellent ☐ Very Good ☐ Good ☐ Poor ☐ | | | | |
| 8 | xxx | Evaluation/Feedback Stage → | | xx | xxxxxxx | Additional Comment: | | | | |
| 9 | xxxxxxx | xxxxxxx | xxxxxxx | xxxxxxx | xxxxxxx | | | | | |
| 10 | xxxxxxx | xxxxxxx | xxxxxxx | xxxxxxx | xxxxxxx | | | | | |
| 11 | xxxxxxx | xxxxxxx | xxxxxxx | xxxxxxx | xxxxxxx | | | | | |
| 12 | xxxxxxx | xxxxxxx | xxxxxxx | xxxxxxx | xxxxxxx | | | | | |
| 13 | xxxxxxx | xxxxxxx | xxxxxxx | xxxxxxx | xxxxxxx | | | | | |
| 14 | xxxxxxx | xxxxxxx | xxxxxxx | xxxxxxx | xxxxxxx | | | | | |
| 15 | xxxxxxx | xxxxxxx | xxxxxxx | xxxxxxx | xxxxxxx | | | | | |
| 16 | xxxxxxx | xxxxxxx | xxxxxxx | xxxxxxx | xxxxxxx | | | | | |
| 17 | xxxxxxx | xxxxxxx | xxxxxxx | xxxxxxx | xxxxxxx | xxxxxxx | xxxxxxx | xxxxxxx | xxxxxxx | xxxxxxx |
| 18 | xxxxxxx | xxxxxxx | xxxxxxx | xxxxxxx | xxxxxxx | xxxxxxx | xxxxxxx | xxxxxxx | xxxxxxx | xxxxxxx |
| 19 | xxxxxxx | xxxxxxx | xxxxxxx | xxxxxxx | xxxxxxx | xxxxxxx | xxxxxxx | xxxxxxx | xxxxxxx | xxxxxxx |
| 20 | xxxxxxx | xxxxxxx | xxxxxxx | xxxxxxx | xxxxxxx | xxxxxxx | xxxxxxx | xxxxxxx | xxxxxxx | xxxxxxx |
| 21 | xxxxxxx | xxxxxxx | x | | *2905* | xxxx | xxxxxxx | xxxxxxx | xxxxxxx | xxxxxxx |
| 22 | xxxxxxx | xxxxxxx | x | Approve | | xxxx | xxxxxxx | xxxxxxx | xxxxxxx | xxxxxxx |
| 23 | xxxxxxx | xxxxxxx | x | | | xxxx | xxxxxxx | xxxxxxx | xxxxxxx | xxxxxxx |
| 24 | xxxxxxx | xxxxxxx | x | | | xxxx | xxxxxxx | xxxxxxx | xxxxxxx | xxxxxxx |
| 25 | xxxxxxx | xxxxxxx | x | View Approval Information → | | Approved by *Jane Plain*, Supervisor, on 3/23/2006 at 10:18am. | | | xxxx | xxxxxxx |
| 26 | | | | | | | | | | |
| 27 | | | | | | | | | | |
| 28 | | | | | | | | | | |
| 29 | | | | | | | | | | |
| 30 | | | | | | | | | | |
| 31 | | | | | | | | | | |

FIG. 40

Example of HT Score Calculation

*4001*

| Factor No. | Factor Description | Weight |
|---|---|---|
| F1 | Membership Level | 10% |
| F2 | Size of communities | 35% |
| F3 | Available Ad space in communities | 35% |
| F4 | Available Ad space in user's HT Space | 10% |
| F5 | Level of Activeness | 5% |
| F6 | Level of Prior Purchasing Activities | 5% |

*4002*

$F1 = 0$            When $r < 0.9$
$F1 = [(r - 0.9) / 0.1] \times 100$      When $r \geq 0.9$ $F2 = 100$           When $N \geq Nmax$
$F2 = (N/Nmax) \times 100$      When $N < Nmax$

| | | | |
|---|---|---|---|
| F3 = 100 | 0 Ads | F4 = 100 | 0 Ads |
| F3 = 80 | 1 Ad | F4 = 80 | 1 Ad |
| F3 = 60 | 2 Ads | F4 = 60 | 2 Ads |
| F3 = 40 | 3 Ads | F4 = 40 | 3 Ads |
| F3 = 20 | 4 Ads | F4 = 20 | 4 Ads |
| F3 = 0 | 5 Ads or more | F4 = 0 | 5 Ads or more |

F5: from 0 to 100

F6: from 0 to 100

*4003*

User A: Gold Member, 98% positive rating, has 50,000 members in communities, 0 Ads in his communities and HT space, active level equals 80, and no prior purchasing activity.

User B: Platinum Member, 100% positive rating, has 120,000 members in communities, 1 Ad in communities and 0 Ads in his HT space, active level equals 90, and prior purchasing equals 20.

The HT Scores for these two individuals are calculated as shown below:

| | User A | User B |
|---|---|---|
| F1 | 80 × 10% = 8 | 100 × 10% = 10 |
| F2 | 5 × 35% = 1.75 | 12 × 35% = 4.2 |
| F3 | 100 × 35% = 35 | 80 × 35% = 28 |
| F4 | 100 × 10% = 10 | 100 × 10% = 10 |
| F5 | 80 × 5% = 4 | 90 × 5% = 4.5 |
| F6 | 0 × 5% = 0 | 20 × 5% = 1 |
| Total | 58.75 | 57.70 |

ONLINE E-COMMERCE AND NETWORKING SYSTEM/GENERATING USER REQUESTED SPONSOR ADVERTISEMENTS TO CENTRALIZE SILOED AND DISTRIBUTED USER DATA IN THE INTERNET AND BUSINESS SYSTEMS

BACKGROUND OF THE INVENTION

1. Field of Invention

The present art relates to an online e-commerce and networking system with subsystems that meet users' work and life needs and entities' operational needs, a creative community model enabling entities to build deeper and better relationships with users and a revolutionary online advertisement model enabling direct interaction between users and entities through incentives users desire to create large online communities, so that more effective online advertisements are enabled to create a win-win situation for all stakeholders, including individual users, advertisers, publishers, organizations, and online advertisement networks.

2. Description of Related Art

There are several major types of e-commerce websites in the current market. Some websites are hybrids of several types of e-commerce websites. One common type is an organizational e-commence website, whereby various organizations developed their own e-commerce websites to sell their products and services online. For example, an online banking website provides its customers a digital way to obtain products and services via the Internet. For another example, a charity organization's website allows the public to directly donate money via credit card to the charity organization.

Another common type is an Internet Marketplace. Such websites provide centralized digital places to connect buyers and sellers and provide means for online transactions. Such websites include eBay.com, Amazon.com, Alibaba.com, etc. Their business model is based on bringing buyers and sellers together to create a marketplace community, so that the website acting as a third party can charge item posting fees, transaction fees, and advertising fees, although the advertising may not be their main source of revenue generation.

The third common type of e-commerce websites is an Internet Advertising Website whereby a significant amount of the revenue, if not majority, is derived from online advertising. Such websites include Google.com, Yahoo.com, Youtube.com, Myspace.com, Facebook.com, etc. Their business model is to attract crowds by offering free search engine functions, and free social networking, entertainment, and communication, so that they can attract advertisers to advertise on their websites due to their large membership bases. They also generate part of their revenue by offering fee based products and services.

Based on the history of Internet since its popularity in 1990s, the current e-commerce websites have evolved from primitive to mature stage. The advantages and benefits of such e-commerce websites are:

They have enabled Business-to-Business, Business-to-Consumer, and Consumer-to-Consumer online transactions and dramatically improved transaction efficiency. The current e-commerce websites quickly connect buyers and sellers who may never be able to meet in a non-internet environment.

They have created a new way of advertising for companies and organizations to promote their products and services. As a result, they have increased sales for some companies.

They have provided social network online environments for people to find friends, to communicate, to share viewpoints and experiences, and to entertain one another. Thus, they have been able to attract crowds and build online communities to facilitate e-commerce activities.

However, the current e-commerce websites are not designed with the objective of addressing many other types of needs of entities and individuals, so that even larger online communities can be built to enable more online e-commerce activities. Such needs include but are not limited to entities' operational needs, and individuals' work and life needs.

Current e-commerce websites are faced with challenges to: 1) improve online advertisement revenue due to relatively low response rates (e.g., clicks per thousand impressions) and even lower response rates that lead to successful sales; 2) sustain users' interests on their sites; 3) deal with criticism of distracting young people from their studies; and 4) attract more online advertisements especially for social networking sites, whereby advertisers find it difficult to entice social networking users to act on their online advertisements.

The Internet is currently in a mature stage, but there is still tremendous room to grow. After more than a decade of rapid growth, the next phase of e-commerce websites should be at a more advanced level, whereby they provide advanced functions to meet organizations' various operational needs and individuals various work and life needs, and to aim at building deeper and better relationships among advertisers, publishers, organizations, and individual users.

The present invention is based on our identification of such growth trends to further explore the unprecedented potential of online e-commerce and online targeted advertisements, so as to enable e-commerce sites to accelerate by tapping into the tidal wave of e-commerce.

The prior art online advertisement model is mainly based on a one-directional model: advertisers provide online advertisements to publishers on a fee basis, and the publishers present the advertisements to general public or targeted audience. In some other cases, advertisers provide online advertisements to a network advertisement agent, who assigns those advertisements to various publishers and receives a percentage of the advertisement dollars. The publishers then present the advertisements to general public or targeted audience.

The present invention of a online advertisement model provides multi-directional interactions among the these parties, so that individual users can request sponsorship directly from advertisers for products, services and items they desire on our proposed online e-commerce and networking system in exchange for advertisers displaying the advertisements on users' community pages and their online e-commerce and networking account space. And our proposed online e-commerce and networking system provides a centralized platform for an entity to partner with other entities to directly build deeper and better relationships with users by attracting users to communities and online events through sponsorships and incentives.

The present invention further enables utilitarian computing, so that significant data related to specific business processes and individual consumption patterns are collected centrally for analyses. Such analyses help to further improve the entire business model and to provide more effective online advertisements to targeted audience. The present invention will contribute to significantly enhanced efficiency in our society, and will make people's life easier by taking care of their work and life needs.

Prior arts related to e-commerce or social networking websites include: a system and method to influence a position for search listing; e-stamp for customized advertisements; automated book marking of online advertisements; generation of advertisement information; enabling advertiser to create advertisement templates; sale of online advertisements; method for operating an online social network; providing advertisement contents based on categories of search results; pricing of online advertisements; processing electronic receipts through a smart receipt application, etc.

For example, U.S. Pat. No. 7,363,300 discloses a system and method for enabling information providers using a computer network to influence a position for search listing within a search result list.

US Patent Application No. 20010025254 discloses an electronic stamp providing system to deliver customized online advertisements to an electronic mail receiver upon recipient choices to view the customized online ads by clicking electronic stamps attached in emails received.

U.S. Pat. No. 6,486,891 discloses a method of facilitating the automated bookmarking of a web page associated with an online advertisement, whereby the advertisement causes a web page associated with the advertisement to be bookmarked in the user's browser.

US Patent Application No. 20050065806 discloses online information (such as advertiser web pages in conjunction with products lists, web content, existing online ads, etc), or an electronic version of offline advertisement information that is used to generate online advertisement information, such as a landing page, targeting information, and/or ad creative information.

US Patent Application No. 20070233566 discloses a system and method for facilitating cooperative search engine marketing among business entities and their respective channel partners, whereby such business entities can create and distribute approved advertisements and campaign templates, allocate and track the usage of market development funds, monitor the results of sponsored search advertising campaigns, and streamline the reimbursement process for market development funds.

US Patent Application No. 20080077595 discloses a method for operating a website for an online social networking includes the steps of receiving a group picture containing a plurality of individuals, receiving identification information regarding the individuals in the group picture, displaying the group picture, and selectively displaying labels for the individuals after the individuals confirm that they have been correctly identified.

U.S. Pat. No. 7,191,147 discloses systems and methods for facilitating the sale of classified ad items, whereby a linkage is created between a print advertisement and an online counterpart, and that consumers are encouraged to view and/or purchase online an item for sale in the print classified ad.

US Patent Application No. 20080103894 discloses a method and process for providing a merit-based incentive points system for amateur sports and competitive and non-competitive events wherein merit points are purchased from points administrator and distributed by event organizers and sponsors as participation and performance awards to contestants and participants. Such merit points functioning as points currency of value, can be accrued, traded, exchanged, and redeemed for scholarships, goods and services.

US Patent Application No. 20080015935 discloses a method for management of a resource by a community of participants comprising: (a) defining individual tasks necessary for managing the resource; (b) allocating a quantum of redeemable reward points to each defined task; (c) defining participants within the community to execute tasks for reward points; (d) selecting rewards which may be redeemed by surrendering reward points earned by participants and allocation of values to each reward expressed in reward points; (e) providing an information system which enables participants to view and claim available rewards; and (f) providing an information system which keeps track of tasks, points and rewards associated with participants.

US Patent Application No. 20080082416 discloses a domain that hosts a general e-commerce marketplace establishes multiple sub-domains to host niche electronic marketplaces, wherein these niche sub-domain sites are built around a concept and offer for sale items that relevant to that concept, the sub-domain sites are operated by communities of individuals, and each community is responsible for determining many facets of the consumer experience at the sub-domain site.

U.S. Pat. No. 6,757,661 discloses an ad server and local device that interface for selecting advertisements to be viewed by users of an online service based upon user activity.

US Patent Application No. 20070100801 discloses a method for providing advertising content for display in a page over a network, whereby the advertising content is displayed based on a category assigned to the advertising content and the category correlating to a given search may be based on the search results that may be associated with one or more categories and the category associated with the highest count of search results is the category for that search.

US Patent Application No. 20020073034 discloses a system and method for pricing a classified advertisement whereby the method includes receiving a classified advertisement from an advertiser to be distributed to at least one of multiple device types and a price may be determined an displayed for the classified advertisement as formatted for presentation by the device type(s).

US Patent Application No. 20050033668 discloses a method and apparatus for allowing a vendor to: create, maintain, validate, submit, review, and print all of its invoices, such as for example air, armored, ground, and automated teller machine (ATM) fault servicing, on a secure network is provided, wherein GUI screens are provided for inputting invoices, making invoice preparation as simple and as efficient as possible.

U.S. Pat. No. 6,898,598 discloses a method, program, and system for processing electronic receipts within a computer network that comprises creating a customer profile for a user using a Smart Receipt application, whereby electronic receipts (smart receipts) are sent from the point of sale to a designated database when the user purchases items, and a smart receipt object is initiated which retrieves the specified electronic receipt from the appropriate database according to the user's search parameters when he wants a copy of a receipt.

US Patent Application No. 20030120607 discloses a system and method for creating and verifying e-receipts whereby the system and method allow consumers and merchants to perform e-transactions using a secure e-receipt system that includes programmable information tags such as Radio Frequency Identification (RFID) technology.

US Patent Application No. 20080097844 discloses handling electronic coupons by accessing information indicating association of an electronic coupon with an account of a user that identifies multiple retail entities associated with the user, whereby the computer systems may associate electronic coupons with the user such that the user may redeem the electronic coupons at a retail store upon presentation of a user identifier, and the systems may prevent the user from redeeming the electronic coupon at a retail store associated with the corresponding retail entity.

None of the prior arts provide a centralized location to meet individuals' wide variety of needs and to integrate entity operation processes. None of the prior arts enable entities to directly involve in community building and event hosting to foster deeper and better relationships with users. And none of the prior arts allow individuals and entities to become publishers of online advertisements in exchange to obtain incentive rewards through requesting sponsorship.

SUMMARY OF THE INVENTION

1. Brief Summary

The purpose of the present invention is to create large online communities by meeting individuals' work and life needs and entities' operational needs, so as to enable more online e-commerce activities, improve the revenue creation of online advertisements and online sales, and transform current e-commerce websites into advanced e-commerce and networking websites.

An objective of the present invention is to provide an online e-commerce and networking system, called HotTerrain.com, that houses different online applications and programs to draw crowds by: 1) offering unique online services that meet individuals' work and life needs and entities' operational needs; and 2) offering incentive rewards that are linked to targeted marketing and online advertisements.

One embodiment of the present invention of HotTerrain.com includes but is not limited to: 1) a virtual email system with letter e-templates, e-envelopes, e-stamps, e-stickers sponsored by participating organizations or individuals; 2) a "My Assets" place containing users' virtual and real items in an organized manner and allows users to solicit and request sponsorship; 3) a community or group application that allows a user to share personal information and viewpoints with selected members and participate in online events; 4) an incentive plan called "HotTerrain (HT) Money" for participants to manage accumulated points; 5) a gift application for users to obtain physical and/or digital items via sponsorship; 6) an online consumer-to-consumer marketplace with virtual locations and simulations sponsored by participating organizations or individuals; 7) an online business-to-consumer marketplace with virtual locations and simulations sponsored by participating organizations; 8) a sponsor application for users and organizations to search, solicit or request sponsorships; 9) a developer application for developers to create applications and designs and to solicit or request sponsorships; 10) an area of links to online e-commerce and networking system's other applications that may be supported by partnering firms; and 11) an area of links to various sister websites that provide certain free services and products to further meet users' work and life needs and organizations' operation or process needs.

The virtual email system is a unique email system that has the option of presenting an email in a virtual mail view, so that the email is first presented inside a virtual envelope displaying sender and recipient street addresses, e-stamp and e-sticker (e-sticker is optional), and when opened, the email is presented within a letter e-template selected by the sender with unique design and e-sticker (optional). The virtual email system also presents an email in virtual postcard view upon a user selecting an e-card template.

The "My Assets" is an application within the online e-commerce and networking system to house and manage users' virtual and real items in an organized manner and allows users to solicit and request sponsorship. Items in "My Assets" are of great interest to users, such as stamps, photos, videos, treasure, properties, cars, and other assets.

The community or group application allows a user to share his profile information, his "My Assets" information, his viewpoints and stories with his communities or selected members, and to interact with one another. It allows the user to set up a "Wish List" and to solicit or request sponsorship from community members. It also enables the user to participate in online events, including but not limited to virtual birthday parties, contests and games. The community or group application also allows entities, especially businesses, to build a deeper and better relationship with users by providing contests (e.g., science contests, singing contests, dancing contests, etc.) and learning games for users to improve their knowledge and skills.

The "HT Money" application enables participants to manage accumulated points from various sources, obtain various reports, obtain more HT money, bank HT money and borrow HT money.

The gift application allows users to obtain physical and/or digital items for themselves and for others in several ways, including soliciting and requesting sponsorship.

The online consumer-to-consumer marketplace allows users to buy and sell real and/or digital merchandise via different selling techniques, to solicit or request sponsorship, and to participate in virtual environments to buy and sell.

The online business-to-consumer marketplace allows users to buy real and/or digital merchandise from organizations via different selling techniques, to solicit or request sponsorship, and to participate in virtual environments to buy real and/or virtual merchandise. This marketplace called "HT Mall" also enables entity-to-consumer e-commerce activities, wherein entities include charity, education, government and other organizations. HT Mall's entity accounts also allows organization-to-organization e-commerce activities.

The sponsor application allows users and organizations to search, solicit or request sponsorships, book favorite sponsors, and view sponsorship history and related reports.

The developer application enables developers to create applications and designs, to solicit or request sponsorships to promote their developments, and to view and print various reports.

The application links to the online networking system's other applications include but are not limited to accounting, inventory, payroll, tax, that may be supported by partnering firms.

The sister web links provide certain free services and products, such as an online expense system, an online administration system, and an online office applications system to further meet users' work and life needs and organizations' operational needs.

2. Advertisement Model

Another embodiment of the present invention related to online advertisements include but are not limited to MarketAds, MallAds, SponsorAds, EventAds, PartnerAds, and ChannelAds.

MarketAds may be posted by an individual for free on HotTerrain Market and the individual is only charged a fee based on the final sale price. The individual does not pay if his item does not sell. The individual can provide incentive to the buyer, such as offering HT money. MarketAds may be associated with expiration time so that the individual needs to re-post it after expiration.

MallAds are used by companies to advertise their products and services to individuals accessing the HotTerrain Mall. Advertisers can provide incentives to buyers to promote sales. Advertisers are charged a posting fee each time they post and commission fees for successful sales. HotTerrain has the option of offering a percentage of the fee income to advertisers' buyers to help promoting sales. MallAds with incentives can be converted into SponsorAds to be displayed within and outside the online e-commerce and networking system. MallAds are associated with expiration time so that fees must be paid for renewal after expiration.

SponsorAds can be solicited or requested by users to assist their various activities in HotTerrain. Once a sponsorship is obtained, the associated sponsor advertisement is displayed in the user's HotTerrain space and communities. The sponsorship requests are evaluated automatically based on the user's HotTerrain Score (HT Score). The user can request sponsorship to obtain free HT money, to obtain discounts, gift certificates, and others rewards from participating advertisers when the user purchases or obtains items, or using certain functions in HotTerrain. SponsorAds are associated with expiration time so that fees must be paid for renewal after expiration.

The user's HT score may be calculated based on key factors, including but not limited to user membership level (e.g., platinum, gold, or silver), size of the user's communities, available advertisement space in the user's community web pages, available advertisement space in the user's HT space, level of activeness, and level of prior purchasing activities.

EventAds allows advertisers to display or play their online advertisements during the course of events that occur within HotTerrain. Such events include but are not limited to virtual birthday parties, graduation parties, science competitions, entertainment competitions, IQ tests, EQ tests, personality tests, and games. EventAds include text, graphic, sound, and/or video advertisements that can be played during the course of virtual events and they may be associated with expiration time so that fees must be paid to renew the EventAds.

PartnerAds allow other companies, online advertisement agents, and online advertisement networks to place HotTerrain advertisements on their websites, so that they receive a percentage of the advertisement fee generated from those advertisements from HotTerrain.

ChannelAds enable other publishers, online advertisement agents, and online advertisement network to supply HotTerrain their advertisements that meet HotTerrain's advertisement criteria. Such entities also receive a percentage of the advertisement fee generated from those advertisements from HotTerrain.

BRIEF DESCRIPTION OF THE DRAWINGS

FIG. 2 is an exemplary illustration of the e-commerce and networking system (HotTerrain.com) user logon interface.

FIG. 7 is an exemplary illustration of Virtual Mail Inbox View that can be presented to the user.

FIG. 15 is an exemplary illustration of the contents inside a selected treasure holder and what the user can do with them.

FIG. 17 is an exemplary illustration of the contents inside "Properties" sub-category and how the user can do with them.

FIG. 20 is an exemplary illustration of the user's "My HT Money" summary report that can be presented to him and what he can do with his HT Money.

FIG. 21 is an exemplary illustration of "HT Market" that the user can buy stuff and request sponsorship.

FIG. 27 is an exemplary illustration of creating an e-receipt and accepting HT money for product payment.

FIG. 28 is an exemplary illustration of sister website "NeatClerk" and how a bank branch can utilize the e-log for recoding its night deposit box transactions.

FIG. 29 is an exemplary illustration of sister website "SmartOffice" and how the workflows of documents are tracked and analyzed to report white-collar workers' productivity and related issues.

FIG. 40 is a diagram depicting exemplary calculations of two users HotTerrain Scores.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as data, tables, requesting, selecting, supplementing, displaying, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor includes microprocessors, micro-controllers, digital signal processors, and the like, that are standalone, adjunct or embedded.

Various operations will be described as multiple discrete steps in turn, in a manner that is most helpful in understanding the present invention; however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Other features of the illustrated embodiments will be apparent to the reader from the foregoing and the appended claims, and as the detailed description and discussion in conjunction with the accompanying drawings.

While the invention is described and illustrated here in the context of a limited number of embodiments, the invention may be embodied in many forms without departing from the spirit of the essential characteristics of the invention. The illustrated and described embodiments, including what is described in the abstract of the disclosure document, are therefore to be considered in all respects as illustrative and not restrictive. The scope of the invention is indicated by the appended claims rather than by the forgoing description, and all changes, which come within the meaning and range of equivalency of the claims are intended to be embraced therein.

Figure 1:
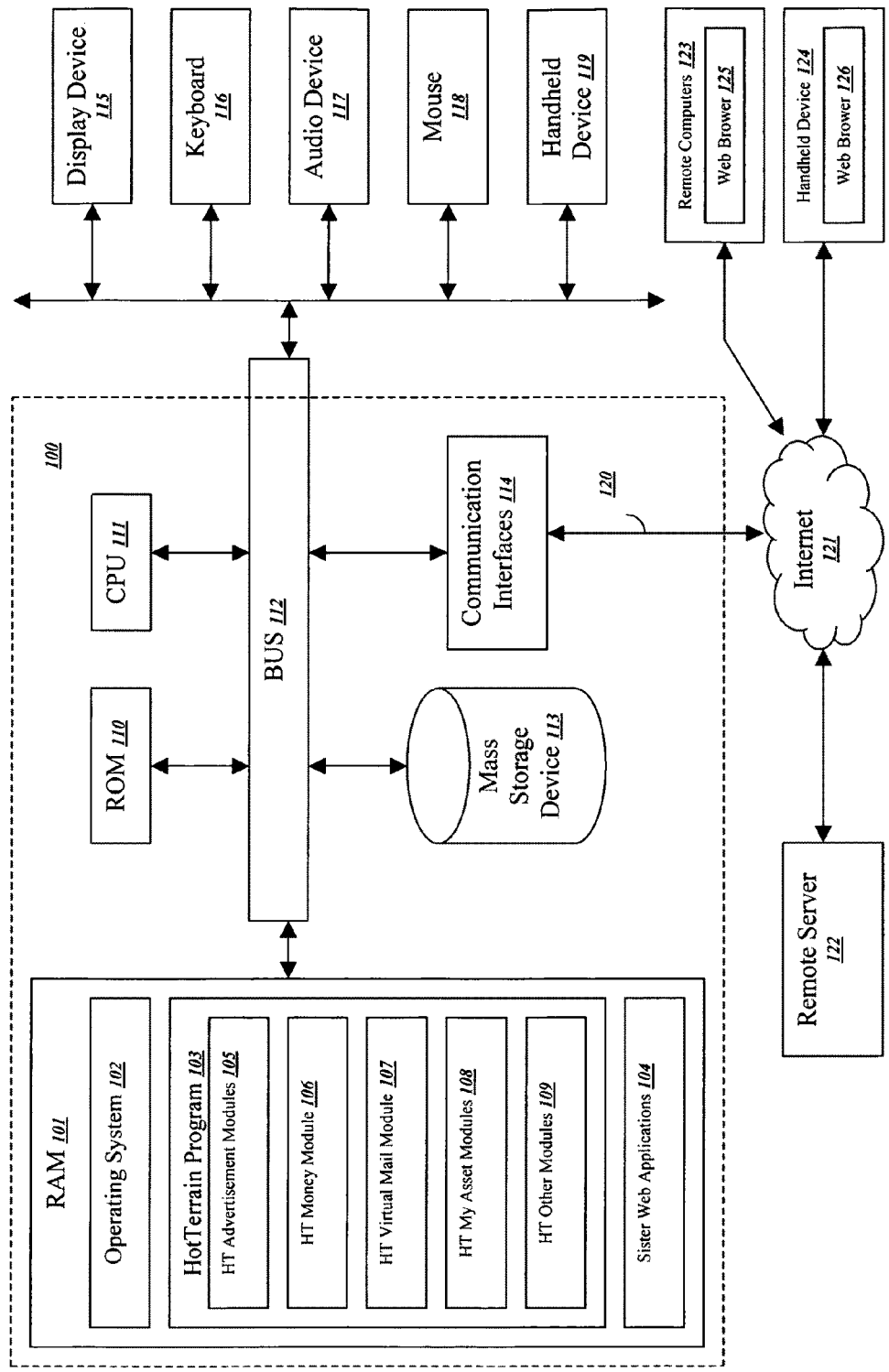
FIG. 1 is a block diagram depicting a web server system in which the present system, method and program may be implemented.

Now referring to the drawings and in particular to FIG. 1 that depicts one embodiment of a web platform system through which the present method, system, and program may be implemented.

Web Server System 100 includes Random Access Memory (RAM) 101 and Read Only Memory (ROM) 110, a Central Processing Unit (CPU) 111, and a system Bus 112 or other communication device for communicating information within Web Server System 100. A number of program modules may be stored in mass storage device 113 and RAM 101, said RAM 101 includes an Operating System 102, web e-commerce and networking system (e.g., called HotTerrain) 103, as well as Sister Web Applications 104. HotTerrain e-commerce and networking system 103 includes HotTerrain (HT) Advertisement Modules 105, HT Money Module 106, Virtual Mail Module 107, My Assets Modules 108, and Other Modules 109, which include but are not limited to Community/Group Module, Gift Module, HT Market Module, HT Mall Module, Sponsor Module, Developer Module and others.

The Sister Web Applications 104 is depicted as external programs of the web platform system HotTerrain 103, but one should understand that some of the applications, if not all, could also be internal modules of the HotTerrain web applications system. These sister web applications can be activated by links placed within the HotTerrain web applications system 103.

CPU 111 may be a general-purpose processor that, during normal operation, processes data under the control of the operating system and application software accessible from a dynamic storage device, RAM 101, and a static storage device, ROM 110.

Bus 112 preferably includes low latency and high latency paths that are connected by bridges and adapters and controlled within computer system 100 by multiple bus controllers.

The present invention may be provided on a machine-readable medium that includes any medium that participates in providing instructions to Central Processing Unit 111 or other components of web server system 100 for execution.

A machine-readable medium may take any form including, but not limited to, volatile media, transmission media, and non-volatile media. Volatile media include dynamic memory such as RAM 101. Transmission media include coaxial cables, copper wire or fiber optics, including the wires that comprise Bus 112.

The web server system 100 further includes Mass Storage Device 113 and Communication Interfaces 114. Mass Storage Device 113 is an example of a non-volatile medium, which is depicted as an internal component of web server system 100, but one should understand that it could also be an external device.

Communication interfaces 114 provide two-way data communications connected to communication Link 120 that may be connected, for example, to a Network 121, such as a Local Area Network (LAN), Wide Area Network (WAN), World Wide Web, or directly to an Internet Service Provider (ISP). In particular, Communication Link 120 may provide wired and/or wireless network communication to the Internet, or one or more networks.

In a networked environment, program modules depicted relative to the web server system 100, or portions thereof, may be stored and transferred from a Remote Server 122. Data from web server system 100 may be stored or tracked on such a Remote Server 122 and there can be more than one such server. It will be appreciated by those skilled in the art that the network connections shown are exemplary and other means of establishing a communication link between the computers may be used.

The web server system 100 further includes multiple peripheral components that facilitate communication. These peripheral components are connected to multiple controllers, adaptors, and extension slots that are connected to one of the multiple levels of Bus 112. In this exemplary diagram, a Display Device 115 is connectively enabled on Bus 112 for providing visual, tactile or other graphical representation formats. A mouse 118 is connectively enabled on Bus 112 for controlling the location of a pointer within Display Device 115. A Keyboard 116 is connectively enabled on Bus 112 as an interface for user inputs to computer system 100. The keyboard can be any type, such as dome-switch keyboard, capacitive keyboard, buckling-spring keyboard, laser keyboard, membrane keyboard, etc. An Audio Device 117 is connectively enabled on Bus 112 for controlling audio inputs and outputs. A Handheld Device 119 is connectively enabled on Bus 112 for controlling data exchange. Such handheld devices may include PDAs, cell phones or blackberries, etc. In alternative embodiments of the present invention, additional input and output peripheral components may be added.

Other input devices (not shown) may include a microphone, joystick, game pad, satellite dish, scanner, or the like. In addition to the Display Device 115, computers typically include other peripheral output devices (not shown), such as speakers, printers, or the like.

The web server system 100 may operate in a networked environment using connections to one or more remote computers, such as a Remote Computer 123. The Remote Computer 123 may be a user computer that comprises a web browser 125, a router, a peer device or other common network node. The web server system 100 may also operate in a networked environment using connections to one or more handheld devices, such as a Handheld Device 124 that comprises a web browser 126. The handheld device may include user PDAs, cell phones or blackberries, etc.

Those skilled in the art will appreciate that the hardware depicted in FIG. 1 may vary. Furthermore, those skilled in the art will appreciate that the depicted example is not meant to imply architectural limitations with respect to the present invention.

Referring to FIG. 2 therein is presented an exemplary user logon interface of the e-commerce and networking system (e.g., called HotTerrain) according to the present invention. As represented in FIG. 2, the user logon interface 200 includes but is not limited to an area for search 201, an area displaying different categories of marketplace items 202, an area for individual user logon 203, an area of logon links for entities 204, and an area providing benefits information of using HotTerrain 205.

Search Program 201 contains a search text box for a user to input search key word(s), a dropdown menu for user to select a specific search category, a search activation button "Go", and an Advanced Search link. Once the user click the dropdown menu arrow ◄ (when clicked, it would turn the pointer down ▼ to show menu options), he is presented with a list of different categories, including but not limited to All Categories, Antiques, Apparel, Art, Baby, Beauty, Books, Business & Industry, Cameras & Photo, and incentive key words (see details in FIG. 24 below), etc. The search result will list items matching the user's search term from Groups, HotTerrain (HT) Market, HT Mall and Sponsors (see more details about Groups, HT Market, HT Mall and Sponsors in FIGS. 18, 19, 21, 22, 23, and 24 below).

Categories area 202 displays different categories for a user to select. The user can scroll up and down the list to locate the right category. Subcategories can be presented once a user selects a category, so that he can narrow down to the specific item he is looking for.

User logon area 203 allows a user to enter a user ID (in this exemplary case, it's the user's email address) and password to log on. It also comprises registration for a user to register a new HotTerrain account for free.

Log-on links area 204 provides shortcuts for entities to logon to their HotTerrain accounts. For example, A person from a business can click the business link to go to business logon page to access his business account, whereby he can post products/services on HT Mall, enter sponsorship relationships with other businesses, solicit sponsorship from other businesses for his buyers, use HotTerrain and Sister Websites functions, and other functions. HotTerrain also enables charity organizations to post and sell online products and provides an easy way for them to collect donations.

HotTerrain benefits area 205 lists key benefits a user can obtain when becoming a member. It also enables the user to find his friends on HotTerrain. For other entity logon screens, a similar area 205 is displayed listing specific key benefits to the entity. For example, a company can use HotTerrain to quickly sell its products by participating in SponsorAd, use various functions to enhance promotional results and ROI, build deeper and better relationships with consumers, earn advertisement dollars by partnering with HotTerrain, and so on.

Figure 3:
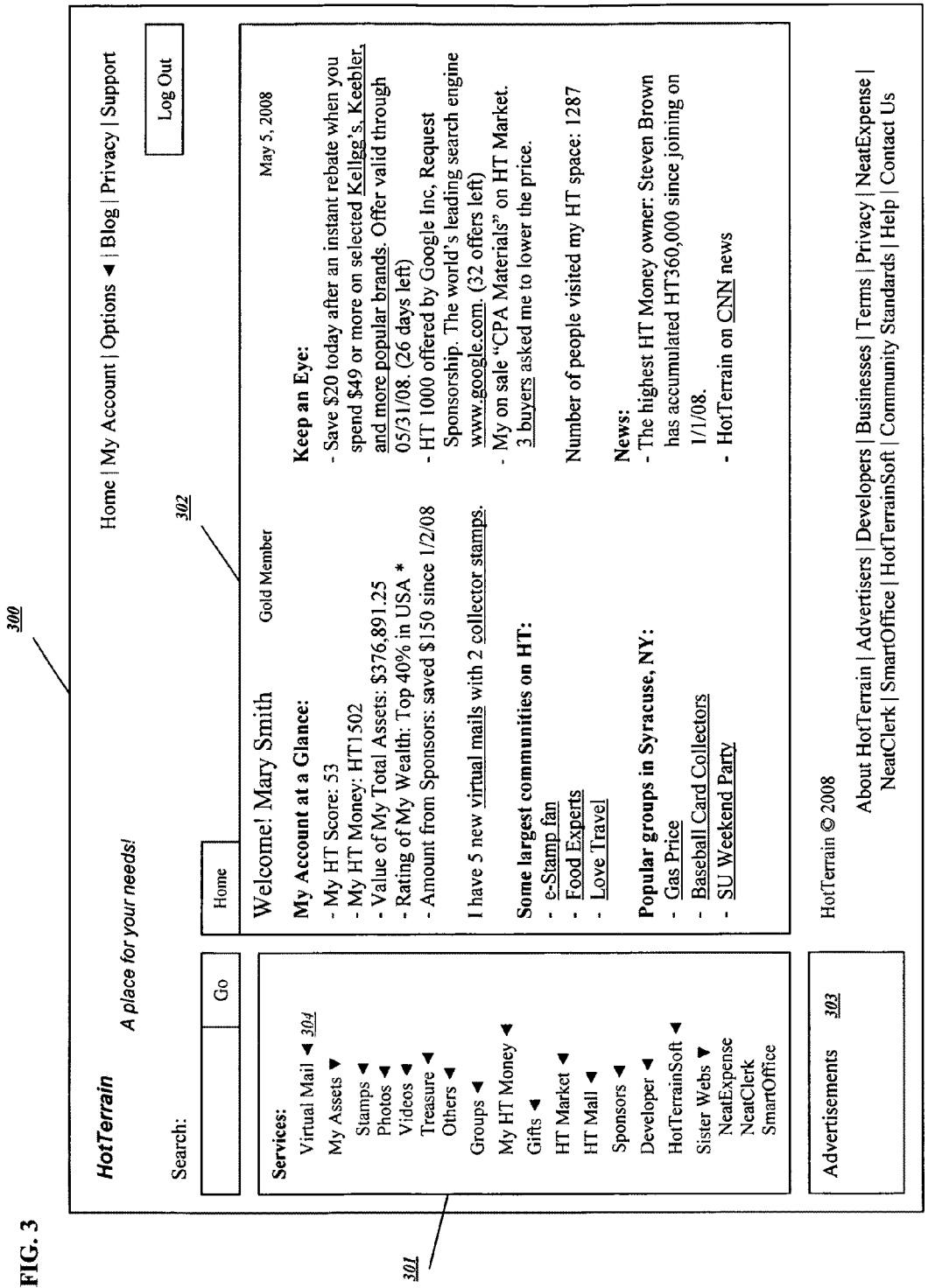
FIG. 3 is an exemplary illustration of a user's home page of his HotTerrain account.

With reference now to FIG. 3, therein is depicted an exemplary illustration of a user's home page of his HotTerrain account according to one embodiment of the present invention. For simplicity sake, only key areas are shown on display 300. On the left hand panel of the display 300, a list/menu of Services 301 that are available in HotTerrain is displayed. Such services includes but are not limited to Virtual Mail, My Assets, Groups, My HT Money, Gifts, HT Market, HT Mall, Sponsors, Developer, HotTerrainSoft, and Sister Webs as shown in 301. A user can click the dropdown menu arrow ◄ (when clicked, it would turn the pointer down ▼ to show menu options) that is attached to the applicable services to see the sub-categories of services.

The display 300 also contains the home page contents 302 that can be presented to the user. Such contents include but are not limited to the user's HT Money, HT Score, Value of My Total Assets, Rating of My Wealth, Favorite Sponsors, Amount from Sponsors, Keep an Eye, Virtual Mail and Collector Stamps, Some Largest Communities on HotTerrain, Popular Groups in the user's geographic area, News, etc. The advertisement area 303 is elaborated in FIG. 33 and FIG. 40 below.

Figure 4:
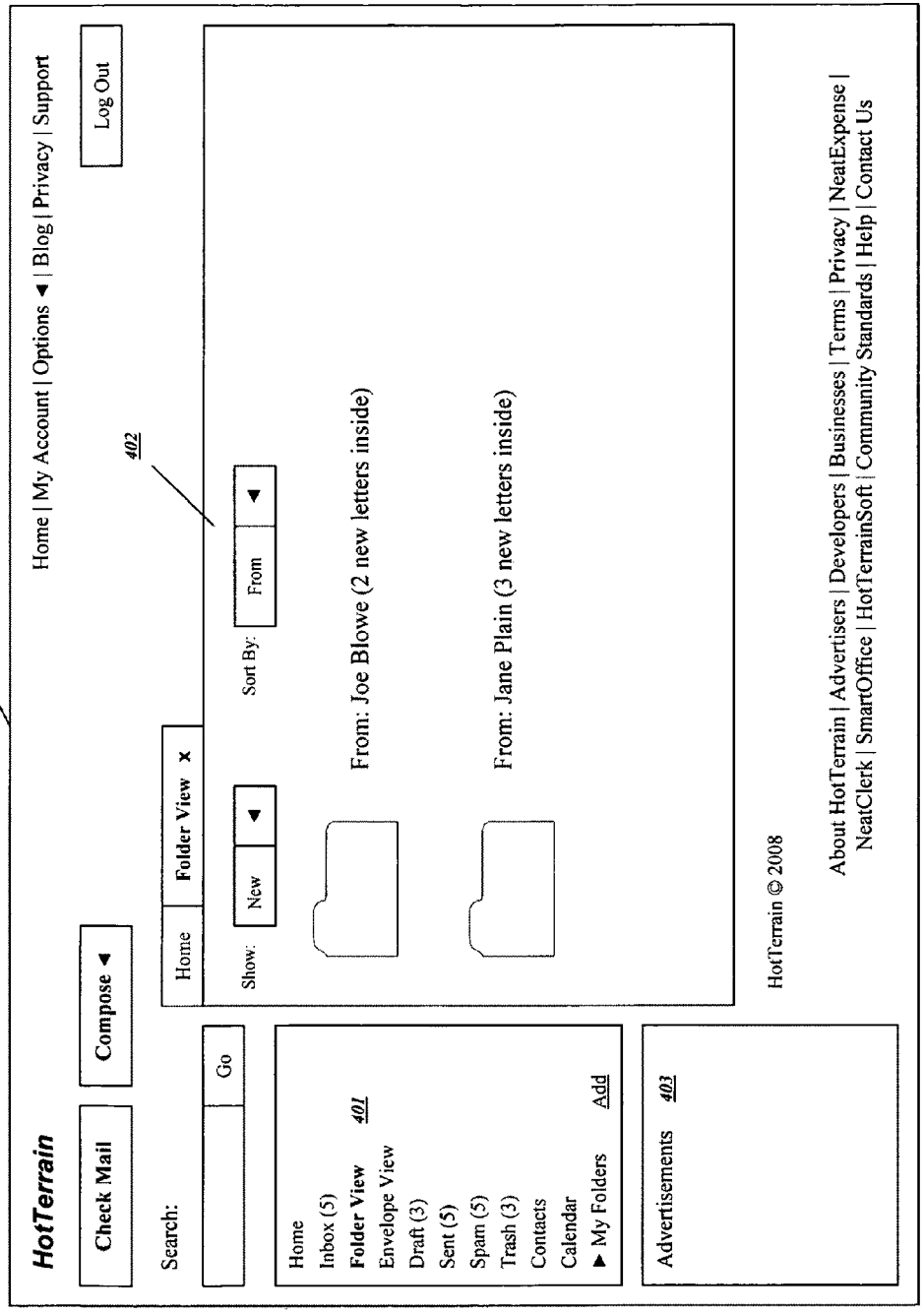
FIG. 4 is an exemplary illustration of Virtual Mail Folder View that can be presented to a user.

Now, referring to FIG. 4, therein is presented an exemplary illustration of Virtual Mail Folder View user interface 400. When a user clicks the Virtual Mail dropdown button in 304 of FIG. 3 and then selects Folder View 401 on left panel of user interface 400, the system displays virtual mail folders in display window 402 according to default settings or the user's pre-established settings, such as showing only the new mails in each folder and sorting mails into different folders by sender email address. The user can change the pre-established settings by selecting from the dropdown menu arrow ◄ (when clicked, it would turn the pointer down ▼ to show menu options) of "Show" and "Sort By" in display area 402. Virtual Mails can also be contained in one folder, such as "All Vmail Folder". The advertisement area 403 is elaborated in FIG. 33 and FIG. 40 below.

Figure 5:
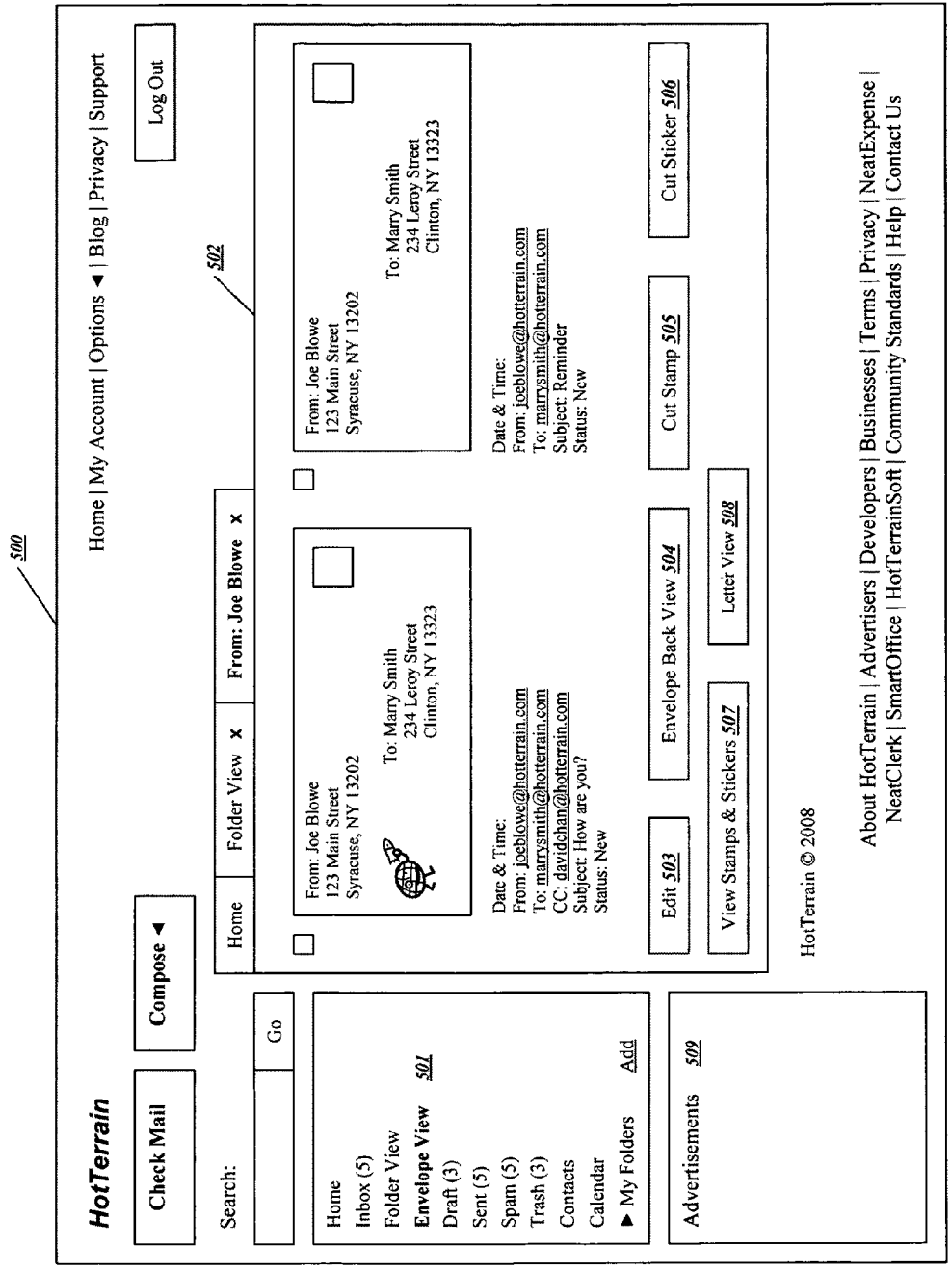
FIG. 5 is an exemplary illustration of Virtual Mail Envelope View that can be presented to the user.

Referring to FIG. 5 therein is presented an exemplary illustration of Virtual Mail Envelop View 500 that can be displayed to a user. As indicated, the user interface 500 comprises a display area 502 in response to a user clicking "Envelope View" 501 on the left panel of user interface 500. Display 502 can also be presented to a user when he clicks the selected virtual mail folder in 402 of FIG. 4 (in this example, virtual mail folder from Joe Blowe). As shown, two virtual envelopes containing new emails from Joe Blowe are displayed in 502 along with related information shown below the envelopes, such as Date & Time, From, To, CC, Subject, Status, etc. Since both the sender and recipient are HotTerrain members, their physical address information is automatically inserted on the envelope. If the user did not input his address information when registering, he can simply click "Edit" button 503 to add the addresses on the envelope and the system automatically updates his address in his address book. Also, addresses can be automatically inserted to the user's pre-selected address stickers.

The user can select one or multiple envelopes in 502, and click "Envelope Back View" button 504 to see the back of the envelopes that may contain special or graphical designs or stickers. Other tasks the user can perform includes but are not limited to click "Cut Stamp" button 505 to cut selected stamps that are automatically sent to his stamp folder under "My Assets" (see details in FIG. 11), click "Cut Sticker" button 506 to cut selected stickers that are automatically sent to his sticker folder under "My Assets", and click "View Stamps & Stickers" button 507 to see enlarged pictures of stamps and stickers and related information. The advertisement area 509 is elaborated in FIG. 33 and FIG. 40 below.

Also, the user can click "e-card View" (not shown) and flip an e-card(s) to see the designs and messages on its back, and "Cut" its e-stamps or e-stickers (not shown) to have them automatically sent to a stamp folder or a sticker folder in the user's "My Assets".

Figure 6:
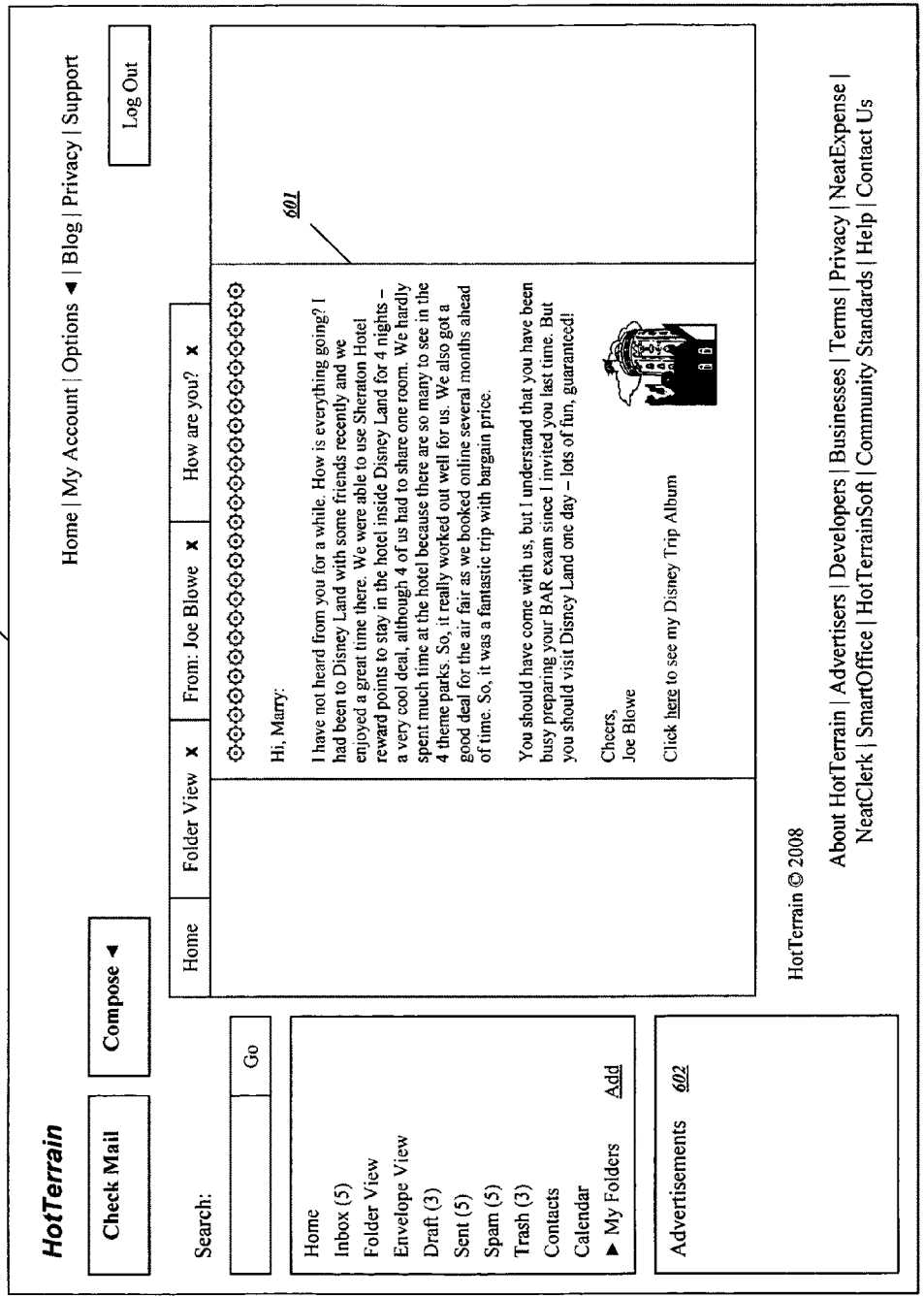
FIG. 6 is an exemplary illustration of Virtual Mail Letter View that can be presented to the user.

With reference now to FIG. 6, therein is depicted an exemplary illustration of Virtual Mail Letter View user interface 600 in response to user clicking "Letter View" button 508 of FIG. 5 or to user clicking the selected envelope image in 502 of FIG. 5. As indicated in 601, the email is presented to the user in a letter format, which may have a template design. User can choose function buttons (not shown) to reply, forward, print, or delete the letter email. The advertisement area 602 is elaborated in FIG. 33 and FIG. 40 below.

Now, referring to FIG. 7, therein is presented an exemplary illustration of Virtual Mail Inbox View user interface 700. As indicated, when the user clicks "Inbox" in 701, an inbox display of the virtual mails is presented to the user in 702. The "Stamps" and "Sticker" columns of 702 indicate their status. For example, whether the virtual mail's stamp is already cut or new, a mark (e.g., *) indicating if this a collector stamp or collector sticker, and whether there is a sticker(s) associated with the email, so that the user can make quick decisions to cut the collector stamps and stickers or ignore virtual mails with standard stamps and stickers that have no collector value.

The user can select multiple emails in the Inbox to cut their e-Stamps and/or e-Stickers, which are automatically sent to the user's Stamp and Sticker folders in his "My Assets". The user can select an email and click "Reply" dropdown button 704 to reply to all or just to the sender, or click "Forward" button 705 to forward the email to someone else. The user can also select multiple emails and click "Print" button 706 to print all selected emails at one time, or click "Delete" button 708 to deleted selected emails at one time. The user can also click the "Compose" button 707 to create a new email. The advertisement area 709 is elaborated in FIG. 33 and FIG. 40 below.

Figure 8:
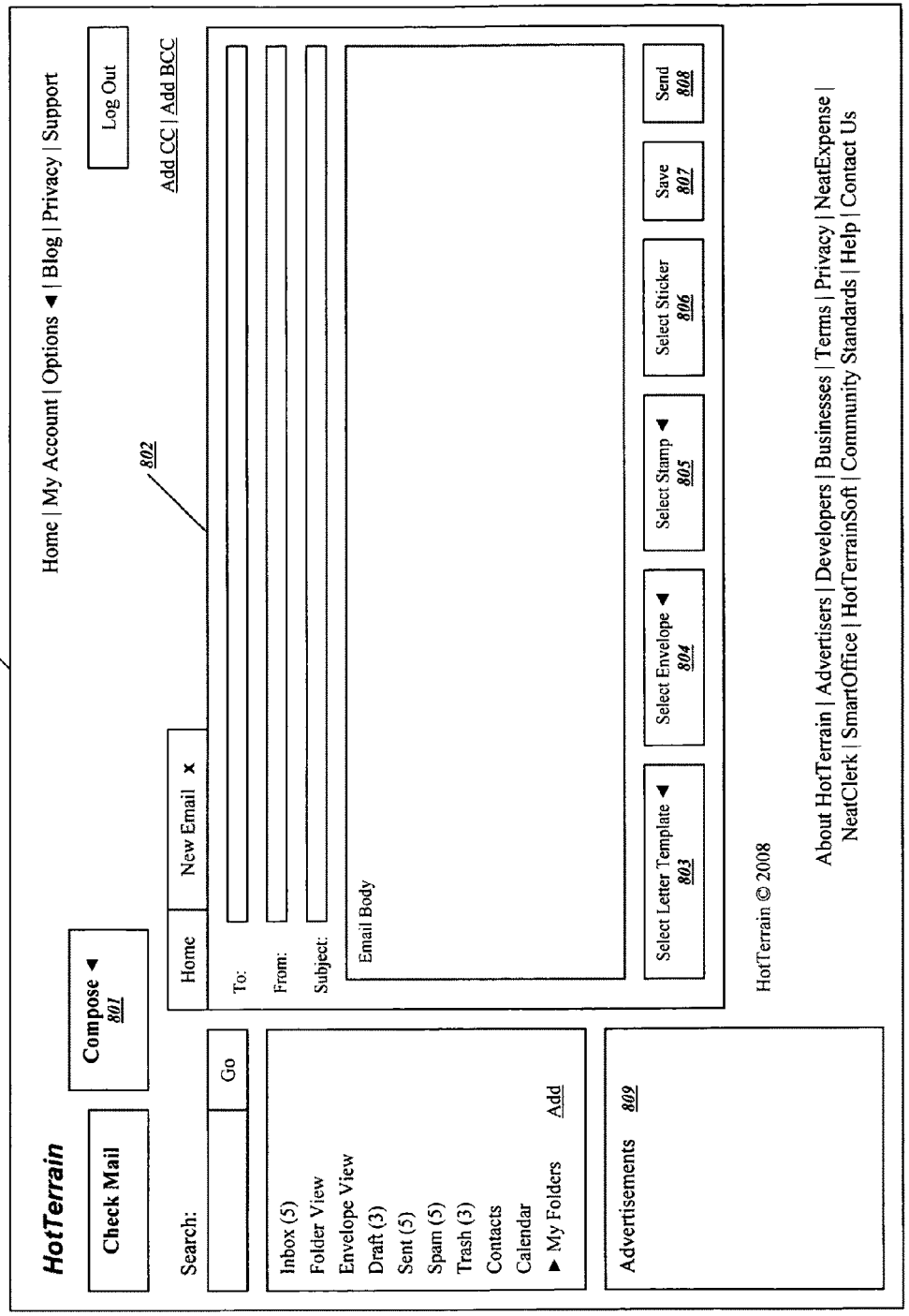
FIG. 8 is an exemplary illustration depicting how to create a virtual mail.

Referring to FIG. 8, therein is presented an exemplary illustration depicting how to create a virtual mail. The display 800 of HotTerrain user interface contains "Compose" button 801, of which, once clicked, triggers the display area of 802 for a user to input recipient email address, subject, and etc., and compose his email in the email body as what he normally does in an email system. He then has the options of selecting a letter template, envelope, stamp, and sticker (optional) available in HotTerrain virtual mail system for his email by clicking "Select Letter Template" button 803, "Select Envelop" button 804, "Select Stamp" button 805, "Select Sticker" button 806. He can save the draft of his email by clicking "Save" button 807. If he does not select any template, envelope, stamp and sticker (optional), the system will assign a standard template, envelope and stamp to his email when he clicks "Send" button 808. The advertisement area 809 is elaborated in FIG. 33 and FIG. 40 below.

Figure 9:
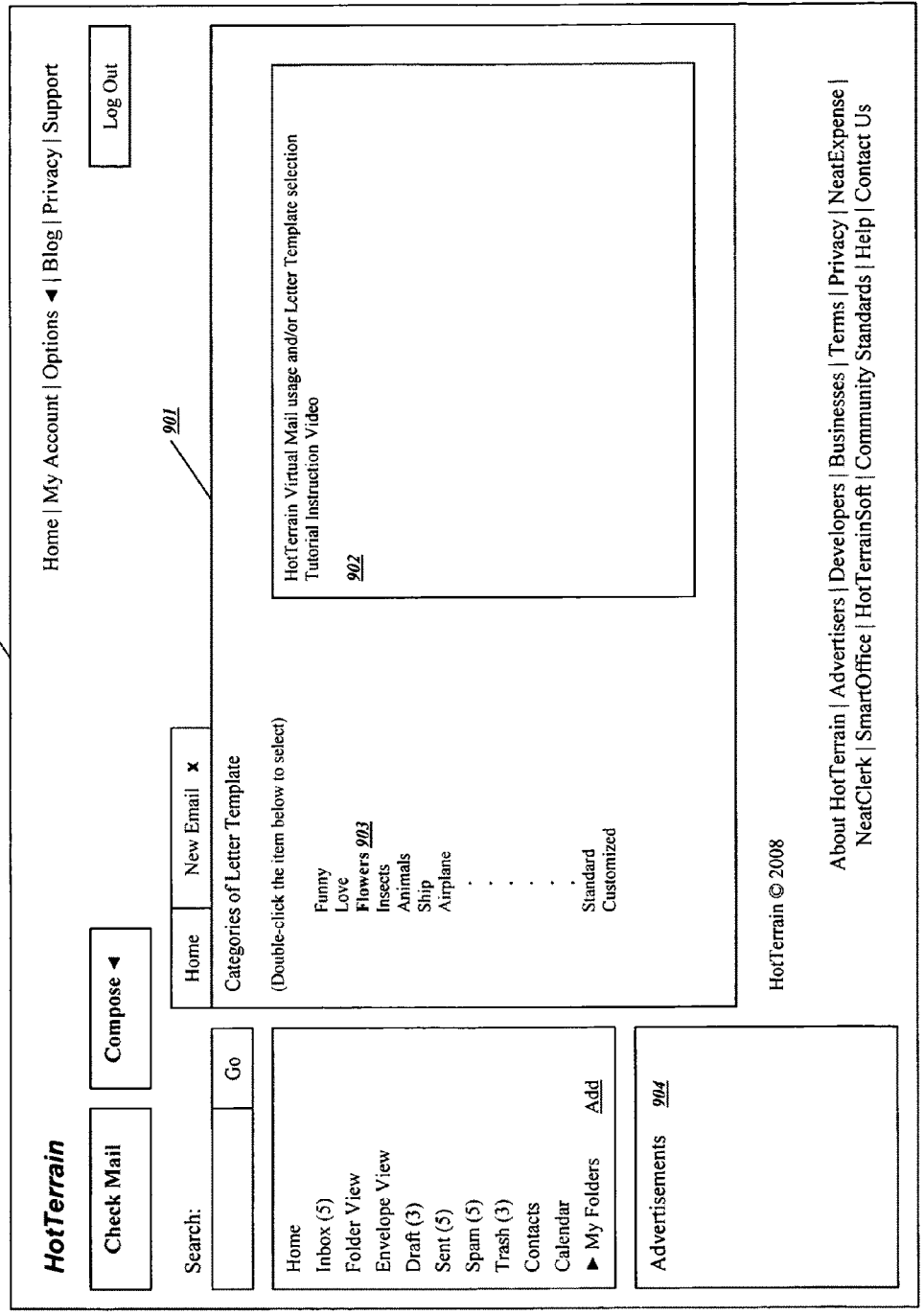
FIG. 9 is an exemplary illustration depicting how to select a letter template category for a virtual mail.

FIG. 9 is an exemplary illustration depicting how to select a letter template category for a virtual mail when the user clicks dropdown menu arrow ◄ of 803 to select a letter template in FIG. 8. As indicated, the action leads to the display of 900, which contains an area for Letter Template Categories 901. In this exemplary case, the user selects the category of "Flowers" 903. The display area 901 may also contain instructions or tutorial video 902 about the easy steps to use virtual mail, including how to select letter template, envelope, stamp and sticker. The advertisement area 904 is elaborated in FIG. 33 and FIG. 40 below.

Figure 10:
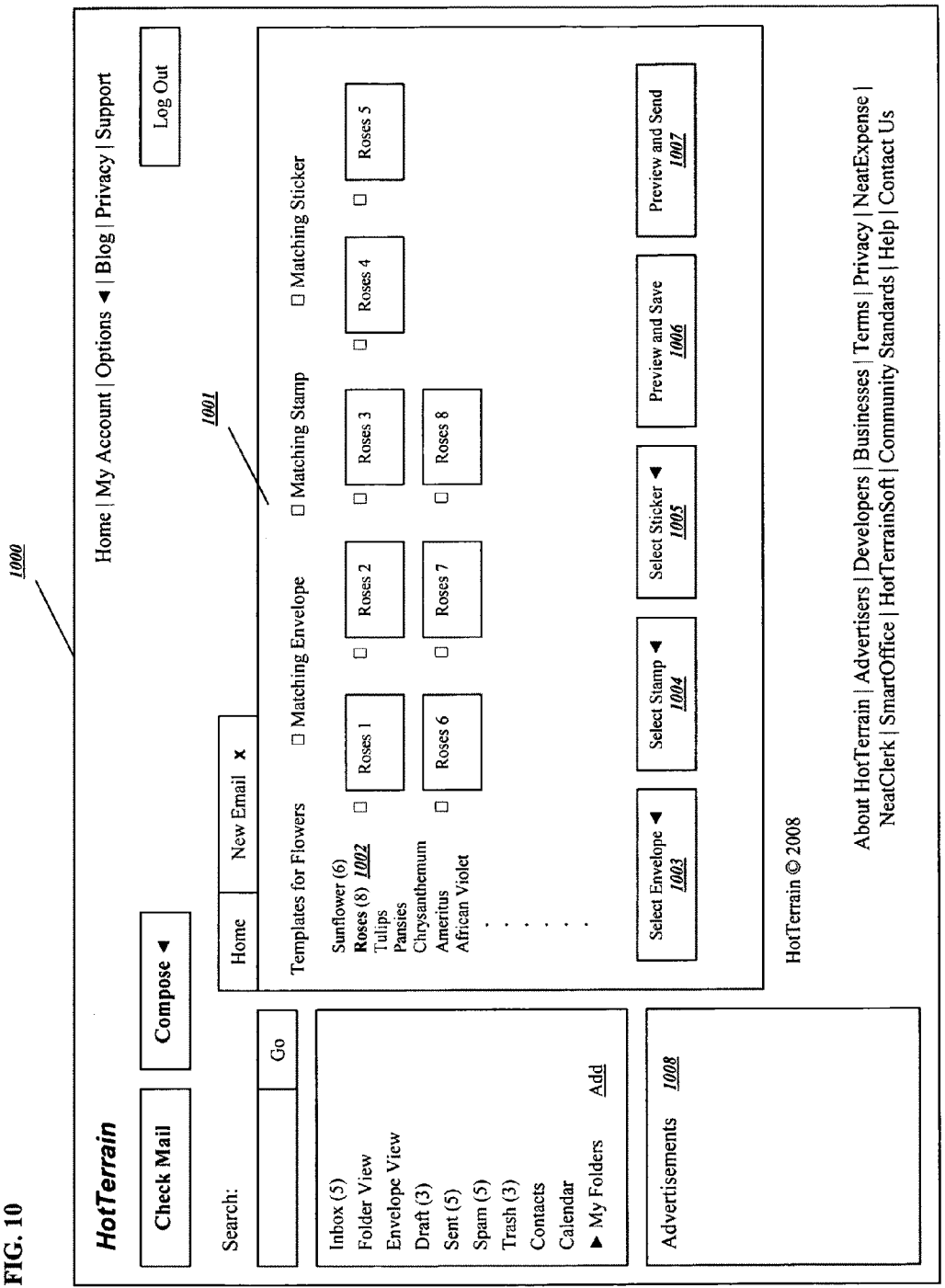
FIG. 10 is an exemplary illustration depicting how to select a specific letter template and matching envelope, stamp, and sticker.

FIG. 10 is an exemplary illustration depicting how to select a specific letter template and matching envelope, stamp, and sticker (optional). As indicated, a user interface 1000 is presented to the user that contains display area of 1001 to display different designs of the template that the user selects. In this exemplary case, the user selects "Roses" 1002 and there are 8 designs displayed in 1001 for the user to select. The user can simply tick "Matching Envelope", "Matching Stamp", and "Matching Sticker" (optional) on top of display 1001 to have the system automatically assign the same design of envelope, stamp and sticker (optional) to his email. Or if he doesn't want matching envelope, stamp, and sticker, he has the option of picking different ones by clicking "Select Envelope" button 1003, "Select Stamp" button 1004, or "Select Sticker" button 1005. Once selected, the user can preview and save his virtual mail by pressing "Preview and Save" button 1006, and make modification as necessary.

The display of his virtual mail after he presses "Preview and Save" button 1006 is similar to the display of "Envelope View" and "Letter View" illustrated FIG. 5 and FIG. 6, respectively. Once he is satisfied, he can press "Preview and Send" button 1007 to send out his virtual mail. The sender can request the recipient to send back his stamp if he is a stamp collector. Special marks can be inserted to the "Used" e-stamps to differentiate them from the "Unused" ones. "Used" e-stamps are those that go through delivery process of virtual mails to reach recipients' mailbox. "Unused" e-stamps are those new e-stamps acquired by the user by have not been attached to virtual emails and sent to recipients.

Virtual Mail system will be very appealing to people who can use it to compose creative letters, love letters, fun letters, etc., and at the same time, collecting e-stamps, e-stickers and corresponding physical stamps and stickers. It can also be used by people to create formal letters for job interviews, newsletters, and office memos, etc. Companies can also send virtual emails with collector stamps to a targeted audience for product promotion to avoid the common scenario that users ignore or delete promotional emails sent from existing email systems without opening. The advertisement area 1008 is elaborated in FIG. 33 and FIG. 40 below.

Figure 11:
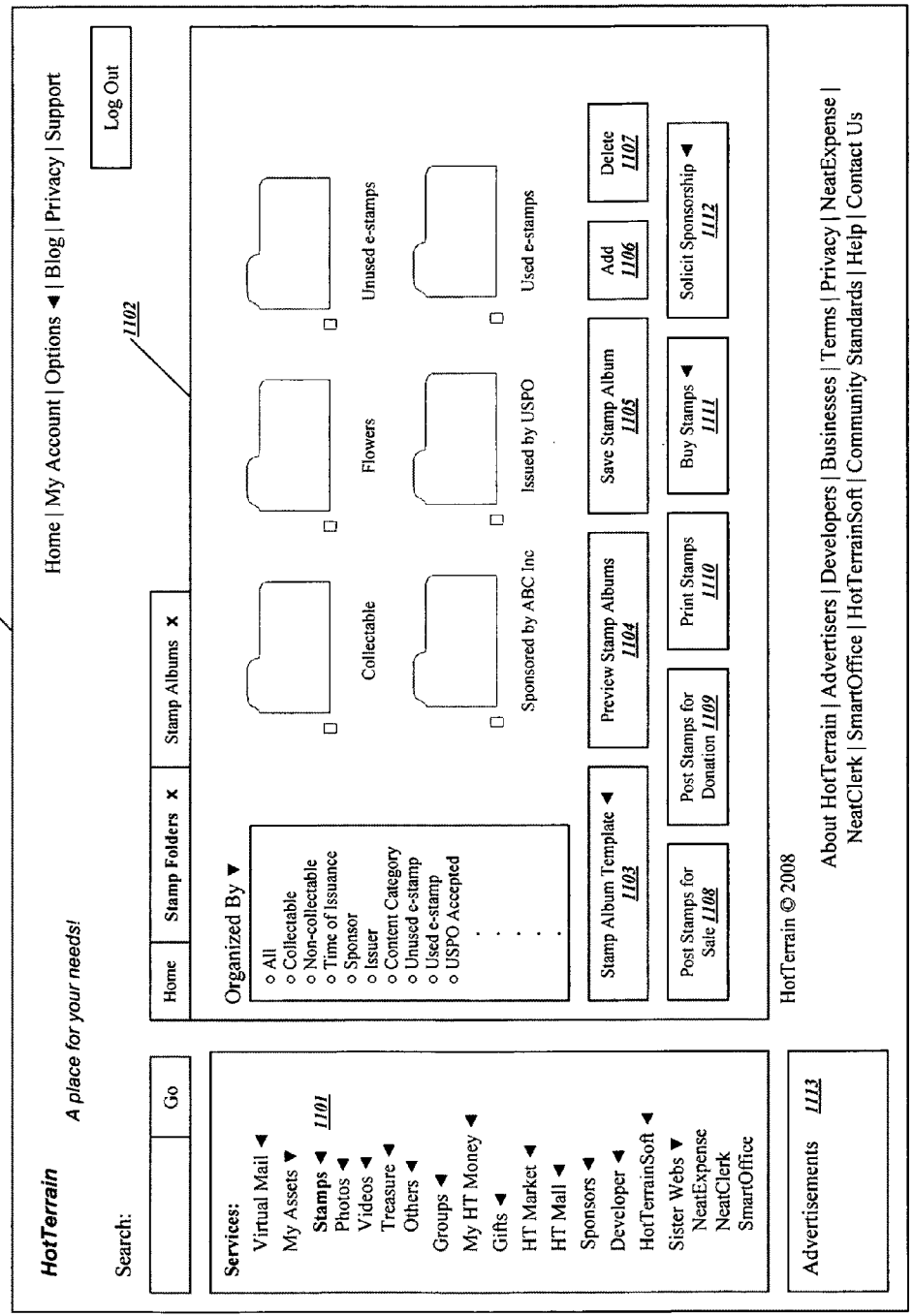
FIG. 11 is an exemplary illustration depicting the automatic distribution of e-stamps that a user selected into respective stamp folder that can be presented to the user under "My Assets".

Now, referring to FIG. 11, therein is presented an exemplary illustration depicting the automatic distribution of e-stamps that the user selected into respective stamp folders under his "My Assets". As indicated in display 1100, once the user selects "Stamps" 1101 under "My Assets" application, the system displays his stamps folders in display area 1102. Stamps that he cuts previously are automatically distributed inside respective folders. The system also allows the user to drag and drop stamps from one folder to another.

Within display 1102, the user can select each stamp folder and turn it into a stamp album by pressing "Stamp Album Template" button 1103 to select the stamp album. The user can preview the selected stamp album by pressing "Preview Stamp Album" button 1104 and make necessary changes if he does not like the design. When he is satisfied, he simply presses "Save Stamp Album" button 1105 to save the stamp album. The user is allowed to create customized stamp folders and to send his "cut" stamps to those folders. He can create such folders by pressing "Add" button 1106. The user can also delete a stamp folder by pressing "Delete" button 1107.

Other activities the user can perform include posting stamps for sale by selecting a stamp folder and pressing "Post Stamps for Sale" button 1108. His stamp folder containing stamps that he wants to sell will be posted onto HT Market. The user can also solicit sponsorship for posting stamps for sale to benefit the buyer, so that his sale is more appealing to the buyer. To solicit sponsorship, he simply needs to press "Solicit Sponsorship" button 1112. Here the user has options to solicit from different groups of sponsors (e.g., all sponsors, my favorite sponsors, or my friends) by click the dropdown menu arrow ◀ (when clicked, it would turn the pointer down ▼ to show menu options). Once a group of sponsors is selected and the user selects sponsorship criteria, the system automatically assigns sponsorship if the user qualifies.

The user can also select the option of "Request Sponsorship" from the dropdown menu (not shown) to request specific sponsorship. Once "Request Sponsorship" is selected, a list of sponsors appears for the user to select a specific sponsor for sponsorship. A search function may also be provided for the user to find specific sponsor(s). The functions of "Solicit Sponsorship" buttons in FIG. 12 to FIG. 15, FIG. 17, FIG. 19, FIG. 23, FIG. 24 to FIG. 27 are similar to those of button 1112 of FIG. 11.

The user can also post stamps for donation by selecting a stamp folder and pressing "Post Stamps for Donation" button 1109. The system will prompt him to select if he wants to donate to a person, a charity organization or to a donation pool. If he picks donate to a friend (e.g., the friend's HotTerrain address), the stamp folder he selected will disappear from his account and appear on his friend's My Assets within HotTerrain with notification of the donation. If he picks a charity organization, similarly, the stamp folder will be sent to the charity organization's My Assets within HotTerrain Charity account with notification of the donation. If he picks donation pool, the stamp folder is added to a list of donated items for interested individuals or entities to obtain.

Other features include but not limited to the user selecting a stamp folder and pressing "Print Stamps" button 1110 to print all the e-stamps inside the folder at the same time, and pressing "Buy Stamps" button 1111 to buy both electronic and physical stamps. Again, the user can solicit sponsorship for buying stamps from sponsors by pressing "Solicit Sponsorship" button 1112. The advertisement area 1113 is elaborated in FIG. 33 and FIG. 40 below.

Figure 12:
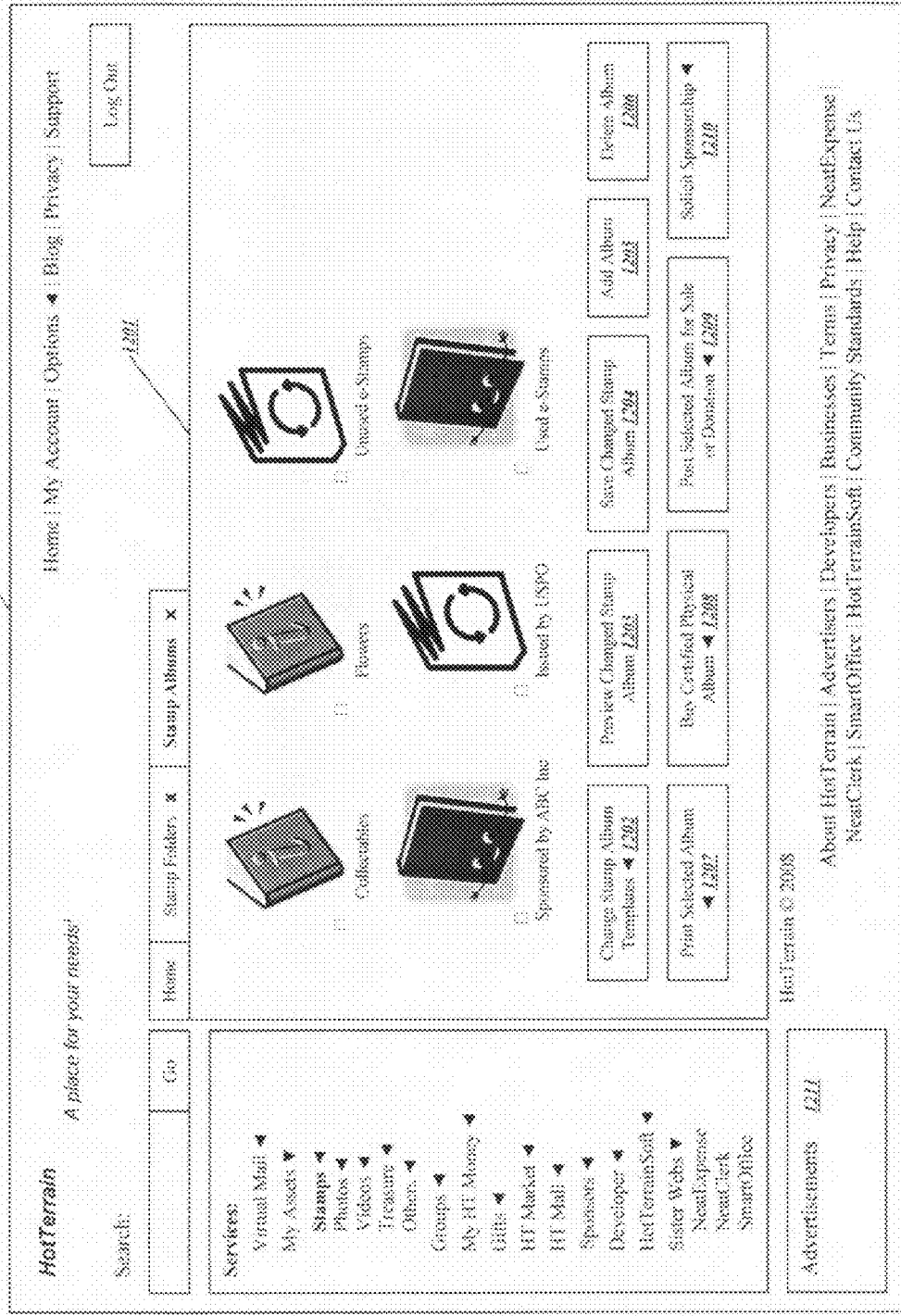
FIG. 12 is an exemplary illustration depicting stamp album view and what the user can do with his stamp albums.

With reference now to FIG. 12, therein is depicted an exemplary illustration of stamp album view and what the user can do with his stamp albums. As indicated, the user interface 1200 contains a display area 1201 that presents stamp albums the user selected for his stamp folders. The user can click "Change Stamp Album Template" button 1202 to change the album template to another design. Once changed, the user can press "Preview Changed Stamp Album" button 1203 to preview the new album and press "Save Changed Stamp Album" button 1204 to save it. The user can also create a new stamp album by pressing "Add Album" button 1205, and delete any album by selecting it and pressing "Delete Album" button 1206. The user can also highlight the album in display 1201 and press "Delete" key on his keyboard to delete the album.

Other functions that the user can perform include but not limited to printing a selected album, buying a certified physical album, and posting selected album for sale or donation. To print a selected album, the user simply selects the album he wants to print, and presses "Print Selected Album" button 1207. The user may be presented with the options to print the stamps or empty album (with no stamps), or print both. A certified physical album means that it bears identification mark(s) to indicate the authenticity of the user's stamp album to facilitate the transfer, be it sale or donation of the physical album. To buy the certified physical album, the user simply selects the stamp album that he wants to buy the physical copy and presses "Buy Certified Physical Album" button 1208. The user may be presented with the options of buying certified physical stamps, certified empty album, or both.

To sell or donate his album(s), the user just needs to select the album(s) and press "Post Selected Album for Sale or Donation" button 1209 to pick the action he wants, and his album(s) will disappear from his account and appear in the buyer's or donation recipient's account under "My Assets".

Similarly, the user can solicit sponsorship for buying certified physical albums or posting selected albums for sale from sponsors by pressing "Request Sponsorship" button 1210. The advertisement area 1211 is elaborated in FIG. 33 and FIG. 40 below.

Figure 13:
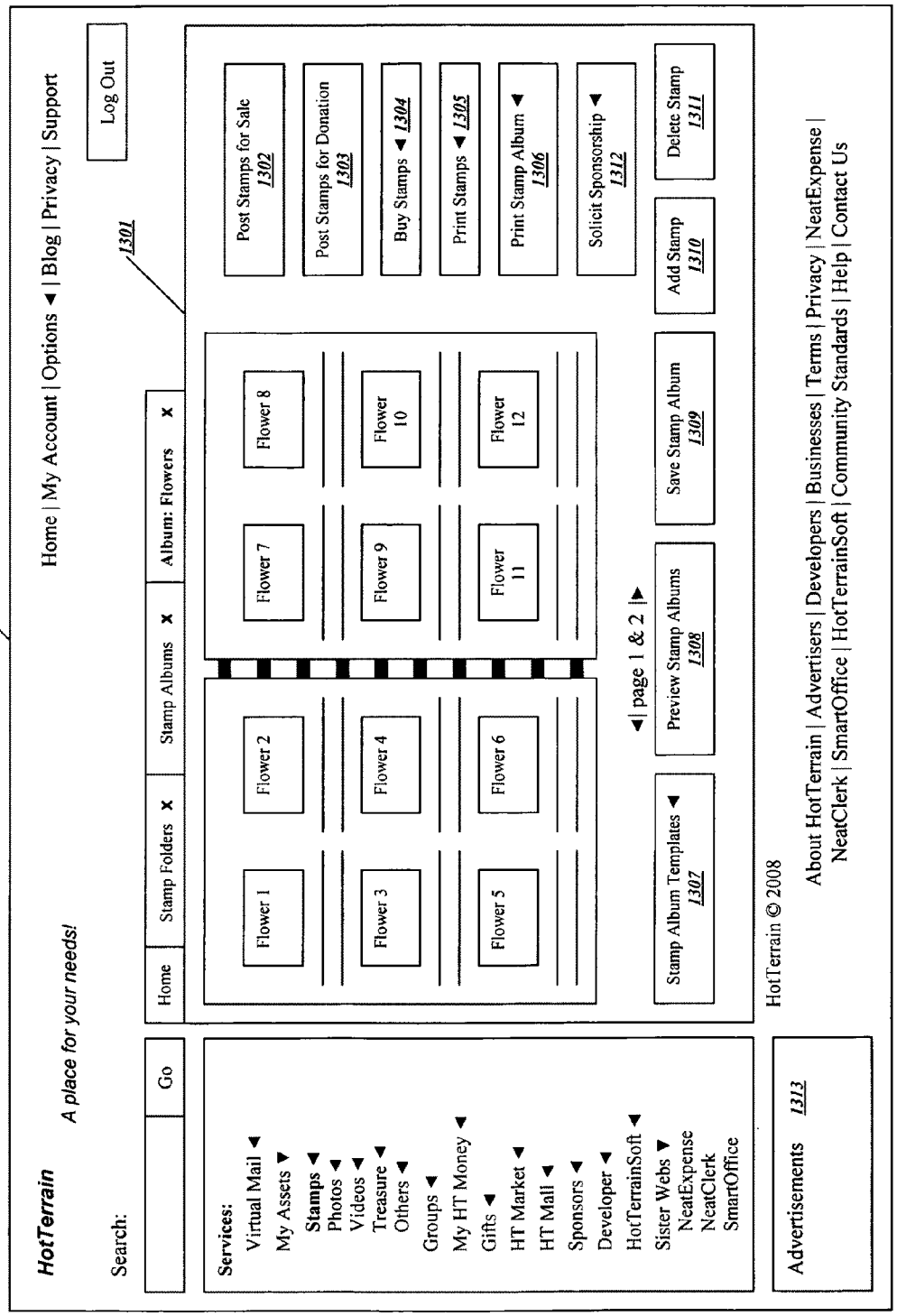
FIG. 13 is an exemplary illustration of a stamp album inside view and what the user can do with his stamp album and stamps inside.

Referring to FIG. 13, therein is presented an exemplary illustration of a stamp album inside view and what the user may do with his stamp album and stamps inside. As indicated, user interface 1300 contains a display area 1301 to display the inside view of a stamp album in response to clicking a stamp album image in 1201 of FIG. 12 or selecting a stamp album image and pressing a "View Stamps Inside" button (not shown on FIG. 12). The stamp album inside view presents all stamps in the album that are automatically sorted. The user can swap locations of the stamps to his preference and press the page forward or backward icon under the stamp album to view other pages. Functions that the system offers include but are not limited to the following:

The user can select certain stamps and press "Post Stamps for Sale" button 1302 to put them on the HT Market for sale, or press "Post Stamps for Donation" button 1303 to donate them to friends or charity. The user can press "Buy Stamps" button 1304 to buy e-stamps with or without physical stamps and/or associated album, or even post office stamps (e.g., stamps from USPO). Similarly, the user can solicit sponsorship for posting stamps for sale and buying stamps from sponsors by pressing "Solicit Sponsorship" button 1312.

In addition, the user can select certain stamps and press "Print Stamps" button 1305 to print out physical stamps, or select the stamp album on display and press "Print Stamp Album" button 1306 to print the empty album, or the album with stamps.

If the user does not like the stamp album on display, he can press "Stamp Album Templates" button 1307 to select a replacement, and press "Preview Stamp Album" button 1308 to preview the inside design of the album. Once satisfied, he can press "Save Stamp Album" button 1309 to save it. The user can also press "Add Stamp" button 1310 to add stamps from other folders or albums to the album on display. He can also press "Delete Stamp" button 1311 to delete stamps in the displayed album.

The stamp folder and stamp album methods disclosed above can also be applied to photo albums, love letter albums, collection albums, resort ticket album, product packaging album, and design card album, etc.

For "Videos" under "My Assets", a user can post and record videos by accessing the "Videos" web page under "My Assets" and click "Post Video" (not shown) or "Record Video" (not shown) button. The user can solicit or request sponsorship for his video(s). His HT score and popularity of his video(s) are key factors in obtaining sponsorship from sponsor(s). Once his sponsorship request is approved, the user gets incentive(s) provided by the sponsor(s), and in exchange, the SponsorAd(s) is displayed at the beginning, during, an/or end of the user's video playing whenever someone activated the user's video(s) for playing. The SponsorAd(s) may be displayed for a limited time frame with the user's video(s) (e.g., 3 months). Upon expiration of SponsorAd(s), the user can renew the same SponsorAd(s) to obtain incentive(s) again if he still qualifies, or he can solicit or request new sponsorship(s) for his video(s). The SponsorAd(s) maybe any type of online advertisement, including but not limited to word, graphics, sound and video advertisements.

The user can support a charity organization by adding a charity's advertisement(s) at the beginning, during, and/or end of his video(s) playing whenever someone activated the user's video(s) for playing. In addition, a charity can solicit or request sponsorship to display the charity's advertisement(s) at the beginning, during, and/or end of a user's video(s) playing whenever someone activated the user's video(s) for playing.

Figure 14:
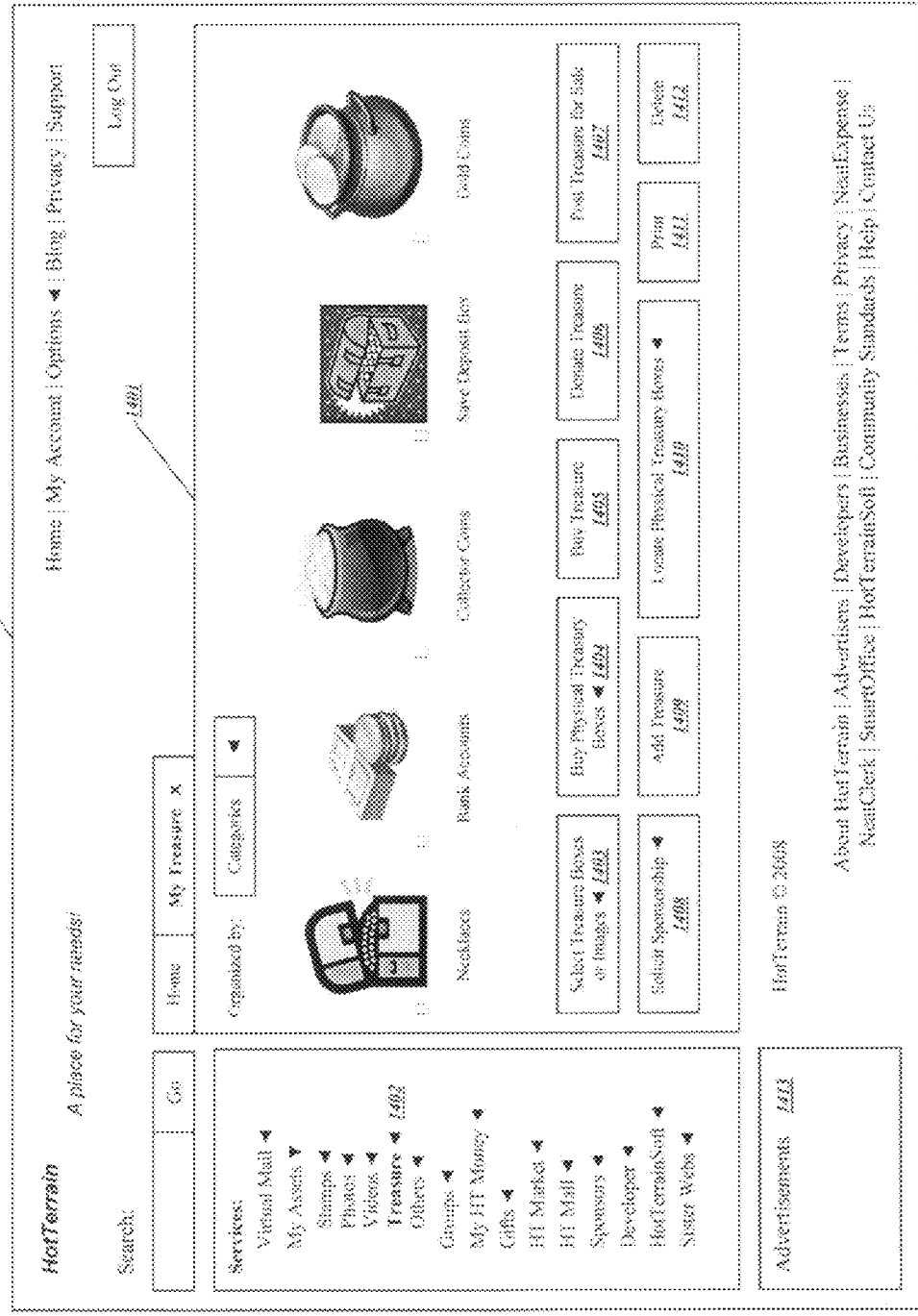
FIG. 14 is an exemplary illustration of the user's treasure under "My Assets" that can be presented to the user.

Now, referring to FIG. 14, therein is presented an exemplary illustration of the user's treasure under "My Assets" and what the user can do with his treasure. As indicated, the user interface 1400 comprises a display area 1401 to display the image view of his treasure holder (an object to "hold" his treasure) in response to the user clicking "Treasure" 1402 under "My Assets" on the left panel of user interface 1400. The user's treasure can be automatically organized by categories or other criteria. What the user can do with his treasure includes but not limited the following:

The user can change the look of the treasure holder image by selecting the treasure box/holder image and pressing "Select Treasure Box or Image" button 1403 to change it to another look. The user can buy the physical treasure box in HotTerrain by pressing "Buy Physical Treasure Box" button 1404 to buy selected treasure boxes with or without treasure inside. The user can also buy treasure by pressing "Buy Treasure" button 1405 to select treasure items from a list and the system automatically adds the treasure items into the selected treasure box/holder image upon purchasing. The user can donate his treasure boxes/holders and/or treasure items inside to individuals or charity by pressing "Donate Treasure" button 1406. The user can also post his treasure boxes/holders and or treasure items inside for sale by pressing "Post Treasure for Sale" button 1407 to automatically post them to the HT Market for sale. The user can solicit sponsorship for buying physical treasure box and buying treasure. The user can also solicit sponsorship for posting treasure for sale to benefit the buyer, so that his sale is more appealing to the buyer. To solicit sponsorship, he simply needs to press "Solicit Sponsorship" button 1408.

The system also allows the user to manage his treasure in the following ways: 1) press "Add Treasure" button 1409 to input existing treasure that he posses to keep a tracking log for himself; 2) press "Locate Physical Treasure Boxes" button 1410 to keep a tracking log of locations that he stores his treasure; 3) press "Print" button 1411 to print lists of his treasure; 4) press "Delete" button 1412 to delete a record of his treasure. The advertisement area 1413 is elaborated in FIG. 33 and FIG. 40 below.

Also, HotTerrain allows the user to view their bank accounts balances, such as by clicking the image of "Bank Accounts" in the display 1401. Such bank accounts include but are not limited to checking, saving, money market, CD, etc. Data about the users' bank accounts is automatically fed to HotTerrain on a scheduled basis. Another type of treasure may include user investments (not shown). Again, users' investment account data can be fed to HotTerrain on a schedule basis so that the user will have an overall view of his treasure. User may need to provide his banks and investment companies his HotTerrain address, so that his bank and investment account information can be presented to him in a centralized location.

With reference now to FIG. 15, therein is depicted an exemplary illustration of the contents inside a selected treasure box and functionalities available to a user. As indicated, the user interface 1500 comprises a display area 1501 of detailed information of treasure items in response to the user clicking the "Necklace" treasure box image in 1401 of FIG. 14, or user selecting the "Necklace" treasure box image and clicking "View Treasure Inside" button (not shown on FIG. 14). The detailed information of treasure items includes but not limited to name of the item, picture, description, purchase price, market price, source, color, etc.

The user can add his existing treasure items, in this particular example, other necklaces he posses to the list by clicking "Add to Treasure Box" button 1502, and additional rows will be provided for him to input information about the added items. The user can edit the contents of his treasure item list by pressing "Edit Contents" button (not shown). The user can also buy treasure by pressing "Buy Treasure and Add to List" button 1503 to select other on sale necklaces from a list, HT Market or HT Mall to buy. He can also select necklaces on his list and press "Sell Treasure" button 1504 to post his necklaces for sale on HT Market (the system will prompt him to enter selling information). Similarly, the user can solicit sponsorship for buying treasure and selling treasure from sponsors by pressing "Solicit Sponsorship" button 1505.

Other features that the system allows the user to do include but are not limited to give his treasure to someone and donate his treasure to charity. He simply presses "Gift to Someone" button 1506 to give out his treasure item (e.g., a necklace) to a friend or relative. Once the recipient receives the physical item and clicks accept gift in the recipient's account, the necklace entry will disappear from the user's treasure item list. Similarly, to donate to a charity, the user simply selects the item for donation and presses "Donate to Charity" button 1507 to donate. Notification and confirmation messages will be exchanged between the user and the charity during the donation process. The advertisement area 1508 is elaborated in FIG. 33 and FIG. 40 below.

Figure 16:
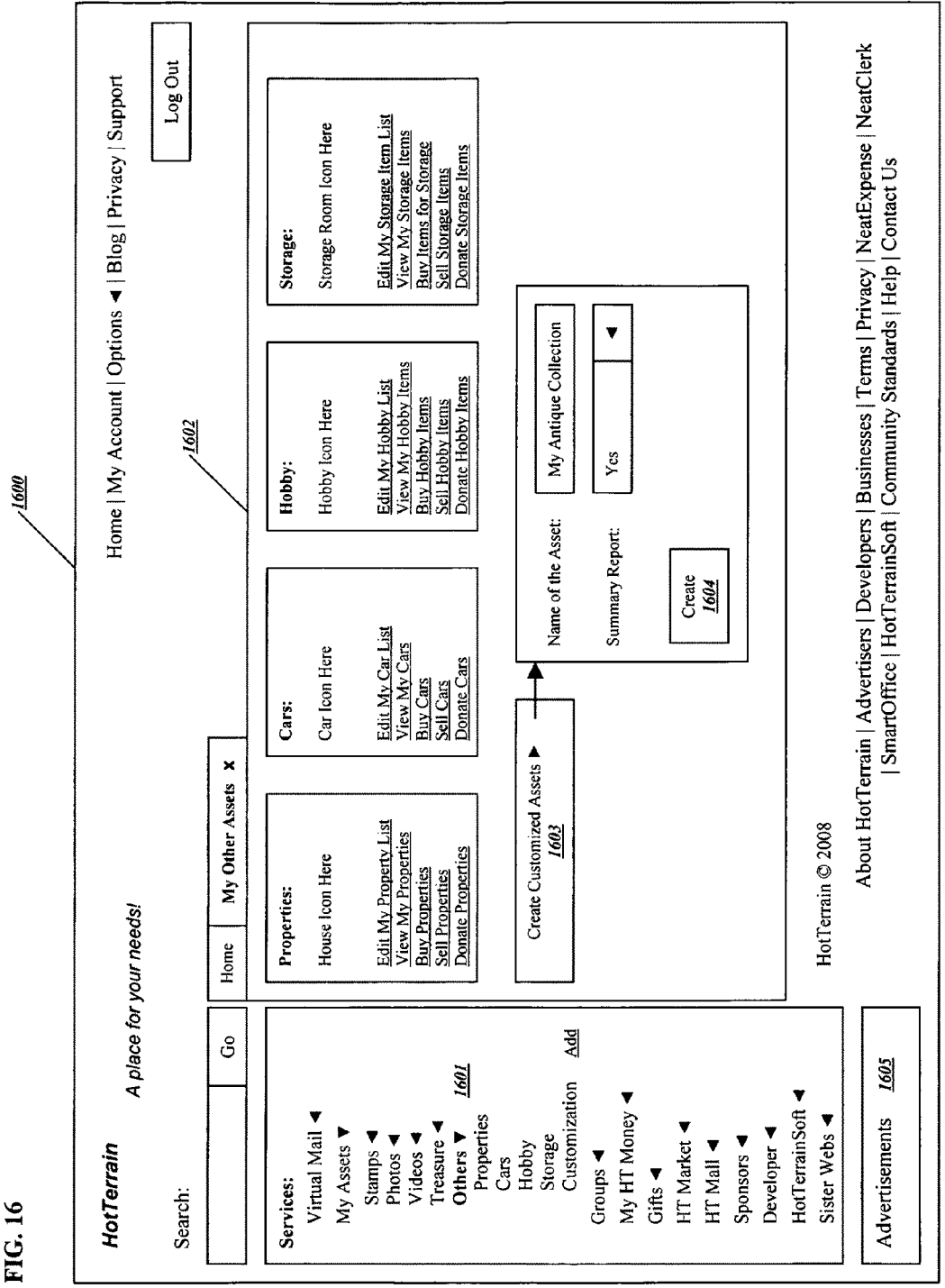
FIG. 16 is an exemplary illustration of the contents inside "Others" category of the user's "My Assets" and how he can create new category assets inside "Others".

Referring to FIG. 16, therein is presented an exemplary illustration of the contents inside "Others" category of the user's "My Assets" and how he can create new category assets inside "Others" to manage his other assets. As indicated, the user interface 1600 comprises a display area 1602 that presents the other assets sub-categories in response to the user pressing "Others" 1601 under "My Assets" on the left panel of user interface 1600. In this particular example, the user has "Properties", "Cars", "Hobby", and "Storage" sub-categories that organize and manage his other assets.

For each sub-category, the system allows him to perform several functions include but not limited to "Edit the List", "View the List", "Buy", "Sell", and "Donate". The user can also create customized sub-categories by pressing "Create Customized Assets" 1603, inputting information, and pressing "Create" button 1604 to set up. The advertisement area 1605 is elaborated in FIG. 33 and FIG. 40 below.

With reference now to FIG. 17, therein is depicted an exemplary illustration of the contents inside "Properties" sub-category and functionalities available to the user. As indicated, the user interface 1700 comprises a display area 1702 to display the contents of "Properties" sub-category in response to the user pressing "Properties" 1701 under "My Assets" on the left panel of user interface 1700, or the user clicking the properties icon/image in 1602 of FIG. 16. Once displayed, the user can select properties, and click "Lease this property" button 1703 to list the properties for rent in HT Market. The user can look for rental properties to rent by pressing "Look for Rental Property" button 1704. The user can press "Buy Property and Add to List" button 1705 to buy more property and press "Sell Property" button 1706 to sell. Similarly, the user can request sponsorship for all these activities from sponsors by pressing "Solicit Sponsorship" button 1707.

Other features that the system allows the user to do include but are not limited to pressing "Gift to Someone" button 1708 to give out the property to someone, pressing "Donate to Charity" button 1709 to donate the property to charity, an pressing "Edit Contents" button (not shown) to edit the contents of the property list. The advertisement area 1710 is elaborated in FIG. 33 and FIG. 40 below.

In order not to obscure the present invention, functionalities available for charity organizations are not explicitly illustrated. However, those skilled in the art will appreciate that such functionalities include but are not limited to allow charities to collect donations, solicit/request sponsorship, issue donation receipts, cut down administration cost of counting donated cash and checks and manual reconciliation because cash and check donations are now replaceable by HT money donation, which is exchangeable to real money.

The similar functionalities disclosed for "Properties" apply to other sub-categories, such as "Cars", "Hobby", "Storage", etc. The system provides related reports such as current asset detail report, ins and outs reports, asset summary reports, etc., for the user to manage his assets.

Figure 18:
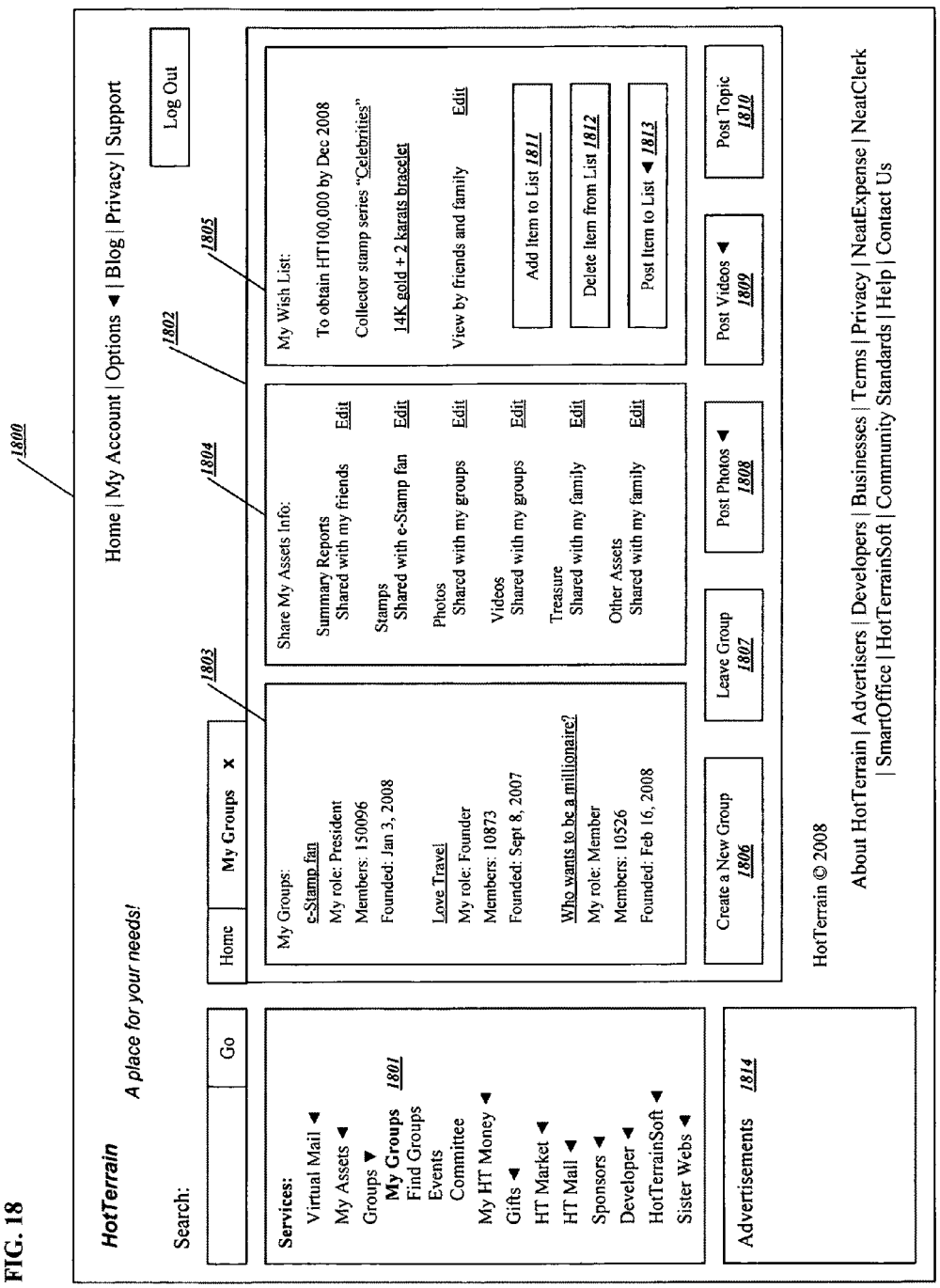
FIG. 18 is an exemplary illustration of the user's "My Groups" community webpage that can be presented to him and the features provided thereof.

Referring to FIG. 18, therein is presented an exemplary illustration of the user's "Groups" community page. As indicated, the user interface 1800 comprises display area 1802 in response to the user pressing "My Groups" 1801 on the left panel of interface 1800. For simplicity purpose, the display area 1802 consists of information related to the user's Groups 1803, the user's My Assets 1804, and the user's Wish List 1805. Those skilled in the art will appreciate that the information may be displayed in separate webpages.

For My Groups 1803, the example shows that the user joined two public groups founded by individuals and one public group founded by a company, which is one embodiment of our invention to enable entities to involve in community building with users. For area 1804, the user can share his personal information with different groups selected and he can remove or add such "Read" authority of the viewers by clicking the "Edit" link to pick group(s) from his address book or to hide a particular category of assets from anyone else's viewing.

As for Wish List 1805, the user can enter or post items he wishes to obtain and share such information with groups that he authorizes. His friends or family members who are authorized to see his wish list can obtain the digital or physical items as gifts for him. He can also solicit or request sponsorship (not shown on FIG. 18) from groups (such as all sponsors, my favorite sponsors, friends and family) to obtain the items. The user can click "Add Item to List" button 1811 to add item(s) to the wish list or select item(s) from the list and click "Delete Item from List" button 1812 to remove unwanted items. The user can also post existing items found in HotTerrain (e.g., from HT Market, HT Mall, or Gifts) to his wish list by clicking "Post Item to List" button 1813 and selecting the item(s) he wants to post. The advertisement area 1814 is elaborated in FIG. 33 and FIG. 40 below.

For simplicity, figures showing a member accessing the user's personal and "My Assets" information upon the user's permission and the creation of virtual newsletters, magazines, calendars in "Groups" are not shown. However, those skilled in the art will appreciate that functions are available: 1) for the member to transform the user's "My Assets" images into physical item(s) (e.g., convert the user's photos into a photo album by selecting an album template, and print or buy the physical photo album as a gift for the user); 2) for the user or a member of an entity to create virtual newsletters, virtual books, virtual magazines, virtual calendars, etc in "Groups" to share them with other members.

Figure 19:
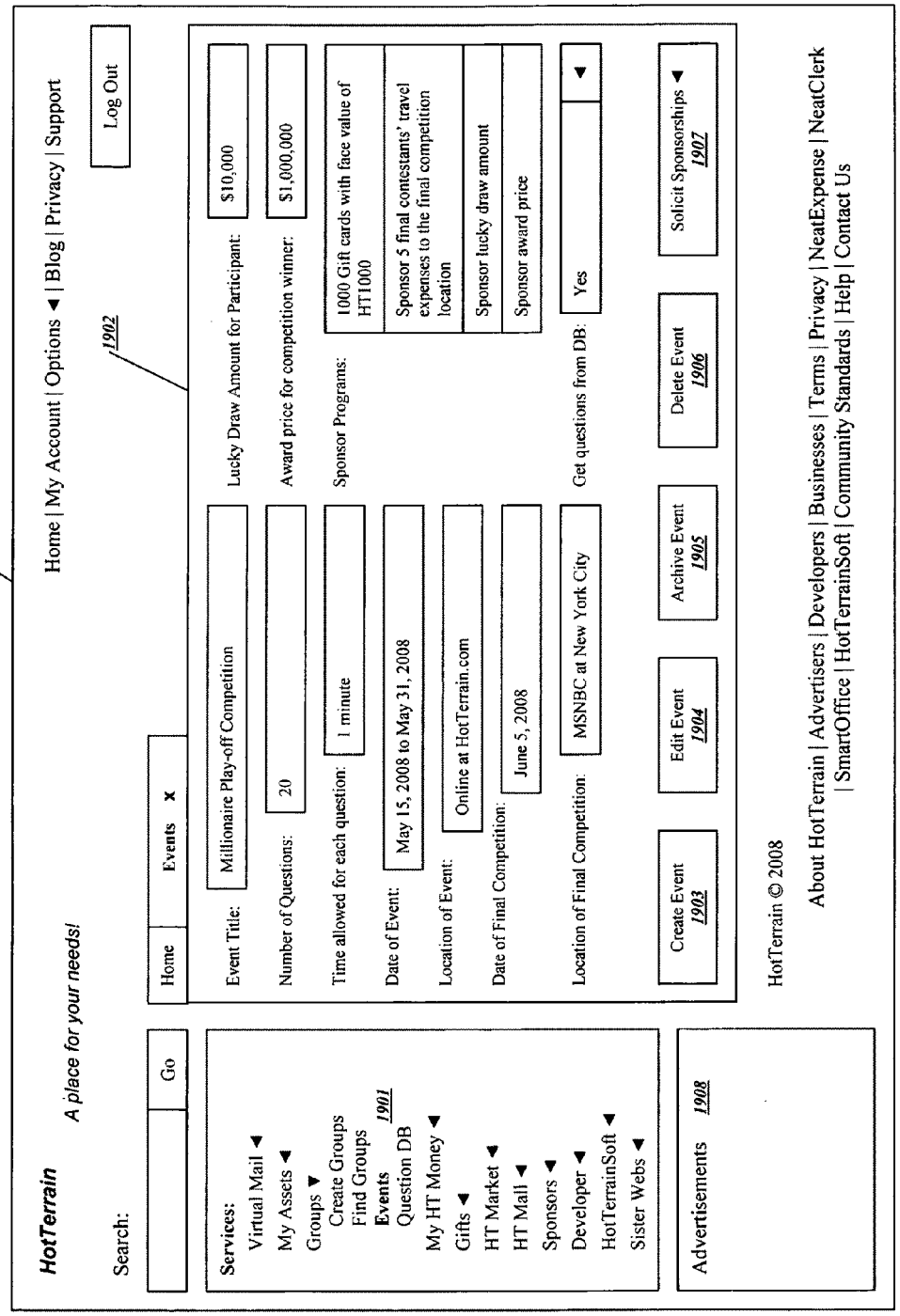
FIG. 19 is an exemplary illustration of an entity's "Events" webpage and the features provided thereof.

With reference now to FIG. 19, therein is depicted an exemplary illustration of an entity's "Events" webpage. As indicated, the user interface 1900 comprises display area 1902 in response to a staff of an entity (for example, TV station MSNBC) pressing "Events" 1901 on the left panel of interface 1900. The display area 1902 allow the staff to create an online event of "Millionaire Play-off Competition" whereby questions of the competition will be pulled from the pre-established question database within HotTerrain, or from the TV station's internal question database that interfaces with HotTerrain.

The competition allows individuals all over the places to compete online within the time frame set. The online networking system automatically assign users with different questions of the same levels of difficulties, and at the end of play-off session, automatically selects final contestants to participate in the final competition that will be broadcast live on TV and HotTerrain on the date of final competition. To attract participants, the TV station rolls out several sponsor programs for other entities (e.g., companies) to provide incentives for individuals to participate. Sponsorship can be obtained by pressing "Solicit Sponsorships" button 1907 and selecting the group of sponsors to solicit or request sponsorship.

The staff of the entity can create new event by pressing "Create Event" button 1903, modify the contents of an event by pressing "Edit Event" button 1904, archive old event by pressing "Archive Event" button 1905, and delete an unwanted event by pressing "Delete Event" button 1906. The advertisement area 1908 is elaborated in FIG. 33 and FIG. 40 below.

Now, referring to FIG. 20, therein is presented an exemplary illustration of the user's "My HT Money" summary report that can be generated automatically by the system. As indicated, the user interface 2000 comprises a display area 2001 to show the user his HT Money Summary Report in response to the user pressing "My Summary" 2002 under "My HT Money" on the left panel of the interface 2000. The report includes but are not limited to detailed information such as source of HT Money, Type, Exchange Rate, Amount, and equivalent US dollar (or other currency when the user selects by clicking the dropdown menu arrow ◄). The total of HT Money can be automatically calculated and displayed.

Features supported by the system include but are not limited to the following: 1) the user can click "Get Free HT Money" button 2003 to participate in a survey to get free HT Money or to find out ways to get free HT Money; 2) the user can click "Donate HT Money to Charity" button 2004 to donate a specified amount of HT Money that he is willing to donate to a charity organization; 3) the user can click "Give HT Money to Someone" button 2005 to give out a specified amount of HT Money to other HT members, such as his friends or relatives; 4) the user can also click "Buy HT Money" button 2006 to directly buy HT Money, and he can solicit or request sponsorship (not shown) from sponsors to obtain certain amount of HT money. The advertisement area 2007 is elaborated in FIG. 33 and FIG. 40 below.

In additional to My HT Money Summary Report, the system also provides other reports and functions for the user, including but not limited to balance report, detailed report, bank HT money, and use HT credit, etc. For example, the balance report would include beginning balance, activities during a time period and the ending balance of the user's HT Money. The detailed report would include breakdown of HT money each specific action/activity brings. The user has the option to bank or deposit a certain amount of his HT Money not in use to take the advantage of earning additional HT Money. The user can also be given a HT Money credit line to spend his HT Money first and pay back later on a installment basis.

One of the major differences between the "Gifts" section of HotTerrain and that of other websites is that the user can request sponsorship from sponsors for digital and/or physical gifts. Features of the "Gifts" section of HotTerrain are similar to those in "My Assets".

With reference now to FIG. 21, therein is depicted an exemplary illustration of the "HT Market" where a user can buy items and request sponsorship. As indicated, the user interface 2100 comprises display area 1902 in response to the user clicking "Buy" 2101 under "HT Market" section of the left panel. For simplicity, the display area 2102 does not show the list of categories of items for sale on HT Market and how the user locates the item he wants by looking at a item list under selected category or by searching for key word(s). In this particular example, the user is interested in buying an "Apple iPod" of which the information is shown on display 2102, including the seller's profile. Let's assume the seller sets the iPod as negotiable. The user who intends to buy the iPod inputs his "Desired Buying Price" in text box 2103. The system automatically sets the user's initial negotiation price at text box 2104. The user can input a rate of increment during negotiation at text box 2105.

The user can solicit or request sponsorship by selecting a group of sponsors or a sponsor to send the request to at 2106, and selecting the option of allowing the system to automatically assign him a sponsor(s) at 2107. The user also has the option of picking specific sponsor(s) at 2108 if he has a higher chance of obtaining the sponsorship. The system may display likelihood of getting sponsorship for the user's request at 2109 before he sends out the request. He can also click "View MY HT Score" button 2112 to see his current HT Score so as to evaluate his chances of winning the sponsorship. The user can also request the seller to solicit sponsorship for him as a negotiation tactic at 2110. The system may display the likelihood of getting sponsorship from seller if the seller agrees at 2111. Also, the user can give a rating and feedback on the seller's item upon receiving the item.

The user can also click "Add to My Asset Upon Purchasing" button 2113 to select the location under "My Assets" that the iPod would go into when purchased. If the user does not select, the system will automatically send it to a default location under "My Assets" and the user can relocate the item later on. The advertisement area 2114 is elaborated in FIG. 33 and FIG. 40 below.

Those skilled in the art will appreciate that the negotiation method depicted in FIG. 21 may vary, the buyer could agree to seller's "fixed price" rather than trying to lower the price. However, the buyer can still solicit sponsorship himself or ask the seller to do so for him.

Figure 22:
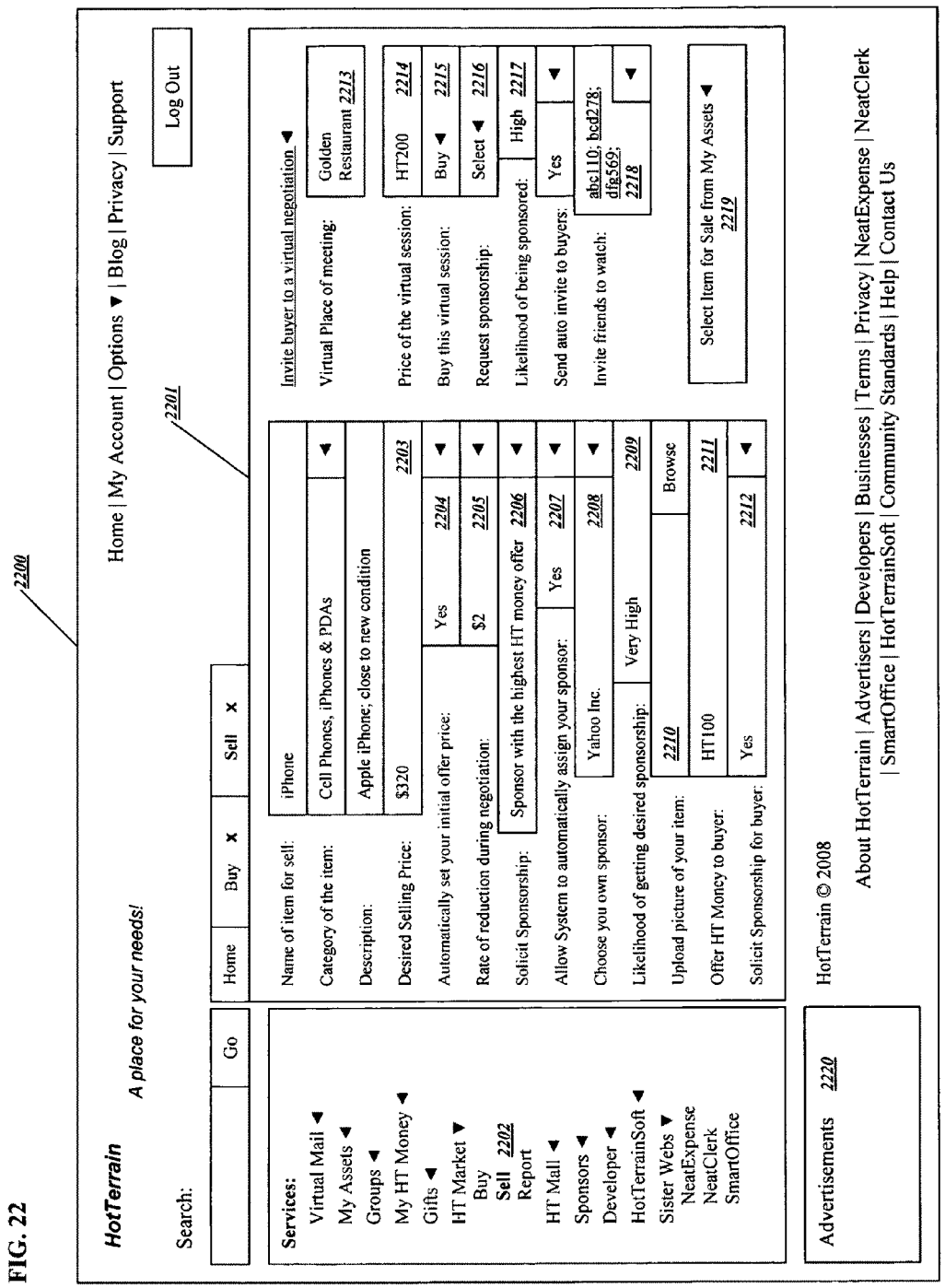
FIG. 22 is an exemplary illustration of the user selling his stuff in "HT Market", requesting sponsorship, and inviting buyers to a virtual negotiation.

Referring to FIG. 22, therein is presented an exemplary illustration of the user selling his items in "HT Market", requesting sponsorship, and inviting buyers to a virtual negotiation. As indicated, the user interface 2200 comprises a display area 2201 that is triggered by the user pressing "Sell" 2202 under "HT Market" of the left panel. In this particular example, the user intends to sell his iPhone. He inputs his desired price at 2203 and authorizes the system to automatically set his initial offer price at 2204, which will be his desired price plus a mark-up amount. The user may be presented with the option to pick aggressive mark-up, moderate mark-up, or conservative mark-up (not shown on FIG. 22). The user can also let the HT system to negotiate for him automatically by inputting rate of reduction during negotiation at 2205, so that the system will reduce the price during each negotiation session with the buyers.

The system allows him to solicit sponsorship at 2206 and he can select to allow the system to automatically assign him sponsor(s) at 2207. The user also has the option of picking the sponsor he likes at 2208 and the system may automatically display the likelihood of getting sponsored at 2209. The user can upload a photo of his iPhone at 2210, offer certain amount of his HT money to the buyer at 2211, and choose to solicit sponsorship for the buyer at 2212 so that the buyer gets the sponsorship incentive upon purchasing, a marketing scheme to attract buyers.

The seller may be required to set expiration date for selling the item, or select a system default expiration date. The seller can easily re-post the item for sale if it is not sold after the expiration date (not shown on FIG. 22).

In order to improve the likelihood of making a sale, the user can invite buyers to a virtual negotiation. In this particular example, the user picks "Golden Restaurant" 2213 as the virtual negotiation venue (3-D virtual place). The price of the virtual session is displayed at 2214, which is the expense for playing the virtual session to sell the iphone. The user can buy the virtual session using his HT Money at 2215 or request sponsorship at 2216. Similarly, the system may display the likelihood of him winning the sponsorship at 2217.

The user can configured the system to send out invitations to buyers and invite his friends to watch the virtual negotiation at 2218. All of them can use instant messaging feature during the play of the virtual session. Also, if the buyer purchases the iPhone, the system may automatically send out an e-receipt on behalf of the user to his buyer's Neat-Expense account (the sister website of HotTerrain. See FIG. 26 below). The system also allows the user to select an existing item in his "My Assets" by clicking "Select Item for Sale from My Assets" button 2219 to bring the item to HT Market. This way, the system automatically populates some of the fields for him, such as name of the item, category, description, photo, etc., and he just needs to complete filling out the remaining information. The advertisement area 2120 is elaborated in FIG. 33 and FIG. 40 below.

The system may integrate negotiation tactics, such as price negotiation, volume-buying negotiation, walk away, and so on. For specific examples, negotiation techniques can be provided to the seller and/or buyer to assist their negotiation, such as "Okay, I can do $350. I have lowered my price, it's now your term", "I can't further lower the price, but I can give you an iPhone ear piece for free", "You can do better than this. There is another seller who is offering me $330. My offer is $320. If you don't agree, I will walk through from this negotiation", etc.

The system may also allow users to barter their items rather than to sell and to buy, especially for digital items on HotTerrain. Again, those skilled in the art will appreciate that the selling method depicted in FIG. 22 may vary. For example, it could be a bidding or fixed price technique rather than a price negotiation.

Figure 23:
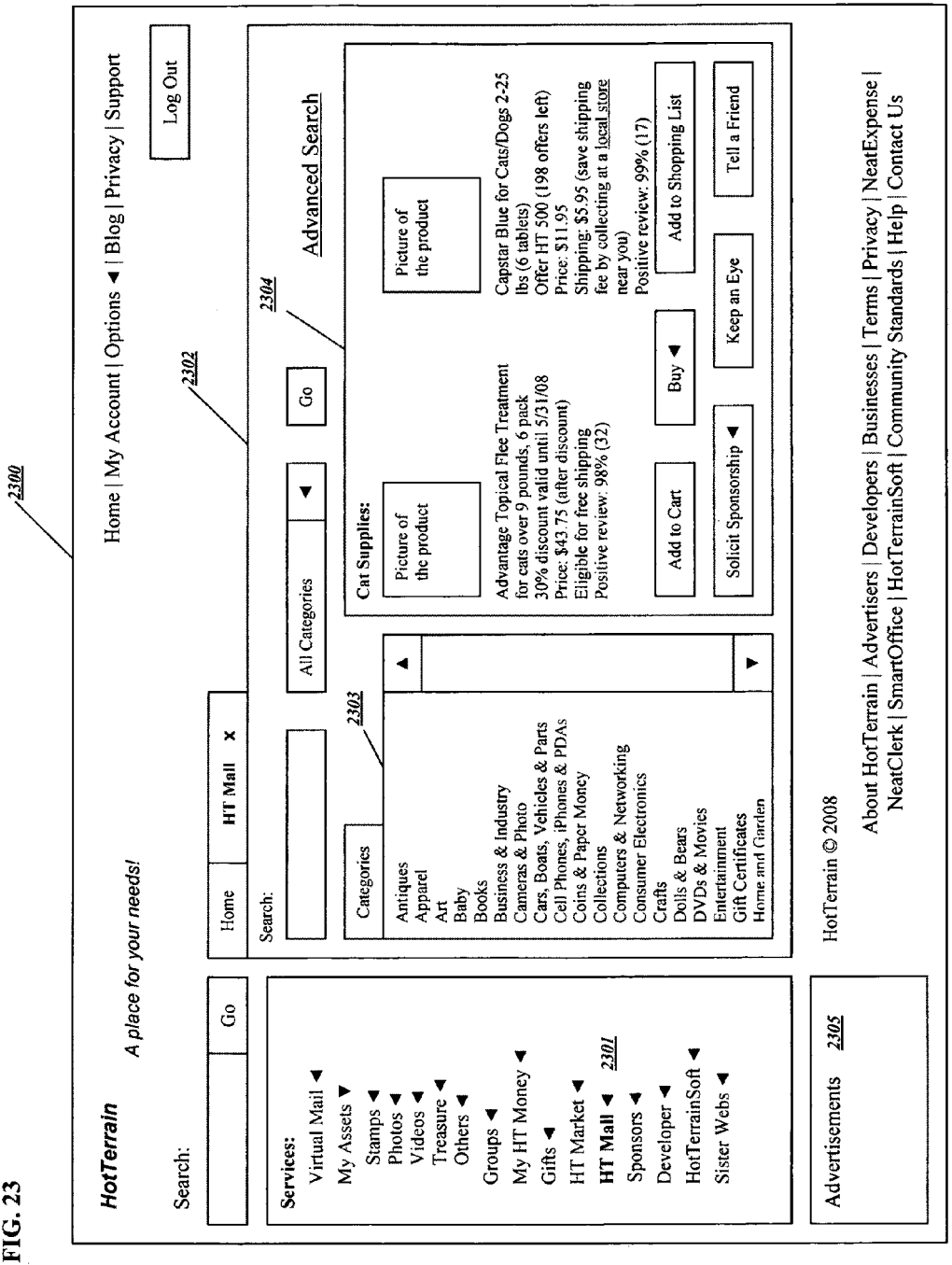
FIG. 23 is an exemplary illustration of the user buying products or services in "HT Mall" and how he can request sponsorship.

With reference now to FIG. 23, therein is depicted an exemplary illustration of the user buying products or services in "HT Mall" and how he can request sponsorship. As indicated, the user interface 2300 comprises a display area 2302 in response to the user pressing "HT Mall" 2301 on the left panel of the user interface 2300. For illustration purpose, the product categories 2303 and product list 2304 in response to the user's searching are both shown in the display area 2302. In another embodiment of present invention, they may be shown sequentially on separate tabs.

When the user is presented with a product list in 2304, in this example, Cat Supplies, he can select the product he wants and click the function buttons below to perform actions that include but are not limited to: 1) add the item to his shopping cart; buy the item (with options of paying HT Money, credit card, or PayPal, etc); add the item to his shopping list; solicit or request sponsorship; keep an eye on the item; or tell a friend to earn free HT Money. For items requiring shipping fee, the system is able to obtain data from local stores and show the user if he can pick up the item at a local store when he clicks the local store link in display 2304. The advertisement area 2305 is elaborated in FIG. 33 and FIG. 40 below.

Figure 24:
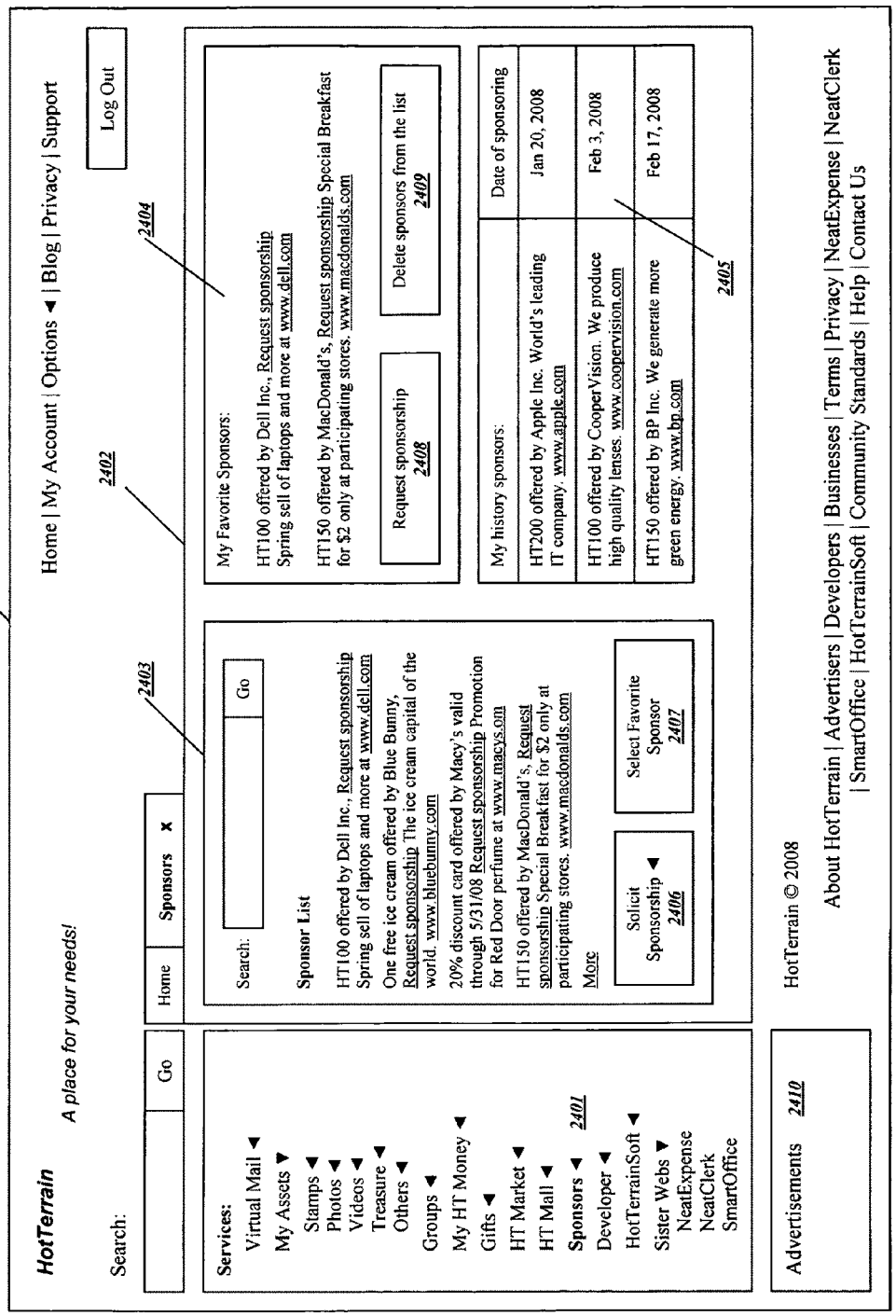
FIG. 24 is an exemplary illustration of "Sponsors" webpage that can be presented to the user and what he can do within the page.

Now referring to FIG. 24, therein is presented an exemplary illustration of "Sponsors" webpage and what the user can do within the page. As indicated, the user interface 2400 comprises a display area 2402 in response to the user pressing "Sponsors" 2401 on the left panel of the user interface 2400. For illustrative purposes, Sponsor List 2403, My Favorite Sponsors 2404, and My History Sponsors 2405 are shown together on the same page, but in reality, they may be shown on separate web pages. Skipped are the steps of obtaining the sponsor list, such as by search an inventive key word(s), or by selecting from sponsor categories. Inventive key words are words users can use to search incentives offered by sponsors in connection to the SponsorAds. The sponsors enter the incentive key words when setting up SponsorAds so that the system automatically compares user entered incentive key words to the sponsors' incentive key words to identify any match.

Within the Sponsor List 2403, the system allows the user to perform tasks including but not limited to pressing "Solicit Sponsorship" button 2406 to solicit or request sponsorship, and pressing "Select Favorite Sponsor" button 2407 to select his favorite sponsors so as to request sponsorship at a later time. The user may need to book his favorite sponsor(s) because his HT score is not meeting the minimum requirement at the time he sees the SponsorAd. The user can also directly press "Request Sponsorship" link in each selected sponsor list item to request specific sponsorship. A pop-up window may appear to also allow him to inform a friend, save the SponsorAd for later use, complete a survey, subscribe news letter, etc.

For My Favorite Sponsors 2404, the system is configured to automatically send out sponsor request when the user's HT Score meets the minimum requirement for sponsorship. The user can select SponsorAds in area 2404 and press "Request Sponsorship" button 2408, or click "Request Sponsorship" link in each SponsorAd at any time to try his luck if his score is lower than the minimum requirement. Other action includes but is not limited to the user pressing "Delete Sponsors from the List" button 2409 to delete sponsors from his favorite list. The advertisement area 2410 is elaborated in FIG. 33 and FIG. 40 below.

My History Sponsors 2405 shows the user sponsorships that he obtained in a given time frame. A running total of the sponsor incentives in dollar term may also be presented to the user for his information (not shown). Other features of Sponsorship include but are not limited to the user post specific sponsorship requests to solicit for sponsorship rather than picking from a list of offers by sponsors, and user request sponsorship to benefit others, such as buyers of his products or friends and relatives so that these people receive the sponsor incentives. Sponsor incentives can be HT Money, digital and physical gifts, games, videos, e-stamps, e-stickers, albums, products, services, movie tickets, coupons, discounts, rebates, gift cards, rain checks, virtual party, songs, luck draws, trip, etc. Certain physical incentives can be collected at physical stores that partner with HotTerrain.

The user can solicit or request sponsorships for any item or activity in HotTerrain, such as obtaining collector stamps or physical photo albums, selling or buying items, obtaining HT Money, playing virtual sessions or games, requesting one time or recurring reminder services (email and phone call reminder), obtaining certain HT reports, and so on.

Figure 25:
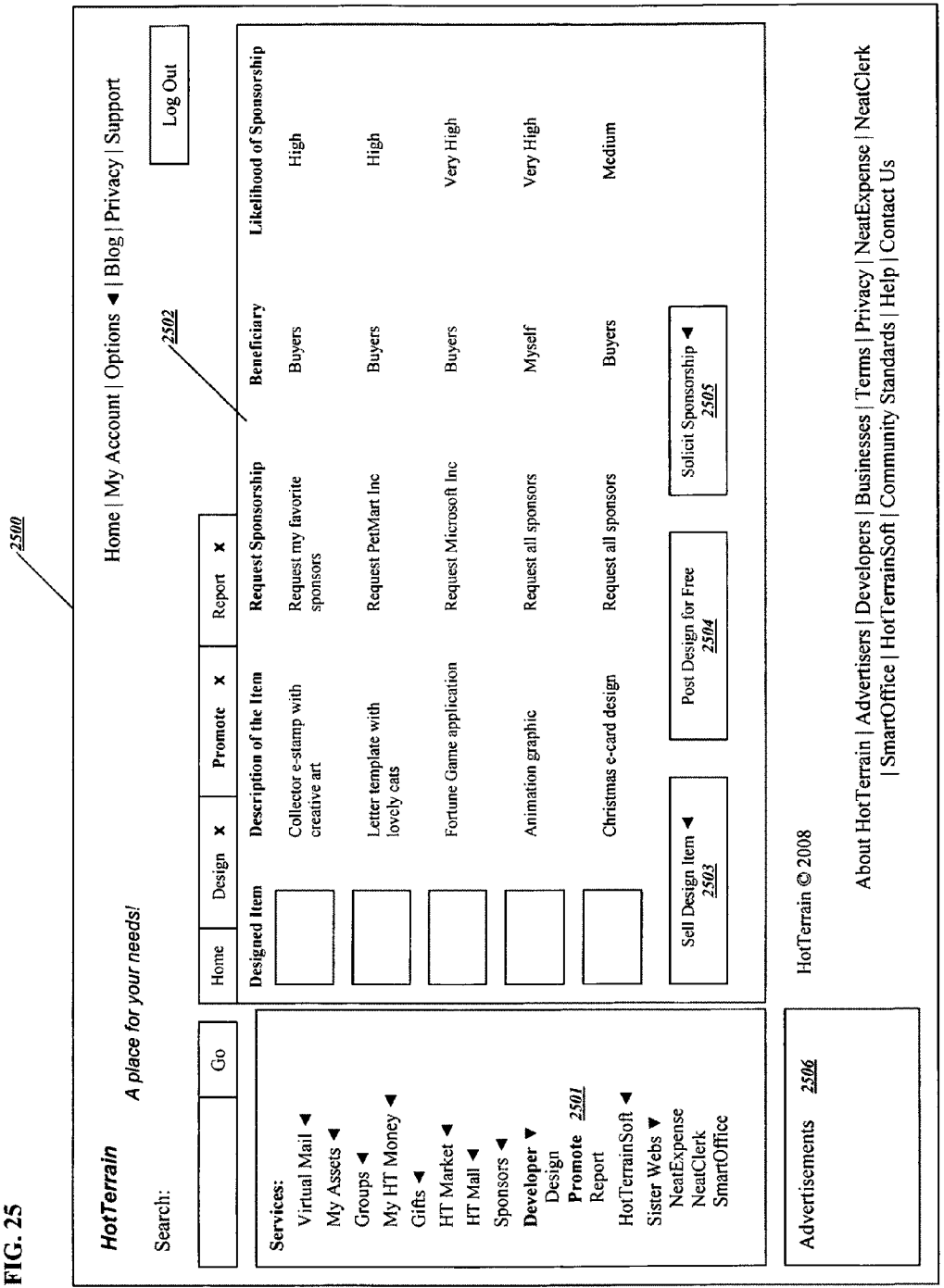
FIG. 25 is an exemplary illustration of "Developer" webpage that can be presented to the user and what he can do within the page.

Reference now to FIG. 25, therein is depicted an exemplary illustration of a "Developer" webpage and what a developer can do within developer webpages. As indicated, the user interface 2500 comprises a display area 2502 in response to the user clicking "Promote" 2501 under "Developer" application of the left panel of the user interface 2500. Under "Developer" application, the user can perform tasks including but not limited to: 1) developing applications and designs that run on HotTerrain; 2) promoting his applications; 3) viewing related developer reports.

The display area 2502 presents information including but not limited to the icon of the user's designed item, description of the item, sponsorship group selection, beneficiary of the sponsorship, and likelihood of sponsorship. The user can then click "Sell the Design Item" button 2503 to post the selected design(s) or application(s) to HT Market for sale, or click "Post the Design for Free" button 2504 to post the selected design(s) or application(s) to HT Market for other users' free usage. The user can also press "Solicit Sponsorship" button 2505 to solicit or request sponsorship for his selected design from a selected sponsor group, a specific company, or even an individual. The advertisement area 2506 is elaborated in FIG. 33 and FIG. 40 below.

Figure 26:
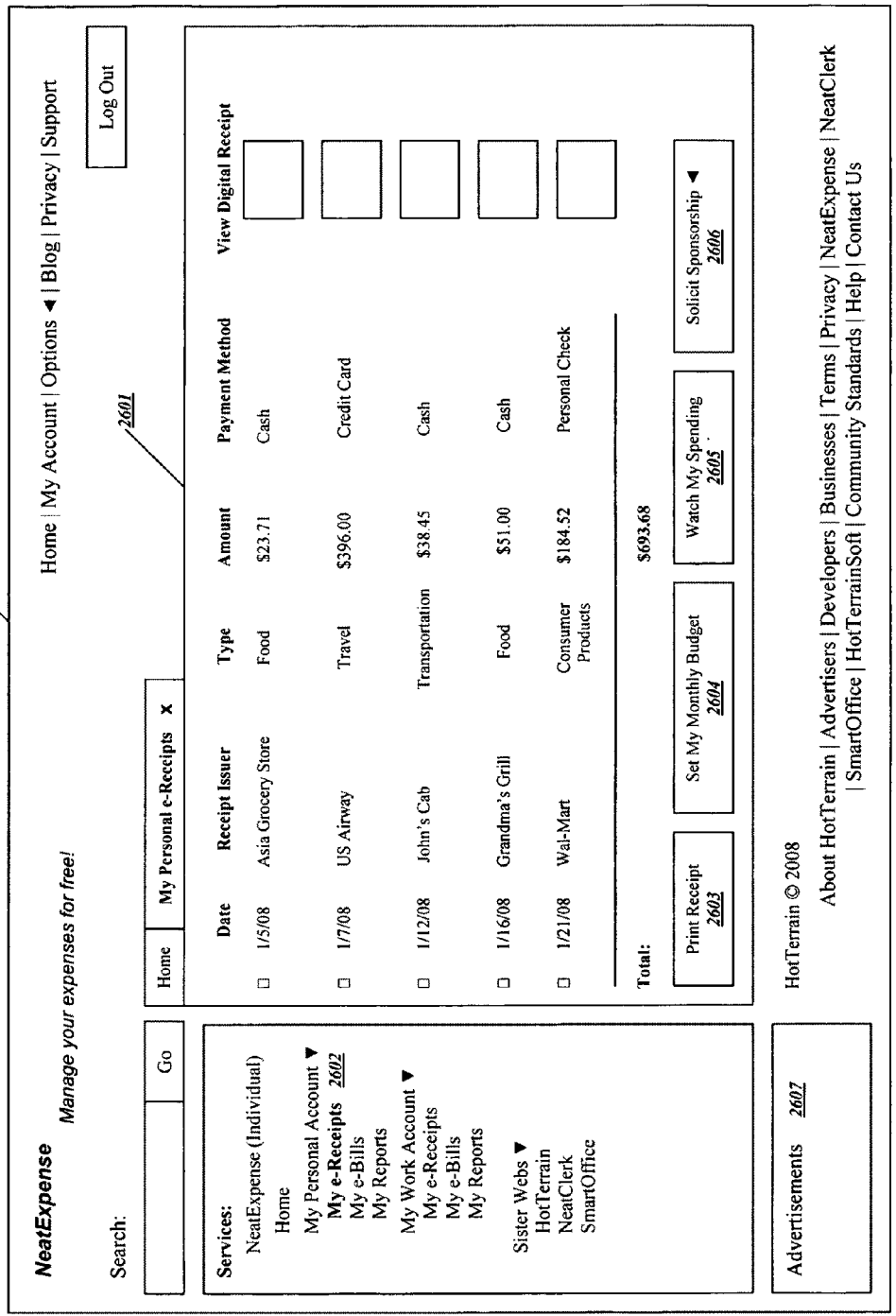
FIG. 26 is an exemplary illustration of sister website "NeatExpense" and what the user can do with his e-receipts.

Now referring to FIG. 26, therein is presented an exemplary illustration of sister website of HotTerrain, called "NeatExpense", and how it can manage a user's electronic receipts. For simplicity sake, several steps that lead to the display of the user interface 2600 of FIG. 26 are omitted, such as the user clicking "NeatExpense" link on the left panel of FIG. 25 and clicking "My Personal Account" dropdown menu on the left panel of FIG. 26. The user can also sign in to his NeatExpense account from www.neatexpense.com, rather than through the single sign-on feature in HotTerrain.com to access his account. The single sign-on from HotTerrain to NeatExpense means the user just need to click the NeatExpense link in HotTerrain to access his NeatExpense account without the need to enter user ID and password.

As indicated, the user interface 2600 comprises a display area 2601 in response to the user clicking "My e-Receipts" 2602 under "My Personal Account" of the left panel of FIG. 26. Information displayed in 2601 includes but is not limited to e-receipt date, issuer, type, amount, payment method, receipt image (user can click the image to see the enlarged image that contains detailed and itemized data of the selected e-receipt), and summary total. The user can select his e-receipt(s) and click "Print Receipt" button 2603 to print out physical receipt(s). Other features provided by the system include but are not limited to: 1) clicking "Set My Monthly Budget" button 2604 to set the user's monthly expense ceiling, he will be notified if he exceeds his budget; 2) clicking "Watch My Spending" button 2605 to obtain detailed reports of the user's spending pattern, amounts, etc; 3) clicking "Solicit Sponsorship" button 2606 to solicit or request sponsorship for certain user activities in NeatExpense. The advertisement area 2607 is elaborated in FIG. 33 and FIG. 40 below.

The user also has a "My Work Account" that is separate from his personal account to keep track of his work related expenses, so that he can use the work related e-receipts and data to submit his expense report to his employer. This gets rid of the hassle for him to collect physical receipts during his business trips and the reconciliation and locating of physical receipts when preparing expense reports. The system is programmed so that when a user sets up his personal account, he is then automatically assigned a work account when he clicks "accept" (not shown) or vice versa.

The system allows individuals and small businesses to create e-receipts when they receive payments from buyers. And the system enables data exchange from businesses that have their POS system to obtain the receipt data for their customers who have NeatExpense accounts. Therefore, the system enables its users to keep all of their receipts in a centralized place for easy retrieval. The system can also interface with enterprise expense systems, so that receipt data is automatically populated in the enterprise expense systems, further saving the users' time to input the information in their employers' expense systems Other functions provided by NeatExpense system for individual accounts include but are not limited to managing bills and generating various expense related reports. In order not to obscure the present invention, detailed features of NeatExpense system is disclosed in our invention titled "Online Expense System".

With reference now to FIG. 27, therein is depicted an exemplary illustration of creating an e-receipt in a store and accepting HT Money for product payment. For simplicity, several steps that lead to the display of the user interface 2700 of FIG. 27 are omitted, such as how a small business set up a business account with NeatExpense and how the registration information (business name, address, owner, etc.) is stored in the system. As indicated, the user interface 2700 comprises a display area 2701 in response to a user pressing "Create e-Receipts" 2702 on the left panel of user interface 2700. The user's business information is automatically populated in display 2701. For example, the user simply needs to enter the item dollar amount in text box 2703. Additional rows of items can be added by pressing "Add Item" button 2705.

In the particular example as shown in 2700, the small business owner has created a grocery database in his NeatExpense account, so that when he enters item code 001, the system automatically populates the name of the item, unit price, etc., the user just needs to input the number of units and the system automatically calculates the amount for each item. The user may also enter the sale tax percentage or the system could automatically determine that for the user based on the user's location and the item(s) the buyer is purchasing. The summary total is shown at the bottom of the item list. In this particular example, the owner accepts HT Money payment from the buyer who visits the owner's physical store. The buyer is able to transfer the equivalent HT Money from his HotTerrain or NeatExpense account to the owner's NeatExpense account using his cell phone or the owner's Internet computer or cell phone.

Once the HT Money is successfully transferred, the status of payment automatically indicates "Paid". The owner can also verify the receipt of HT Money by clicking "View My HT Money Account" 2710. Once the transaction is complete, an e-Receipt regarding the transaction is automatically sent to the buyer's NeatExpense Account as shown at 2704. The system displays a successful transmission message on the owner's computer or cell phone. Instant notification of the arrival of the e-receipt is shown on the buyer's cell phone.

Other functions provided by the system include but not limited to: 1) pressing "Delete Receipt" button 2706 to delete unwanted receipt; 2) pressing "Print Receipt" button 2707 to provide a physical receipt; 3) pressing "List of All Receipts" button 2708 to view a list of all receipts issued; 4) pressing "e-Receipt View" button 2709 to view the image of an e-Receipt that may include business logo and special design; 5) pressing "Request Sponsorship" button 2711 to solicit sponsorships from sponsors for activities in NeatExpense, such as providing incentive for the buyer, sponsoring e-Receipt customization, obtaining related reports, etc. The display 2701 may also include instructions to user NeatExpense e-Receipt functions, such as shown in 2712. The advertisement area 2713 is elaborated in FIG. 33 and FIG. 40 below.

The system enables users to authorize their accountants to obtain their expense reports of a fiscal year maintained in NeatExpense to prepare their income tax returns. The system also allows expense data transfer from NeatExpense to major accounting firms for their preparation of clients' tax return so that such data do not need to be re-entered in their accounting systems.

Other functions provided by NeatExpense system for business accounts include but not limited to managing invoices, databases and generating various expense related reports. In order not to obscure the present invention, detailed features of NeatExpense system are disclosed in our invention titled "Online Expense System".

Now referring to FIG. 28, therein is presented an exemplary illustration of sister website "NeatClerk" and how a bank branch can utilize the e-log for recording its night deposit box transactions. For simplicity, several steps that lead to the display of the user interface 2800 of FIG. 28 are omitted, such as registering a NeatClerk business account, input registration information, input the name of a e-log, etc. As indicated, the user interface 2800 comprises a display area 2802 in response to the user clicking "Create" 2801 on the left panel of the user interface 2800. The display 2802 may be presented to the user with default number of rows, and allow the user to click "Append" button 2803 or "Insert" button 2804 to add more rows as needed.

Data such as branch number and date is automatically populated by the system from data collected during account registration process in response to the user pressing "Get Data from DB" button (not shown) or the user pressing "Create" 2801 on the left panel of the user interface 2800. The branch personnel only need to enter number of envelopes, amount inside each envelope, and customer name/account. In this particular example, the display 2802 is accessed by using the user's (who is a verifier) logon ID and password for the initial sign-in. The verifier simply clicks the "Verified By" cell of each item, and his digital signoff is automatically populated indicating his verification of each item. And for the reviewer who confirms the night deposit contents with the verifier, she simply highlights the "Confirmed By" cell for each item and the system prompts for her user ID and password. Once entered, her digital signoffs are automatically populated. The user can delete selected rows by pressing "Delete" button 2805 and save the e-log by pressing "Save" button 2806. The user can press "Print Preview" button 2807 to preview the layout of the e-log and press "Print" button 2808 to print the e-log if necessary.

The "Signature" button 2809 is a secured and certified digital "Signature" that is tied to the user's real identification (e.g., verification to government record of the individual's identity), which is used among parties who do not know each other for signing e-contracts and e-agreements, etc. For business e-logs, the use of certified signature may not be necessary and the digital signoff described above may be sufficient. Such e-logs include but are not limited to training attendant rosters, passenger pick-up logs, computer operation daily checklists, security event weekly review logs, general ledger reconciliation logs, ATM daily balancing logs, etc.

In this particular example, the user can view all night deposit logs by clicking "View Logs of Night Deposit Box" button 2810 and selecting the category of the logs, such as by branch number, by person, or all, etc. The system also supports audit features not limited to checking missing signoffs by pressing button 2811.

Other functions provided by the NeatClerk system include but are not limited to managing e-savers, e-contracts/agreement and generating various related reports. E-savers include e-discounts, e-coupons, e-rebates, e-gift cards, e-rain checks, etc. The NeatClerk system is not only a place for entities and individuals to generate e-savers, manage e-savers in a centralized location, but also enable users to use their e-savers in participating physical stores by simply entering their NeatClerk user ID and password in the stores' POS systems. The system also enables centralized management of e-savers for businesses to simplify their current manual process of collecting and reconciling physical e-savers. In order not to obscure the present invention, detailed features of NeatClerk system are disclosed in our invention titled "Online Log and Signature System".

With reference now to FIG. 29, therein is depicted an exemplary illustration of sister website "SmartOffice" and how the workflows of documents are tracked and analyzed to report white-collar workers' productivity and related issues. For simplicity, several steps that lead to the display of the user interface 2900 of FIG. 29 are omitted, such as registering a SmartOffice account, inputting registration information, accessing the account by clicking SmartOffice link in HotTerrain through single sign-on, etc. Before getting into the details, a workflow is typically defined as a process flow of a document through its life/work cycle, such as file in progress, file in review, file in modification, file in completion, file in evaluation, etc.

In this particular example, we use a spreadsheet document for illustration. The display area 2900 comprises workflow setting 2901, approval function 2902, evaluation function 2903 and other functions, such as notes, document properties and related reports. As demonstrated, the workflow of the spreadsheet document may be set by pressing the "Workflow" button 2901. The document may go through the workflow by sequence as shown on workflow menu 2904. Authorization may be required if the user needs to go back to prior stage(s). The user can set a customized workflow by pressing the "Workflow" button 2901 and select the steps/stages needed.

If the document needs approval, an appropriate individual(s) may approve the document by clicking the "Approval" button 2902 when receiving the document from the user. The system may automatically date/time stamp the document and record the approval digital signoff(s) as shown on 2905. Similarly, an appropriate individual(s) may evaluate the document by pressing the "Evaluate" button 2903 to provide feedback(s) as indicated on 2906. Individual and group productivity reports, idle time, flow time, bottlenecks, defective and overdue work reports, etc. can be generated on demand to assist companies to dramatically improve white-collar productivity and tackle related thorny issues.

Other functions provided by SmartOffice system include but are not limited to applying Knowledge-worker Productivity Enhancement Methodology (KPEM) and Integrated Performance Evaluation Model (IPEM), and providing Knowledge-worker Enterprise Resource Planning (KERP) functions to effectively manage white-collar work. In order not to obscure the present invention, detailed features of SmartOffice system are disclosed in our inventions titled "Knowledge-worker Enterprise Resource Planning (KERP)" and "Enhanced E-Mail System".

Figure 30:
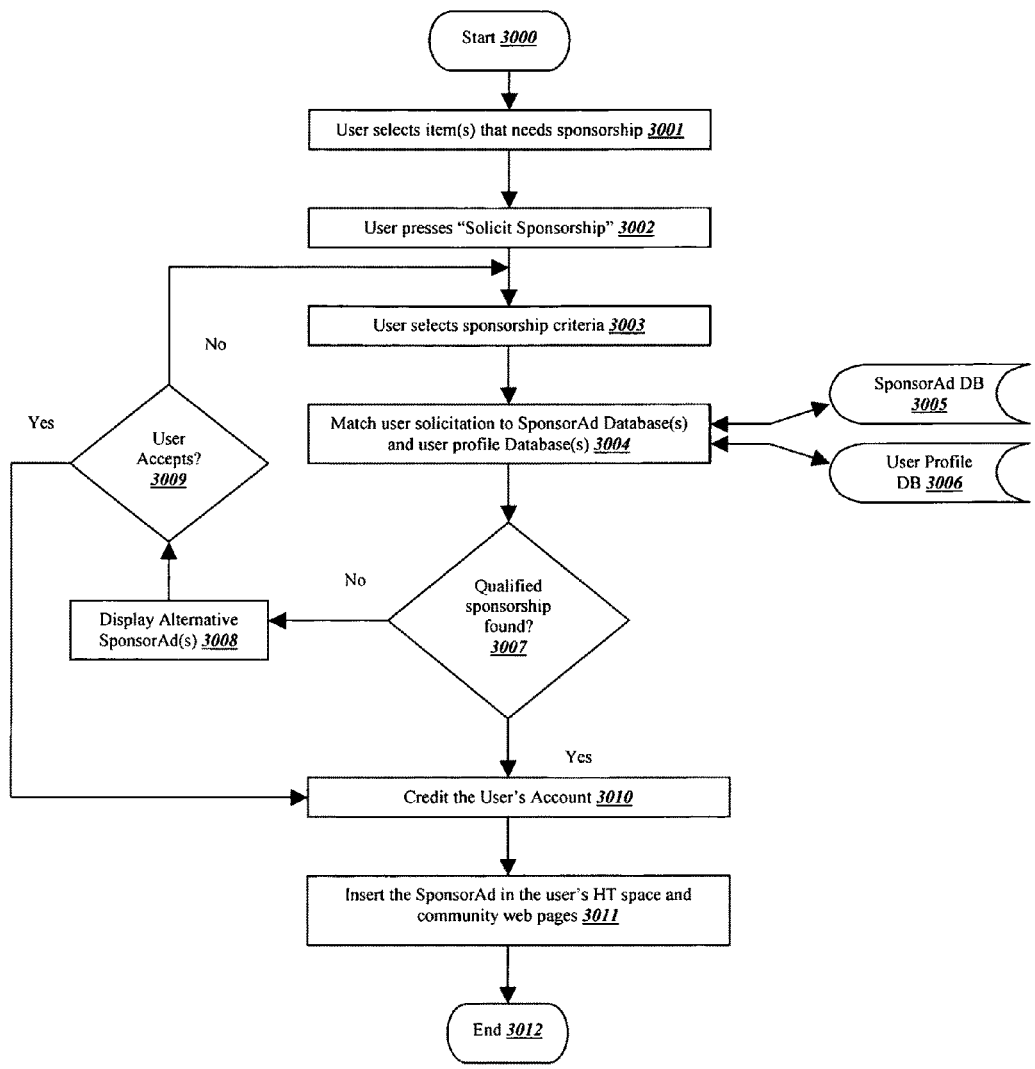
FIG. 30 is an exemplary illustration of a flow diagram depicting how the system assigns sponsorship and SponsorAds based on a user's solicitation.

Now, referring to FIG. 30, therein is depicted a high-level logic flowchart illustrating how the system assigns sponsorships and SponsorAds based on user solicitations. As indicated, the process starts at step 3000 and the user selects item(s) that he needs sponsorship at step 3001, examples of such item(s) can be a physical stamp album that stores stamps that the user collects, or a product on HT Market or HT Mall that the user intends to buy. The user then selects "Solicit Sponsorship" at step 3002. The system prompts the user to select sponsorship criteria at step 3003. Upon completion of step 3003, the user sends out the solicitation, the system automatically matches the solicitation to SponsorAd Database and User Profile Database at step 3004. SponsorAd Database contains all SponsorAds from sponsors and User Profile Database contains all user profile information, including their HT scores. Step 3005 and Step 3006 show the data exchange between the HotTerrain system and SponsorAd Database(s) or User Profile Database(s).

A determination is then made by the system as to whether a qualified sponsorship is found after the comparison at step 3007. If yes, the system credits the user account based on the incentive offered by the sponsor at step 3010, such as adding HT Money, e-saver, gift certificate, etc., to the user account. If no, the system displays an error message and alternative sponsorship result at step 3008. At this point, a determination is made by the user as to whether to accept the alternative sponsorship. If the user accepts, the system automatically credits the user account based on the incentive offered by the alternative sponsor at step 3010. If no, the system prompts the user to change his sponsorship criteria and the process goes back to step 3003 to repeat the same loop. After crediting the user account, the system inserts the SponsorAd in the user's HT space and community web pages at step 3011. When these web pages are called for display, the SponsorAd are shown on the advertisement area of each page. The process ends at step 3012.

Figure 31:
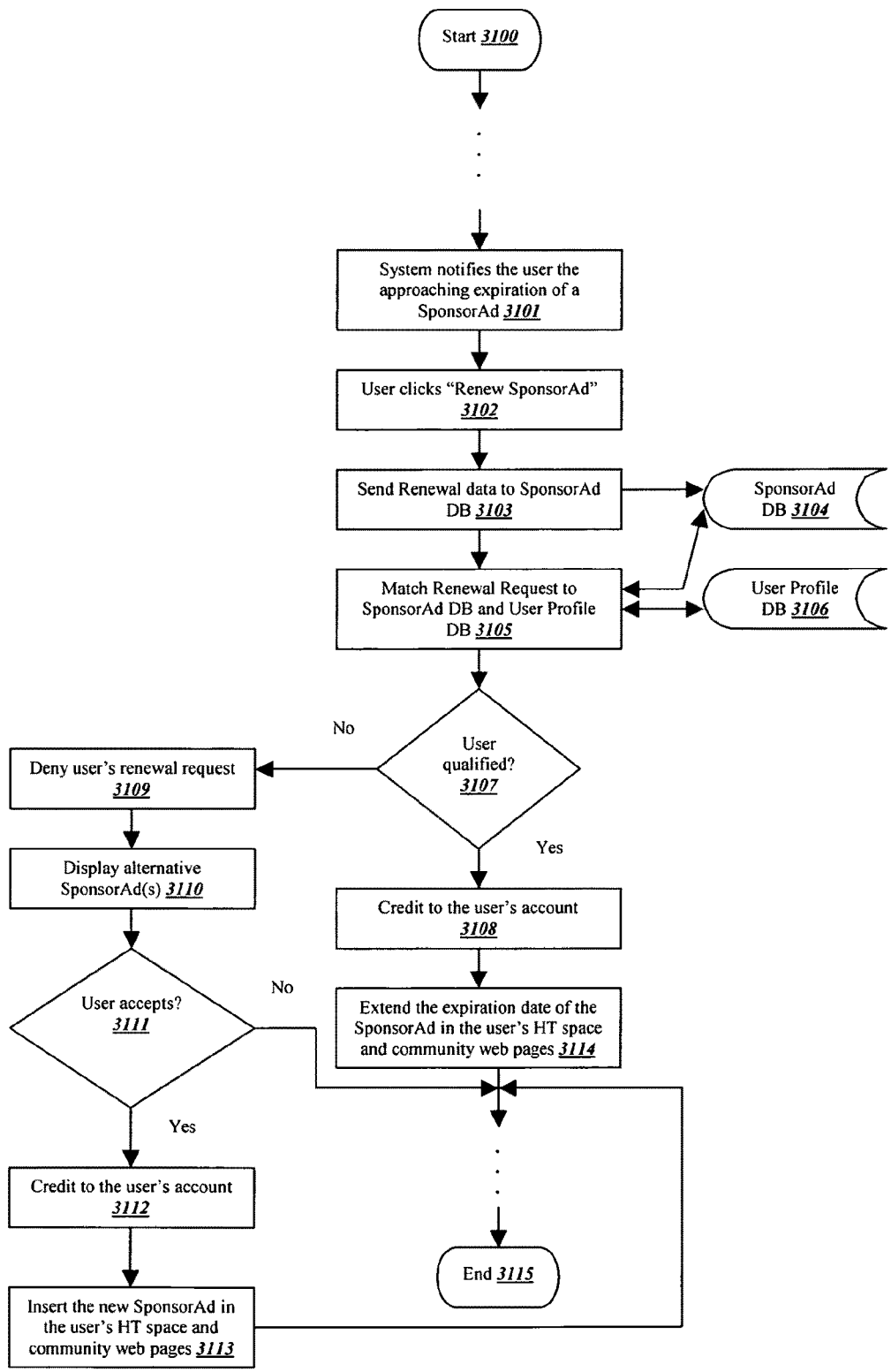
FIG. 31 is an exemplary illustration of a flow diagram depicting how the system enables a user to renew recurring sponsorship and SponsorAd.

Referring to FIG. 31, therein is depicted a high-level logic flowchart illustrating how the system enables a user to renew recurring sponsorship and SponsorAd. Here, steps for entities, especially for companies to create SponsorAds are skipped, including setting the SponsorAd expiration dates. As indicated, the process starts at step 3100 and the user performs whatever he needs to do and then reaches step 3101 whereby the system notifies the user the approaching expiration of one of his SponsorAds. The user clicks "Renew SponsorAd" at step 3102. The system sends the renewal data to SponsorAd Database(s) at step 3103. Step 3104 indicates the renewal data reaches the SponsorAd Database(s) and the two-way communication between HotTerrain program and the SponsorAd Database(s).

Next, the system matches the user's renewal request to the SponsorAd Database(s) and User Profile Database(s) at step 3105 to see if the user meets the minimum HT score requirement or other criteria for the renewal. Step 3106 shows the communication between HotTerrain program and the User Profile Database(s).

A determination is then made by the system as to whether the user is qualified for the renewal at step 3107. If yes, the system automatically credits the user's account based on the incentive provided by the sponsor. Next, the system also automatically extends the expiration date of the SponsorAd in the user's HT space and community web pages at step 3114. The user then performs whatever he needs to do and the process ends at step 3115. If no, the system displays a denial message informing that the user does not meet minimum requirement for the renewal at step 3109. The system displays alternative SponsorAd(s) that the user qualifies for at step 3110.

Now, a determination is made by the user to accept or reject the alternative SponsorAd(s) at step 3111. If yes, the system automatically credits the user account based on the incentive offered by the alternative SponsorAd(s) at step 3112 and inserts the alternative SponsorAd(s) to the user's HT space and community web pages at step 3113. The user then performs whatever he needs to do and the process ends at 3115. If the user rejects, the user then performs whatever he needs to do and the process ends at step 3115.

Figure 32:
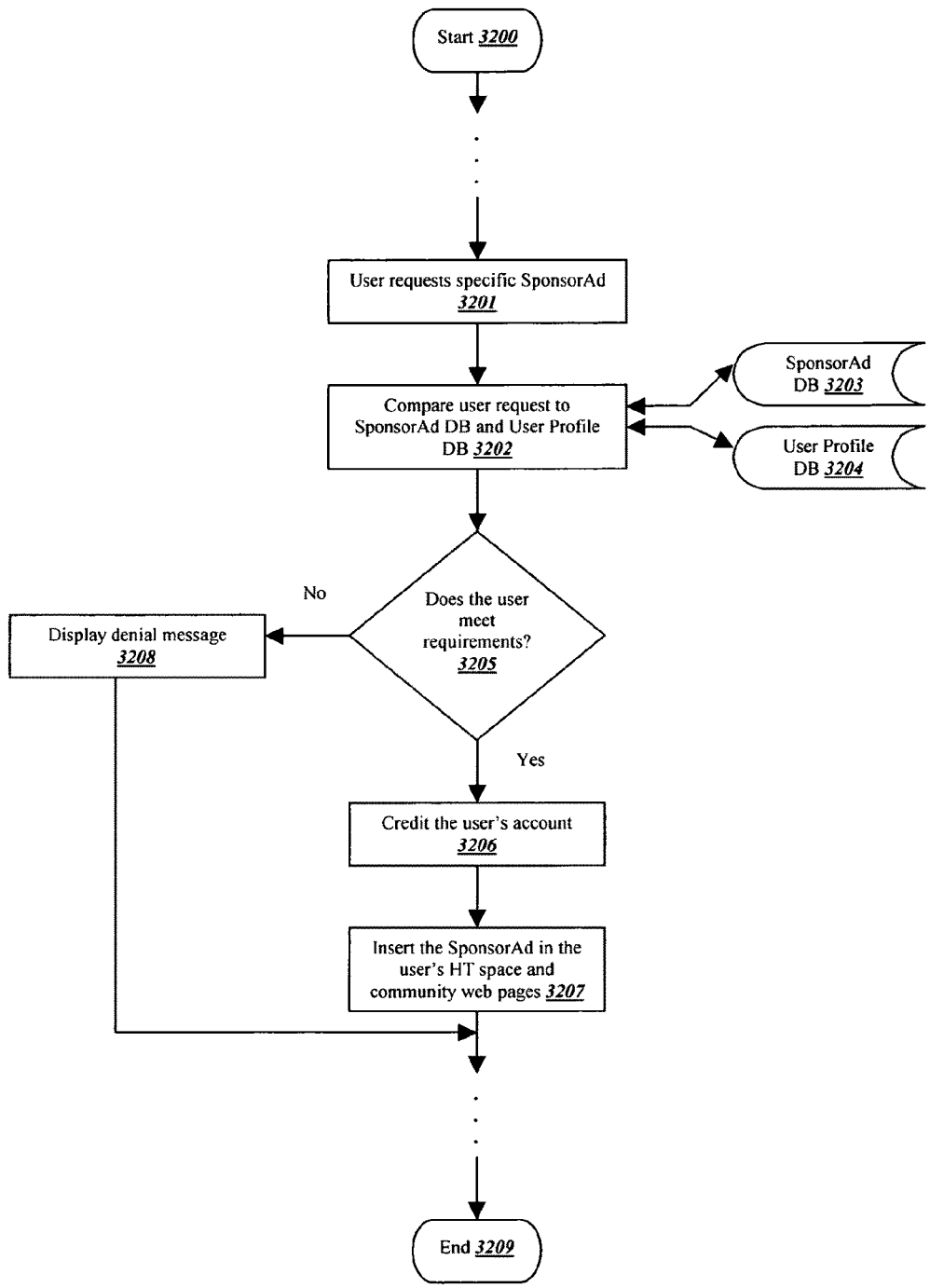
FIG. 32 is an exemplary illustration of a flow diagram depicting how to enable a user to request specific sponsorship and SponsorAd.

With reference now to FIG. 32, therein is depicted an exemplary illustration of a flow diagram depicting how to enable a user to request specific sponsorship and SponsorAd. As indicated, the process starts at step 3200, the user does whatever he needs to do and arrives at step 3201 whereby he requests a specific SponsorAd. The system compares the user request to the SponsorAd Database(s) and User Profile Database(s) at step 3202. Step 3203 indicates the two-way communication between HotTerrain system and the SponsorAd Database(s). And Step 3204 shows the two-way communication between HotTerrain system and the User Profile Database(s).

A determination is then made by the system as to whether the user meets the requirement of the specific sponsorship at step 3205. If yes, the system automatically credits the user's account based on the incentive provided by the sponsor at step 3206. Next, the system automatically inserts the SponsorAd in the user's HT space and community web pages at step 3207. The user then performs whatever he needs to do and the process ends at step 3209. If no, the system displays a denial message informing that the user does not meet minimum requirement for the specific sponsorship at step 3208. The user does whatever he needs to do and the process ends at step 3209. Those skilled in the art will appreciate that the system can display alternative SponsorAd(s) that the user qualifies after displaying the denial message at 3208. It is then up to the user to decide if he accepts or rejects and the similar process depicted in FIG. 31 follows.

Figure 33:
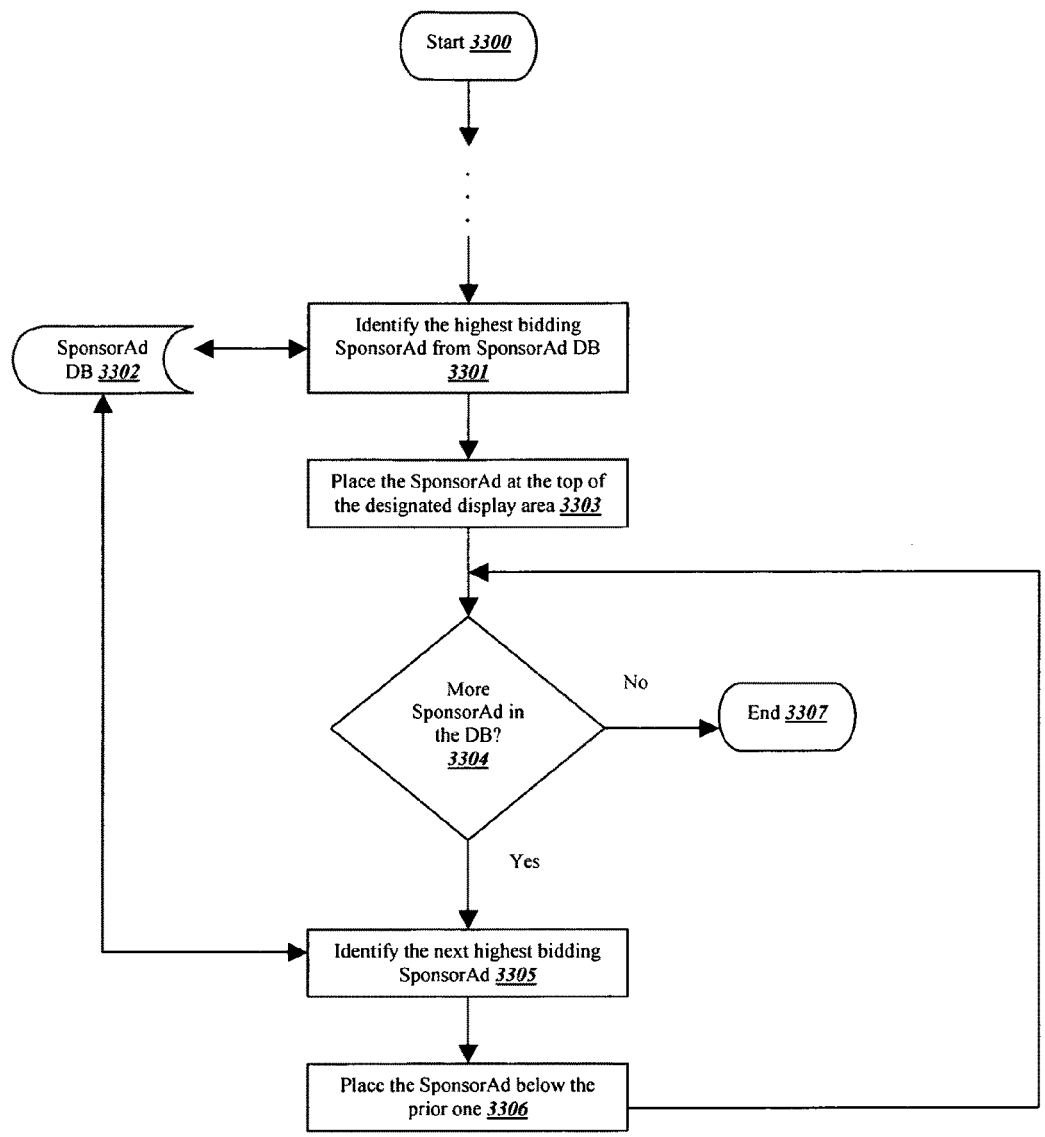
FIG. 33 is an exemplary illustration of a flow diagram depicting how the system lists sponsorship and SponsorAd according to the bidding price.

Referring to FIG. 33, therein is depicted a high-level logic flowchart illustrating how the system lists sponsorships and SponsorAds according to bidding prices. As indicated, the process starts at step 3300, the system does whatever he needs to do and then arrives at step 3301 whereby the system identifies the highest bidding SponsorAd from the SponsorAd Database(s). Step 3302 shows the two-way communication between the HotTerrain program and the SponsorAd Database(s). Once the highest bid is identified, the system automatically places the SponsorAd on the tope of the designated display area at step 3303, such as "Advertisements" area 303, 403, 509, 602, 709, 809, 904, 1008, 1113, 1211, 1313, 1413, 1508, 1605, 1710, 1814, 1908, 2007, 2114, 2220, 2305, 2410, 2506, 2607, and 2713, from FIG. 3 to FIG. 27.

A determination is then made by the system to identify if more SponsorAds are in the database(s). If yes, the system automatically identifies the highest bidding among the remaining SponsorAds at step 3305. At this time, the system is communicating with the SponsorAd Database(s) to identify the next highest bidder. The system then places the next highest bidding SponsorAd below the prior one on the designated display area at step 3306 and the process goes back to identify if more SponsorAds are in the database(s). If no more SponsorAd is found, the process ends at step 3307.

Figure 34:
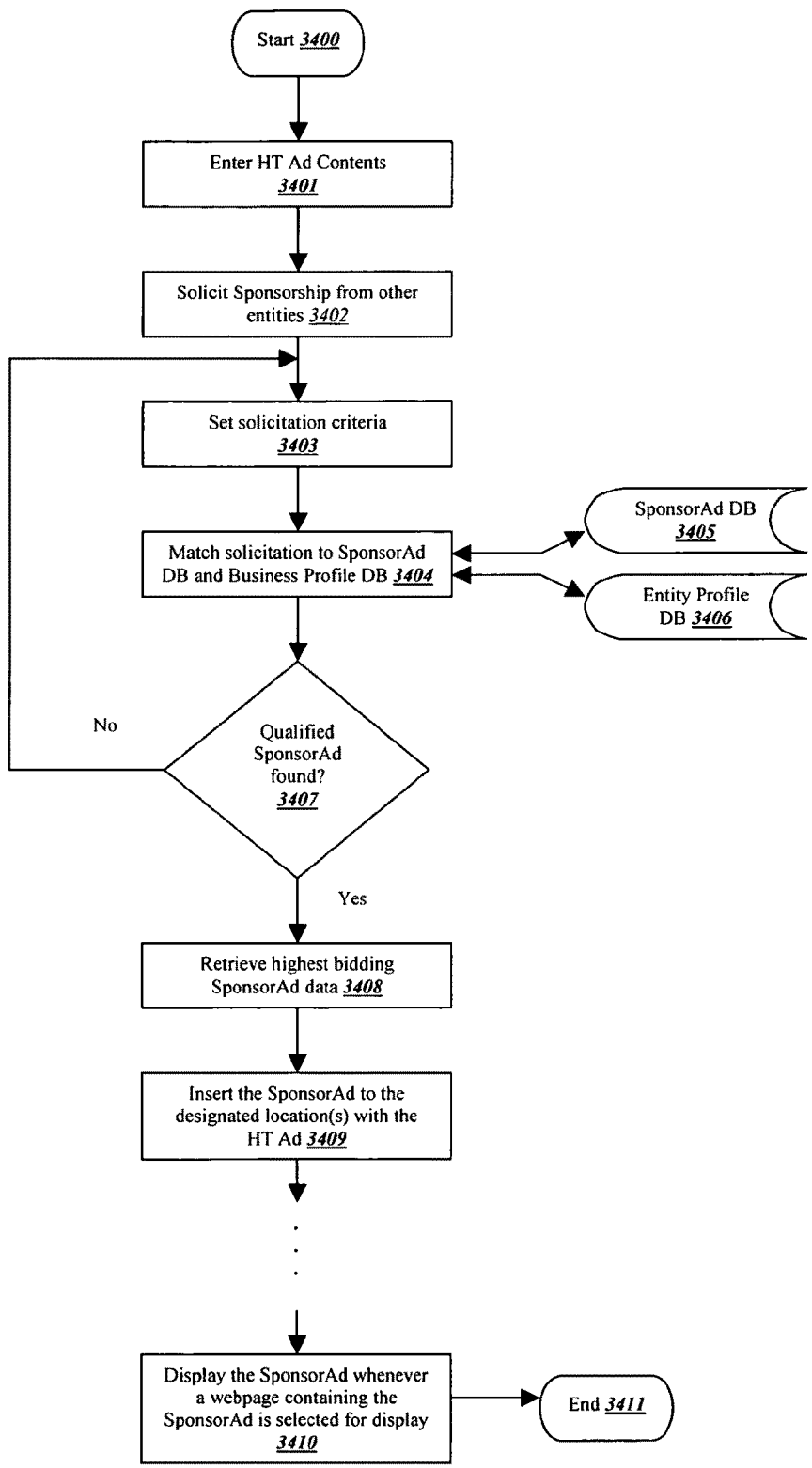
FIG. 34 is an exemplary illustration of a flow diagram depicting how the system assigns sponsorship and SponsorAd upon a entity's solicitation.

With reference now to FIG. 34, therein is depicted an exemplary flow diagram depicting how the system assigns sponsorships and SponsorAds upon entity request. As indicated, the process starts at step 3400 and proceeds to step 3401 whereby a requesting entity (a company, a charity organization, a school, etc) enters its HotTerrain Advertisement (HT Ad) contents. At this point, the entity can enter sponsorship solicitation(s) to ask sponsorships from other entities (typically companies) at step 3402. Normally, the entity is soliciting sponsorship for the benefits of users so that they will be more likely to take actions on the entity's HT Ads, especially if the entity offers some incentive with its HT Ads.

Next, the entity sets solicitation criteria, such as the type of sponsors or incentives it is looking for, at step 3403. The system then automatically matches the solicitation to SponsorAd Database(s) and Business Profile Database(s) at step 3404. Similarly, step 3405 shows the communication between the HotTerrain program and the SponsorAd Database(s) and step 3406 shows the communication between the HotTerrain program and the Entity Profile Database(s).

A determination is then made by the system to identify if a qualified highest bidding SponsorAd is found at step 3407. If yes, the system automatically retrieves SponsorAd data at step 3408 and then inserts the highest biding SponsorAd to the designated location with the entity's HT Ad at step 3409. Next the system performs whatever it needs to do and then displays the SponsorAd whenever a webpage containing the entity's HT Ad and the SponsorAd is activated for display at step 3410. The process then ends at step 3411. If no qualified SponsorAd is found, the process goes back to step 3403 to re-set the solicitation criteria. It should be noted to those skilled in the art that the entity does not need to solicit sponsorship when setting up its HT Ad. It has the option of requesting sponsorship at a later time.

Figure 35:
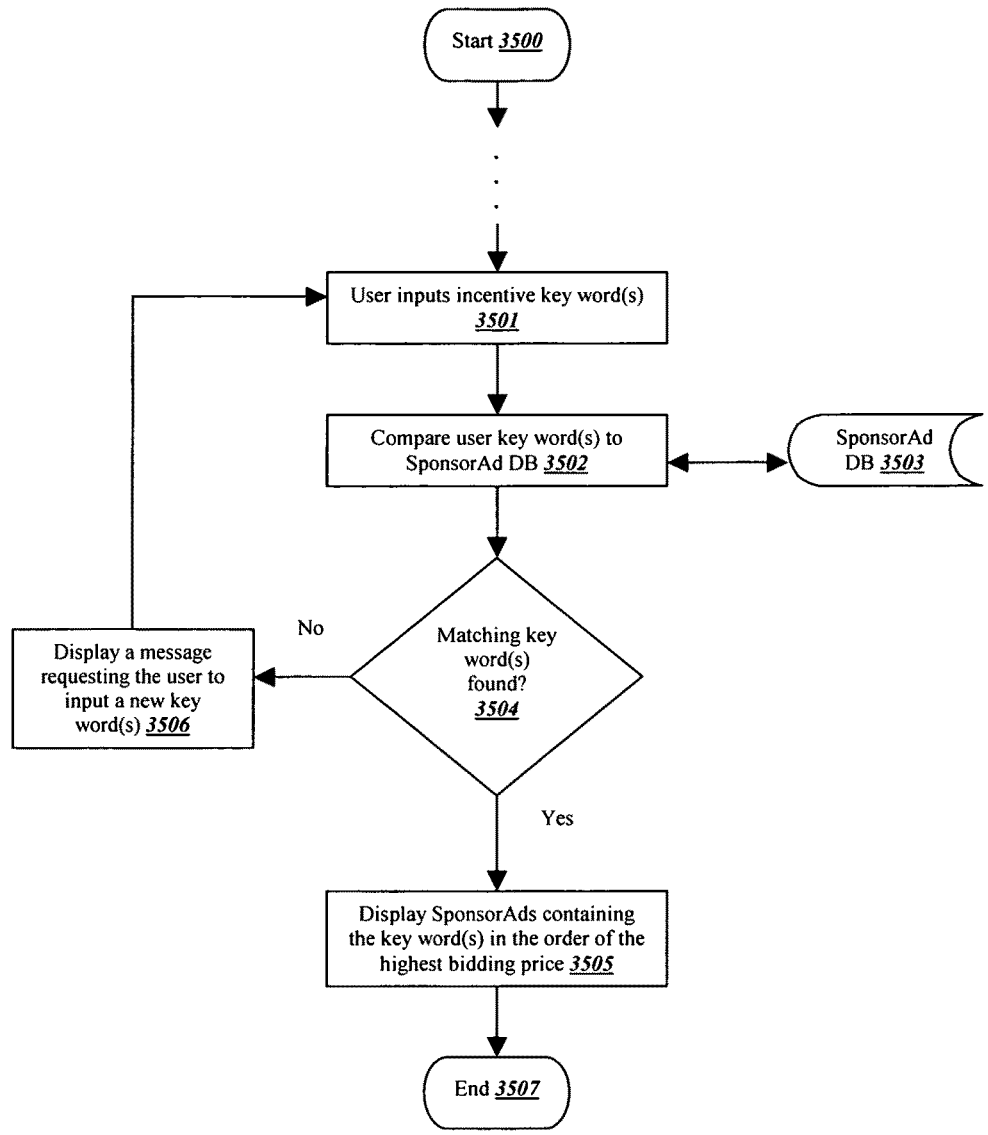
FIG. 35 is an exemplary illustration of a flow diagram depicting how the system matches incentive key word(s) to SponsorAds.

Referring to FIG. 35, therein is depicted a high-level logic flowchart illustrating how the system matches incentive key word(s) to SponsorAds. As indicated, the process starts at step 3500 and the user does whatever he needs to do in HotTerrain. Then, the user inputs incentive key word(s) and presses "search" at step 3501. The system automatically compares user key word(s) to SponsorAd database(s) at step 3502. Step 3503 show the communication between the HotTerrain program and the SponsorAd Database(s) to enable the comparison.

Next, a determination is made by the system at step 3504 to identify if matching key word(s) is found. If yes, the system automatically displays SponsorAds containing the key word(s) in the order of the highest bidding price at step 3505. The process then ends at step 3507. If no, the system displays a message of no search result found and requests the user to input a new key word(s) at step 3506. The process then goes back to step 3501 to complete the loop.

Figure 36:
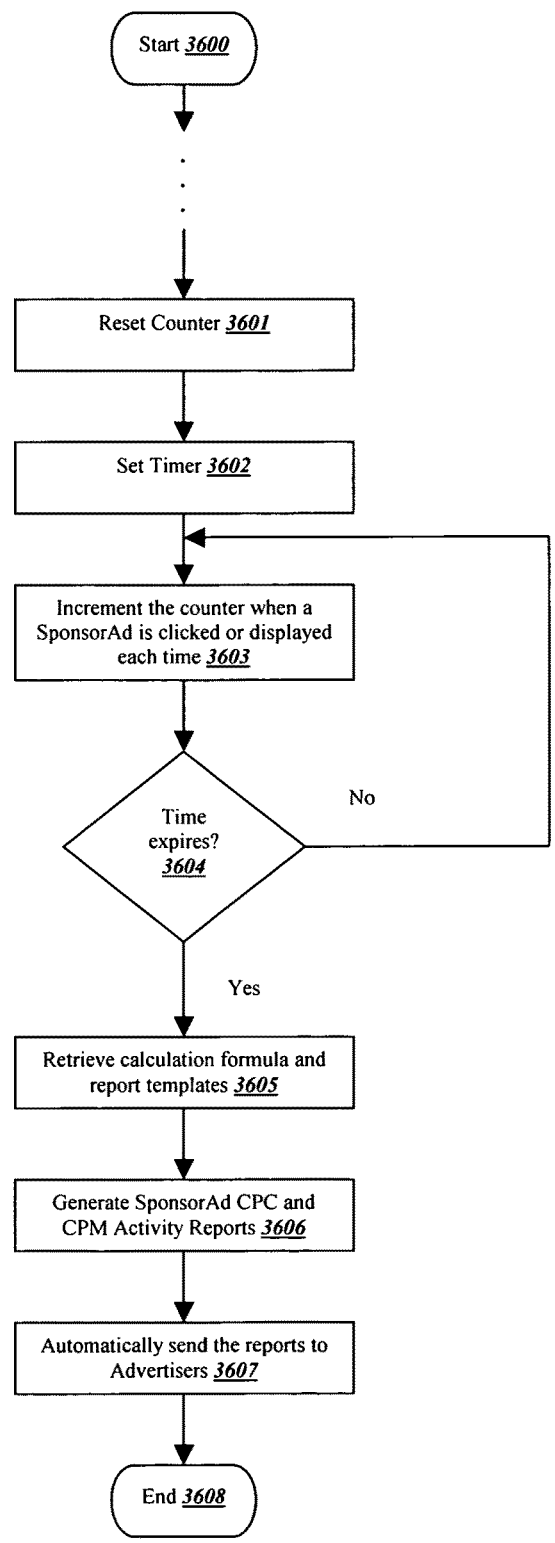
FIG. 36 is an exemplary illustration of a flow diagram depicting how the system collects CPC and CPM data, generates and distributes the related reports.

Now, referring to FIG. 36, therein is depicted a high-level logic flowchart illustrating how the system collects Cost Per Click (CPC) and Cost Per Thousand Impression (CPM) data, generates and distributes related reports. As indicated, the process starts at step 3600 and the system performs whatever it needs to do to arrive at step 3601 whereby the system resets counter and then sets a timer at step 3602. Next, the system detects a SponsorAd is either clicked or displayed, it automatically increments the counts to count the number of clicks and impressions at step 3603.

Next, a determination is made by the system whether the timer time has expired at step 3604. If not, the system goes back to step 3603 to continuously count the number of clicks and impressions of the SponsorAd during the time period defined (for example, the timer is set from the first of a month to the end of the month). If yes, the system stops counting for that particular time period, automatically retrieves calculation formula and report templates at step 3605, and automatically generates SponsorAd Activity Reports at step 3606. Upon this time, the system automatically sends the reports to the Advertiser at step 3607. The process for counting clicks and impressions of a particular SponsorAd during a specified time period ends at step 3607. It should be noted to those skilled in the art that the activities under tracking are not limited to clicks and impression, but also other actions on a SponsorAd. Also, reports of multiple SponsorAds of an advertiser can be consolidated and sent to the advertiser.

Figure 37:
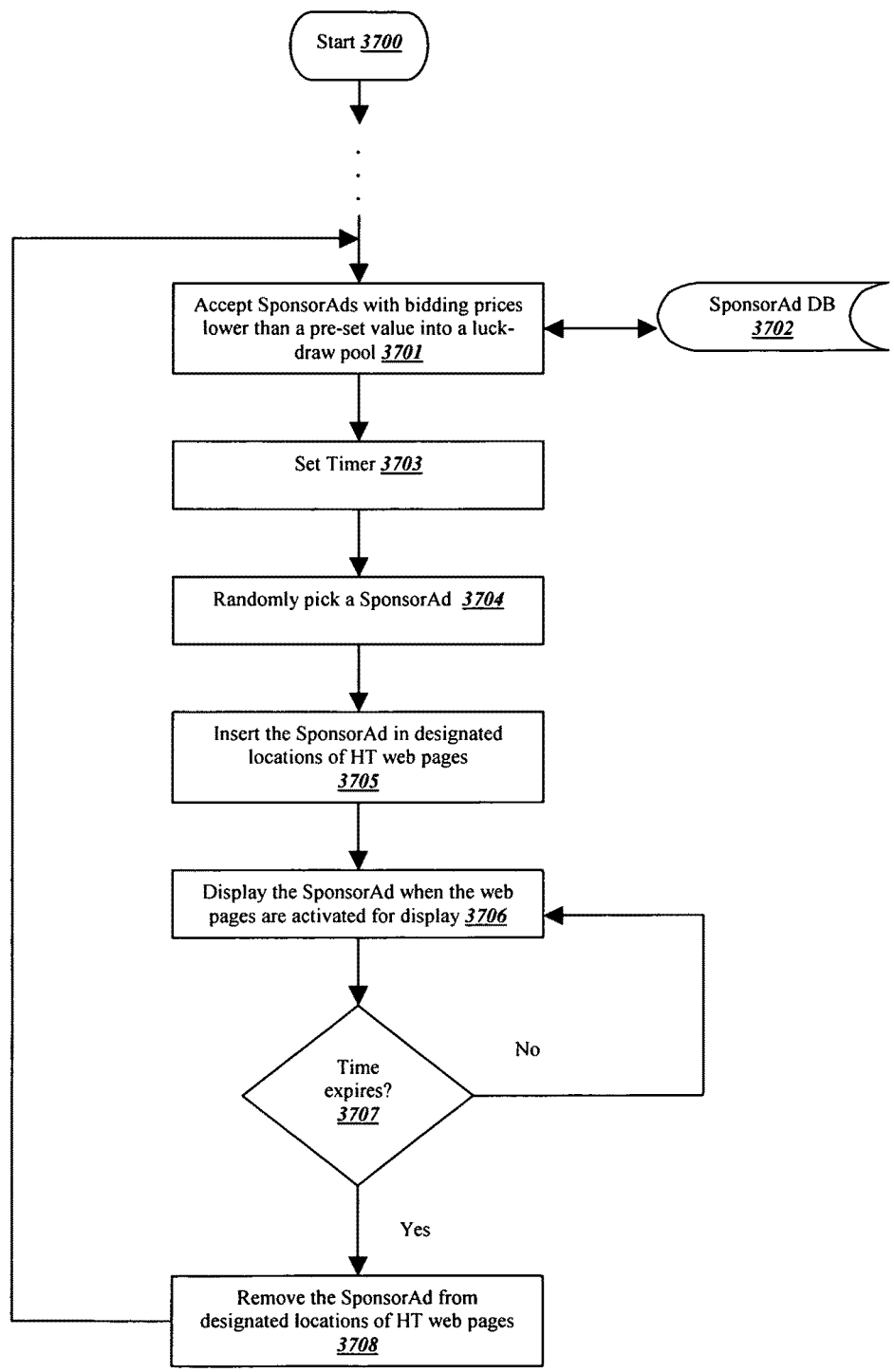
FIG. 37 is an exemplary illustration of a flow diagram depicting how the system luck-draws a low bidding SponsorAds for display during a pre-set time frame.

Referring to FIG. 37, therein is depicted a high-level logic flowchart illustrating how the system picks low-bidding price SponsorAds for luck-draw display. As indicated, the process starts at step 3700 and the system perform whatever it needs to do to arrive at step 3701 whereby the system accepts SponsorAds with bidding prices lower than a pre-set value into a luck-draw pool. Step 3702 shows the communication between the HotTerrain program and the SponsorAd Database(s) to enable the acceptance of lower bidding price SponsorAds into the luck-draw pool. Next, the system sets a timer at step 3703 (e.g., 15 minutes) and randomly picks a Sponsor Ad at step 3704.

Upon random selection, the system automatically inserts the SponsorAd in designated locations of HT web pages at steep 3705. For example, the designated locations can be the fifth advertisement locations of page 1 to 3 of a HT advertisement area, such as advertisement area 303 of FIG. 3. Whenever users activate web pages containing the inserted SponsorAd during the set time period, the system automatically displays the luckily drawn SponsorAd in the designated locations when displaying those web pages at step 3706.

Next, the system determines if the pre-set time has expired at step 3707. If not, the system keeps on displaying the luckily drawn SponsorAd in the designated locations whenever the web pages containing the SponsorAd are activated by users for display. When the time is up, the system automatically removes the SponsorAd from designated locations of the web pages where it was inserted before at step 3708. The process then goes back to step 3701 to create another luck-draw pool of low bidding SponsorAds and to randomly pick a lucky one. The process never ends because the luck-draw is on going.

Those skilled in the art would appreciate that the system can be programmed to avoid picking the same low-bidding SponsorAd repeatedly, so that more low-bidding SponsorAds can become luck-draw candidates. And also the SponsorAd luck-draw method can be applied to other types of online advertisements. This is to help small players to increase their online advertisement results without increasing their online advertisement expenses.

Figure 38:
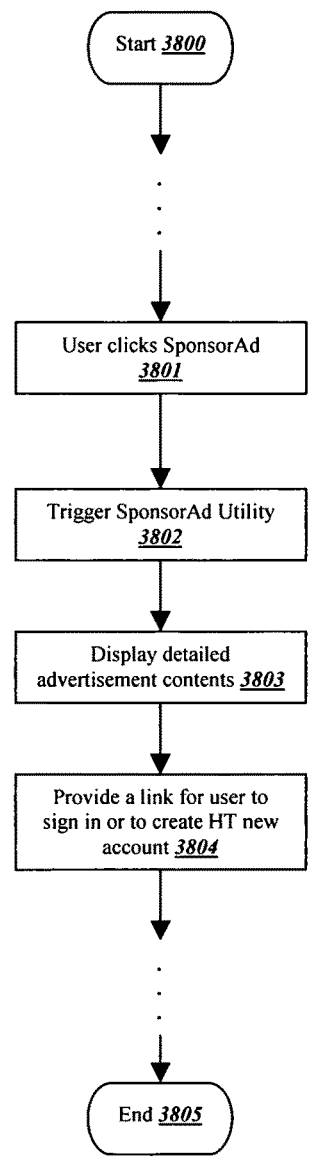
FIG. 38 is an exemplary illustration of a flow diagram depicting how the system response when a user clicks a SponsorAd outside of HotTerrain system.

With reference now to FIG. 38, therein is depicted an exemplary flow diagram depicting what a user can do when he clicks a SponsorAd outside of HotTerrain that has a link embedded in the SponsorAd to link to HotTerrain. As indicated, the process starts at step 3800 and the user does whatever he needs to do with his computer. Then, the user clicks a SponsorAd that's shown on a website outside of HotTerrain system (for example, he clicks the SponsorAd link in Google's webpage). Upon the user's clicking, a SponsorAd Utility is triggered at step 3802 to display the detailed advertisement contents of the SponsorAd at step 3803. The utility also triggers the display of a link for the user to sign in his HotTerrain account or to create an account if he is a new user at step 3804. The user then performs whatever he decides to do and the process ends at step 3805.

Figure 39:
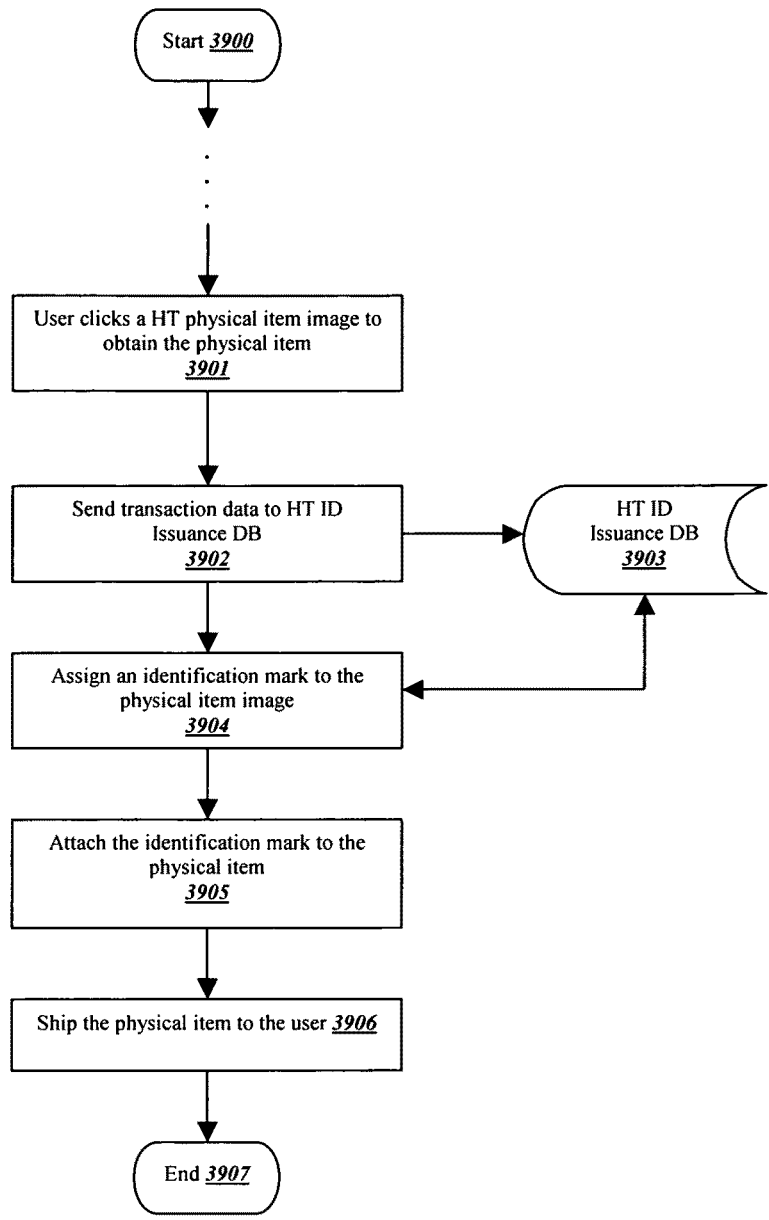
FIG. 39 is an exemplary illustration of a flow diagram depicting the process of issuing a physical item identification mark when a user clicks a HT physical item image to obtain the physical item.

Referring to FIG. 39, therein is depicted a high-level logic flowchart illustrating the process of issuing a physical item identification mark when a user clicks a physical item image displayed on HotTerrain to obtain the corresponding physical item. As indicated, the process starts at step 3900 and the user does whatever he needs to do with his computer. Then, the user clicks a HotTerrain physical item image to obtain the physical item at step 3901.

The physical item image means the image has an associated physical item. For example, some of the stamp album images may have associated physical stamp albums, and others may not. The purpose of issuing an identification mark is to authenticate and track the ownership of a physical item (especially a valuable one) to facilitate the future transfer of the physical item among HotTerrain members. Once the user completes the step at 3901 to obtain the physical item, such as paying by HT Money, PayPal or credit card, the system sends the transaction data to the HotTerrain ID Issuance Database(s) at step 3902. As shown, step 3903 indicates the sending of the transaction data from the HotTerrain system to the ID Issuance Database(s). The system then assigns an identification mark to the physical item image at step 3904 through the two-way communication with the HT ID Issuance Database(s).

The identification mark includes but not limited to number codes, bar codes, alphanumeric codes, certifications, etc. The identification data is also sent to the back office responsible for the physical shipment of the item whereby the identification mark is attached to the physical item at step 3905. Next, the physical item is shipped to the user at step 3906 and the process ends at step 3907.

Those skill in the art will appreciate that if a user does not obtain the physical item but decides to sell the image of the item (e.g., a unique design of a stamp album), the system will enable a buyer to find out that the image has an associated physical item that has not being purchased and the seller does not have the physical item and associated ID. Once the buyer purchases the image, he then has the option to obtain the physical item by using one of the various payment methods.

Now, referring to FIG. 40, therein is depicted an exemplary diagram illustrating the calculation of users' HotTerrain Scores. As indicated in area 4001, key factors for calculating a HT score include but are not limited to membership level (such as gold membership or 98% positive rating), size of the user's communities (number of people in the communities), available advertisement space in the user's community web pages whereby community members can view, available advertisement space in the user's HT Space (such as "Advertisements" area 303, 403, 509, 602, 709, 809, 904, 1008, 1113, 1211, 1313, 1413, 1508, 1605, 1710, 1814, 1908, 2007, 2114, 2220, 2305, 2410, 2506, 2607, and 2713, from FIG. 3 to FIG. 27), level of user activeness within HotTerrain and sister websites, and user's prior purchasing activities (e.g., can be measured based on dollar amount spent). The weight of each factor is then determined based how significant each factor contributes to the advertisers' consideration for sponsorship.

For example, advertisers may be particularly concerned about the size of the communities and the available advertisement space in the communities because these two factors largely determine the accessibility and viewability of the advertisers' SponsorAds; therefore, they are assigned with heavier weights. Those skilled in the art will appreciate that the weights indicated in block 4001 are for reference only; actual weights can be assigned based on market research and data analyses.

Area 4002 shows examples of calculation formulae for each key factor identified in 4001. For factor F1 (membership level), "r" represents the review or feedback rating a user receives. The score for factor 1 is equal to 0 when the rating is lower than 90%. If the rating is higher or equal to 90%, then the score is calculated by the formula as shown. For factor F2 (size of the community), assuming the maximum number (represented by Nmax) equals 1,000,000, and then the score for factor F2 is equal to 100 if the number of members in the user's communities is greater than or equals the maximum number. If the number of members is less than the Nmax, then the score is calculated by the formula as shown.

For factor F3 (available Ad space in the user's HT space) and factor F4 (available Ad space in the user's community web pages), scores are determined by the number of advertisements already on the web pages. For example, if the web pages of the user's communities does not have any SponsorAds, that presents the greatest advantage for the advertiser to place its SponsorAd on the top of the advertisement areas of the user's community web pages and receives the high traffic due to the location. Therefore, the score of 100 is awarded to factor F3 if there is no SponsorAd on the user's communities. The similar method applies to factor F4.

As indicated, the scores of factor 3 and 4 decrease when the number of Ads already on the web pages increases. When there are 5 or more ads already on the user's community web pages and the user's HT space, then it becomes very unattractive for advertisers to sponsor the user's activities because the advertisers' SponsorAds may be buried and requires viewers to page down or click next page to see the SponsorAds. Therefore, the score for such scenario is assigned a 0. Those skilled in the art will appreciate that the scores indicated in 4002 for factor F3 and factor F4 are for reference only, actual scores can be assigned based on market research and data analyses.

Factor F5 (level of activeness) and factor F6 (level of prior purchasing activities) in 4002 can be in the range from 0 to 100. For factor F5, any activities the user performs in HotTerrain and sister webs will increase the score, such as accessing the account, using different features, clicking functional buttons or links, printing things, buying things, donating things, etc. Each activity can be assigned a certain weight and the system automatically determines the user's level of activeness from a range of 0 to 100. For prior purchasing activities, a range of 0 to 100 can be assigned based on the total dollar amount spent. For example, a user gets 100 points if he has already spent $10,000 or more through HotTerrain.

Area 4003 demonstrates the calculation of HT scores for user A and user B. The calculation is executed based on the weights, formulas and method disclosed in area 4001 and 4002. User A receives a total score of 58.75 and user B receives 57.75. Advertisers can set their requirements for sponsorship when they set up their SponsorAds in HotTerrain, such as a minimum HT score of 50 or 55 is required for sponsorship. Such requirements can be changed by the advertisers at any time based on the requests for their sponsorships. In this particular example, both User A and User B are qualified for the sponsorship if they solicit or request it from the Advertisers. Their sponsorship includes incentives that the advertisers provide in the SponsorAd, such as free HT Money, e-Savers, Gift Certificates, Merchandise, etc.

Figure 41:
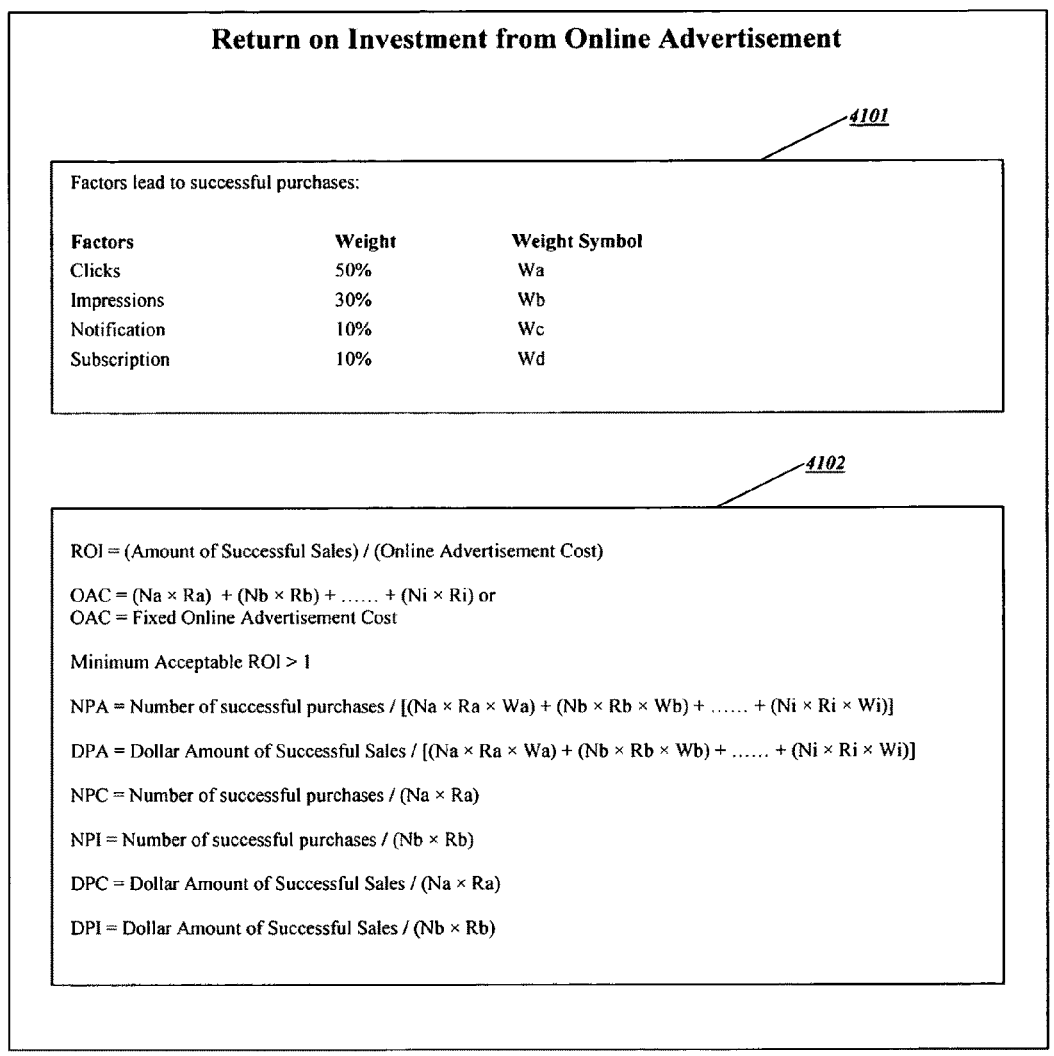
FIG. 41 is a diagram depicting exemplary calculations of advertisers' real Return of Investment (ROI) based on sales generated from the online advertisements.

With reference now to FIG. 41, therein is presented an exemplary diagram illustrating an exemplary calculation of advertisers' real Return On Investment (ROI) that is based on sales generated from the online advertisements, rather than on clicks and/or impressions. Our invention of the SponsorAd model calculates ROI based on dollars of sales generated per dollar of advertisement. Currently, the ratio of clicks per thousand impressions is relatively low because most users ignore online advertisements. Even among the clicks received for a particular advertisement, the clicks that lead to a successful sale is much lower when compared to the number of clicks received. The current calculation of ROI in prior arts that is based on the online advertisement actions from users (e.g., clicks, impressions, etc) does not reflect the true picture of the rate of return, as many, if not most of those actions, do not lead to purchasing activities.

Several ways of calculating ROI relating to sales generated from online advertisements are disclosed herewith. At any point of time, data related to the amount of successful sales generated from online advertisement and an advertiser's cost for a particular advertisement is obtainable from the online e-commerce and networking system. As shown on 4101, some key factors leading to successful purchases on websites include but are not limited to clicks, impressions, notification (through email, blog, announcement, etc), and subscription (user may be enticed to purchase a product listed in the online subscription contents). Weight for each factor is assigned as reference in 4101.

ROI can be represented as Dollar Amount of Successful Sales divided by Online Advertisement Cost (OAC) as indicated in 4102. The OAC can be calculated in several ways as shown in 4102. One way is used when the advertiser chooses to pay for online advertisements based on Na (number of clicks), Ra (rate/bidding price per click), Nb (number of 1000 impressions), Rb (rate/bidding price per thousand impressions), Ni (number of other actions), Ri (rate/bidding price per other action). Another way is used when the advertiser chooses to pay a fixed online advertisement fee. As indicated, advertisers can set their minimum acceptable ROI as greater than 1 because that means the real return on per dollar online advertisement is greater than 1 dollar.

Our present invention also provides other metrics, including, but not limited to number of successful purchases per advertisement dollar (NPA), dollar amount of successful purchases per advertisement dollar (DPA), number of purchases per click (NPC), number of purchases per thousand impressions (NPI), dollar of successful purchases per click (DPC), dollar of successful purchases per thousand impressions (DPI), etc. The formulae for calculating these ratios are demonstrated in 4102.

We claim:

1. A service computer system residing on at least one server, useful in an online advertising provider serving webpages offering sponsor advertisements:

said system including a sponsor advertising utility and RAM memory configured to run application programs, further comprising:

at least one processing unit;

at least one input device connected to said processing unit;

at least one display device connected to said processing unit;

at least one communication link connected to the Internet;

at least one database containing data connected to said processing unit, for each of a plurality of webpages associated with user accounts on said system, wherein said each webpage belongs to each of a plurality of users, wherein said each webpage displays at least one active link or button of an advertising object associated with an advertising opportunity of a selected one of a plurality of sponsors, wherein said system belongs to an advertising network capable of serving online advertisements, and wherein said each of a plurality of users, said selected sponsor and said advertising network are each independent parties with respect to one other;

said processing unit, responsive to instructions from said computer system and configured to:

automatically generate a plurality of sponsor advertisements upon receiving sponsor advertisement data from accounts associated with sponsors recorded in said database;

automatically transform traditional online advertisements into sponsor advertisements upon receiving incentive data from accounts associated with sponsors recorded in said database;

automatically transform online activity data associated with said users, including but not limited to membership level, size of communities, available advertisement space, level of activeness, and level of prior purchasing activities on said computer system and associated single sign-on web applications, into accumulated scores stored in accounts associated with said users;

automatically display said sponsor advertisements in sponsorship web pages of user accounts associated with said users upon said computer system determining accumulated scores stored in accounts associated with said users meet minimum score requirements stored in accounts associated with said sponsors;

automatically activate said sponsor advertisement utility to display sponsor advertisements of said system on external websites, wherein said utility automatically prompt external users to sign in or create new accounts to access said system upon detecting clicks on said sponsor advertisements on external websites by said utility; and automatically collect and weight sponsor advertisement data by said computer system to generate more effective online advertising measurements on a sponsor advertisement campaign, wherein said measurements utilizing successful purchase data collected further comprising tracking key factors leading to successful purchases, including but not limited to clicks, impressions, notifications and subscriptions, and successful sales data.

2. The service computer system of claim 1, (a) for improving Internet advertisement response rates and for transforming static online advertisements into user interactive online advertisements, said processing unit is further programmed to provide at least one of:

means for receiving solicitation or specific request of sponsorship input from accounts associated with users in said computer system;

means for displaying sponsor lists to a user upon said user searching sponsors by categories, sub-categories or by searching incentive key word(s); and (b) for combating phony clicks on online advertisements and for centralizing siloed and distributed user data, said processing unit is further programmed to provide at least one of: means for displaying sponsor lists based on the descending order of bidding price for said user to select item(s) of interest, wherein said sponsor list comprises sponsor advertisements with incentives;

means for automatically comparing accumulated score stored in an account associated with said user with minimum score requirements of said sponsors upon receiving requesting or soliciting sponsorship input from said account associated with said user in said computer system;

means for approving said sponsorships upon said user requesting said sponsorships, and providing associated incentives to said account associated with said user, whereby said accumulated score stored in said account associated with said user on said system meets said minimum score requirements stored in accounts associated with said sponsors; and means for displaying said sponsor advertisements associated with said sponsors on web pages of said account associated with said user in said computer system, wherein said web pages include single sign-on web application web pages of said account associated with said user, e- commerce web pages, social networking web pages and other web pages associated with said account in said computer system.

3. The service computer system of claim 1 for improving Internet advertisement response rates and for transforming static online advertisements into user interactive online advertisements, wherein said processing unit is further programmed to provide at least one of:

means for receiving data associated with setting up sponsor advertisements from accounts associated with entities within said system; means for receiving sponsorship solicitation or specific request data from accounts associated with said entities to accounts associated with sponsors;

means for granting sponsorships upon receiving approvals from accounts associated with said sponsors, wherein said sponsorships can be special promotional deals between at least one entity and one sponsor;

means for automatically sending reminders to accounts associated with said entities about approaching expiration of sponsor advertisements;

means for automatically displaying said reminders of expiring sponsor advertisements on account webpages associated with said entities within said system;

means for receiving data of sponsorship deals in accounts associated with said sponsor entities;

means for receiving data of excluding competitors as sponsorship partners in accounts associated with said sponsor entities within said system; and means for converting existing online advertisements with built-in incentives into sponsor advertisements from accounts associated with online publishers and advertising networks on said system.

4. The service computer system of claim 1 for improving Internet advertisement response rates and for transforming static online advertisements into user interactive online advertisements, wherein said process unit is-further programmed to provide at least one of:

means for automatically assigning sponsor advertisements upon receiving user solicitations or specific requests, wherein said sponsor advertisements are set with expiration time;

means for automatically sending reminders to accounts associated with said users about approaching expiration of sponsor advertisements;

means for automatically displaying said reminders of expiring sponsor advertisements on account webpages associated with said users within said system;

means for automatically renewing recurring sponsor advertisements to be re-displayed after expiration time upon receiving renewal input from accounts associated with said users within said system;

means for automatically displaying said sponsor advertisements on webpages associated with said users upon said utility receiving searching queries by categories, sub-categories, or by searching incentive key word(s) from said accounts associated with said users;

means for automatically matching incentive key word(s) to sponsor advertisements and automatically displaying said sponsor advertisements for selection wherein said matching key word(s) is found;

means for automatically listing said sponsor advertisements in the descending order of bidding price on webpages associated with said users;

means for automatically rotating sponsor advertisements with the same high bidding price to have equal chances of being displayed on prime advertisement locations of said system, wherein said prime advertisement locations are within webpages and community webpages associated with said users on said system;

means for automatically selecting low bidding price sponsor advertisements for display at designated locations of said system, wherein said designated locations may be part of said prime advertisement locations and said low bidding price sponsor advertisements are randomly selected to be displayed for a limited time frame; and means for displaying comments or ratings about said sponsor advertisements received from accounts associated with said users.

5. The service computer system of claim 1 for centralizing siloed and distributed user data and for improving Internet advertisement response rates, wherein said processing unit is further programmed to provide at least one of:

means for measuring accumulated score associated with said user on said system according to weighed factors, wherein said weighted factors include but are not limited to membership level, size of communities, available advertisement space in communities, available advertisement space in said account associated with said user within said system including single sign-on web application web pages, level of activeness, and level of prior purchasing activities to effectively centralize siloed and distributed user data among Internet websites and business computer systems;

means for measuring effectiveness of an entity's real return on investment on an online advertisement campaign associated with said entity on said system, wherein said measurement further comprising but not limited to setting calculated costs of said entity's advertisements according to cost per click, cost per thousand impression, cost per action, and cost per time period;

means for measuring effectiveness of said real return on investment using the number of successful purchases, or dollar amount of successful purchases in relation to various cost factors; and means for measuring effectiveness of an sponsor advertisement campaign associated with said entity through other metrics, including but not limited to number of successful purchases per advertisement dollar, dollar amount of successful purchases per advertisement dollar, number of purchases per click, number of purchases per thousand impressions, dollar of successful purchases per click, dollar of successful purchases per thousand impressions.

6. The service computer system of claim 1, wherein said system is any online e-commerce and networking system using different computer and human languages, and can be presented on any electronic display devices, including computers, laptops, netbooks, cell phones, hand-held devices, and the like; and wherein said sponsor advertising utility is activated, said system further comprising at least one of:
means for displaying favorite sponsors associated with said users and sponsorship history data associated with said users in user account webpages associated with said users; means for posting specific sponsorship requests received from user accounts associated with said users within said system;
means for matching specific sponsorship requests from user accounts associated with said user with sponsor offers to present matching result lists to said user account webpages associated with said users; and
means for automatically selecting qualified user accounts-for sponsorships, wherein said user accounts meet sponsorship criteria stored in accounts associated with said sponsors.

7. A method is disclosed, capable of serving webpages offering sponsor advertisements using a sponsor advertising utility residing in an online service computer system and using local devices accessing said online service computer system via at least one online service server:
said method comprising at least one of the steps of:
automatically generating a plurality of sponsor advertisements upon receiving sponsor advertisement data from accounts associated with sponsors on said computer system;
automatically transforming traditional online advertisements into sponsor advertisements upon receiving incentive data from accounts associated with sponsors on said computer system;
automatically transforming online activity data associated with said users, including but not limited to membership level, size of communities, available advertisement space, level of activeness, and level of prior purchasing activities on said computer system and associated single sign-on web applications, into accumulated scores stored in accounts associated with said users via said computer system that resides on said at least one online service server;
automatically displaying said sponsor advertisements in sponsorship web pages of user accounts associated with said users upon said online service computer system determining accumulated scores stored in accounts associated with said users meet minimum score requirement stored in accounts associated with said sponsors;
automatically activating said sponsor advertisement utility to display sponsor advertisements of said system on external websites, wherein said utility automatically prompting external users to sign in or create new accounts to access said system upon detecting clicks on said sponsor advertisements on external websites by said utility; and
automatically collecting and weighting sponsor advertisement data by said computer system to generate more effective online advertising measurements on a sponsor advertisement campaign, wherein said measurements utilizing successful purchase data collected further comprising tracking key factors leading to successful purchases, including but not limited to clicks, impressions, notifications and subscriptions, and successful sales data.

8. The method of claim 7, (a) for improving Internet advertisement response rates and for transforming static online advertisements into user interactive online advertisements, said method further comprising at least one of the steps of:
automatically receiving solicitation or specific request of sponsorship input from accounts associated with users in said computer system;
automatically displaying sponsor lists to a user upon said user searching sponsors by categories, sub-categories or by searching incentive key word(s); and
automatically displaying sponsor lists based on the descending order of bidding price for said user to select item(s) of interest, wherein said sponsor list comprises sponsor advertisements with incentives;
(b) for combating phony clicks on online advertisements and for centralizing siloed and distributed user data, said method further comprising at least one of the steps of:
automatically comparing accumulated score stored in an account associated with said user with minimum score requirements of said sponsors upon receiving requesting or soliciting sponsorship input from said account associated with said user in said computer system;
automatically approving said sponsorships upon said user requesting said sponsorships, and providing associated incentives to said account associated with said user, whereby said accumulated score stored in said account associated with said user on said system meets said minimum score requirements stored in accounts associated with said sponsors; and
automatically displaying said sponsor advertisements associated with said sponsors on web pages of said account associated with said user in said computer system, wherein said web pages include single sign-on web application web pages of said account associated with said user, e-commerce web pages, social networking web pages and other web pages associated with said account in said computer system.

9. The method of claim 7 for improving Internet advertisement response rates and for transforming static online advertisements into user interactive online advertisements, said method further comprising at least one of the steps of:
automatically receiving data associated with setting up sponsor advertisements from accounts associated with entities within said system;
automatically receiving sponsorship solicitation or specific request data from accounts associated with said entities to accounts associated with sponsors;
automatically granting sponsorships upon receiving approvals from accounts associated with said sponsors, wherein said sponsorships can be special promotional deals between at least one entity and one sponsor;
automatically sending reminders to accounts associated with said entities about approaching expiration of sponsor advertisements;
automatically displaying said reminders of expiring sponsor advertisements on account webpages associated with said entities within said system; automatically receiving data of sponsorship deals in accounts associated with said sponsor entities;

automatically receiving data of excluding competitors as sponsorship partners in accounts associated with said sponsor entities within said system; and automatically converting existing online advertisements with built-in incentives into sponsor advertisements from accounts associated with online publishers and advertising networks on said system.

10. The method of claim 7 for improving Internet advertisement response rates and for transforming static online advertisements into user interactive online advertisements, said method further comprising at least one of the steps of:

automatically assigning sponsor advertisements upon receiving user solicitations or specific requests, wherein said sponsor advertisements are set with expiration time; automatically sending reminders to accounts associated with said users about approaching expiration of sponsor advertisements; automatically displaying said reminders of expiring sponsor advertisements on account webpages associated with said users within said system; automatically renewing recurring sponsor advertisements to be re-displayed after expiration time upon receiving renewal input from accounts associated with said users within said system; automatically displaying said sponsor advertisements on webpages associated with said users upon said utility receiving searching queries by categories, sub-categories, or by searching incentive key word(s) from said accounts associated with said users; automatically matching incentive key word(s) to sponsor advertisements and automatically displaying said sponsor advertisements for selection wherein said matching key word(s) is found; automatically listing said sponsor advertisements in the descending order of bidding price on webpages associated with said users; automatically rotating sponsor advertisements with the same high bidding price to have equal chances of being displayed on prime advertisement locations of said system, wherein said prime advertisement locations are within webpages and community webpages associated with said users on said system; automatically selecting low bidding price sponsor advertisements for display at designated locations of said system, wherein said designated locations maybe part of said prime advertisement locations and said low bidding price sponsor advertisements are randomly selected to be displayed for a limited time frame; and automatically displaying comments or ratings about said sponsor advertisements received from accounts associated with said users.

11. The method of claim 7 for centralizing siloed and distributed user data and for improving Internet advertisement response rates, said method further comprising at least one of the steps of:

automatically measuring accumulated score associated with said user on said system according to weighed factors, wherein said weighted factors include but are not limited to membership level, size of communities, available advertisement space in communities, available advertisement space in said account associated with said user within said system including single sign-on web application web pages, level of activeness, and level of prior purchasing activities to effectively centralize siloed and distributed user data among Internet websites and business computer systems;

automatically measuring effectiveness of an entity's real return on investment on an online advertisement campaign associated with said entity on said system, wherein said measurement further comprising but not limited to setting calculated costs of said entity's advertisements according to cost per click, cost per thousand impression, cost per action, and cost per time period; automatically measuring effectiveness of said real return on investment using the number of successful purchases, or dollar amount of successful purchases in relation to various cost factors; and automatically measuring effectiveness of an sponsor advertisement campaign associated with said entity through other metrics, including but not limited to number of successful purchases per advertisement dollar, dollar amount of successful purchases per advertisement dollar, number of purchases per click, number of purchases per thousand impressions, dollar of successful purchases per click, dollar of successful purchases per thousand impressions.

12. The method of claim 7, wherein said system is any online e- commerce and networking system using different computer and human languages, and can be presented on any electronic display devices, including computers, laptops, netbooks, cell phones, hand-held devices, and the like; and wherein said sponsor advertising utility is activated, said method further comprising at least one of the steps of: automatically displaying favorite sponsors associated with said users and sponsorship history data associated with said users in user account webpages associated with said users; automatically posting specific sponsorship requests received from user accounts associated with said users within said system;

automatically matching specific sponsorship requests from user accounts associated with said user with sponsor offers to present matching result lists to said user account webpages associated with said users; and automatically selecting qualified user accounts for sponsorships, wherein said user accounts meet sponsorship criteria stored in accounts associated with said sponsors.

13. A computer program comprising a non-transitory computer readable storage medium for offering sponsor advertisement:

said computer program comprising computer-executable instructions stored thereon a service computer system, that when executed on a processor, perform at least one of the following steps:

automatically generating a plurality of sponsor advertisements upon receiving sponsor advertisement data from accounts associated with sponsors on said computer system;

automatically transforming traditional online advertisements into sponsor advertisements upon receiving incentive data from accounts associated with sponsors on said computer system;

automatically transforming online activity data associated with said users, including but not limited to membership level, size of communities, available advertisement space, level of activeness, and level of prior purchasing activities on said computer system and associated single sign-on web applications, into accumulated scores stored in accounts associated with said users;

automatically displaying said sponsor advertisements in sponsorship web pages of user accounts associated with said users upon said computer system determining accumulated scores stored in accounts associated with said users meet minimum score requirement stored in accounts associated with said sponsors;

automatically activating said sponsor advertisement utility to display sponsor advertisements of said system on external websites, wherein said utility automatically prompting external users to sign in or create new accounts to access said system upon detecting clicks on said sponsor advertisements on external websites by said utility; and automatically collecting and weighting sponsor advertisement data by said computer system to generate more effective online advertising measurements on a sponsor advertisement campaign, wherein said measurements utilizing successful purchase data collected further comprising tracking key factors leading to successful purchases, including but not limited to clicks, impressions, notifications and subscriptions, and successful sales data.

14. The computer program of claim 13 (a) for improving Internet advertisement response rates and for transforming static online advertisements into user interactive online advertisements, said computer program further comprising at least one of the steps of:

automatically receiving solicitation or specific request of sponsorship input from accounts associated with users in said computer system; automatically displaying sponsor lists to a user upon said user searching sponsors by categories, sub-categories or by searching incentive key word(s); and automatically displaying sponsor lists based on the descending order of bidding price for said user to select item(s) of interest, wherein said sponsor list comprises sponsor advertisements with incentives; (b) for combating phony clicks on online advertisements and for centralizing siloed and distributed user data, said computer program further comprising at least one of the steps of: automatically comparing accumulated score stored in an account associated with said user with minimum score requirements of said sponsors upon receiving requesting or soliciting sponsorship input from said account associated with said user in said computer system;

automatically approving said sponsorships upon said user requesting said sponsorships, and providing associated incentives to said account associated with said user, whereby said accumulated score stored in said account associated with said user on said system meets said minimum score requirements stored in accounts associated with said sponsors; and automatically displaying said sponsor advertisements associated with said sponsors on web pages of said account associated with said user in said computer system, wherein said web pages include single sign-on web application web pages of said account associated with said user, e-commerce web-pages, social networking web pages and other web pages associated with said account in said computer system.

15. The computer program of claim 13 for improving Internet advertisement response rates and for transforming static online advertisements into user interactive online advertisements, said computer program further comprising at least one of the steps of:

automatically receiving data associated with setting up sponsor advertisements from accounts associated with entities within said system; automatically receiving sponsorship solicitation or specific request data from accounts associated with said entities to accounts associated with sponsors; automatically granting sponsorships upon receiving approvals from accounts associated with said sponsors, wherein said sponsorships can be special promotional deals between at least one entity and one sponsor; automatically sending reminders to accounts associated with said entities about approaching expiration of sponsor advertisements; automatically displaying said reminders of expiring sponsor advertisements on account webpages associated with said entities within said system; automatically receiving data of sponsorship deals in accounts associated with said sponsor entities; automatically receiving data of excluding competitors as sponsorship partners in accounts associated with said sponsor entities within said system; and automatically converting existing online advertisements with built-in incentives into sponsor advertisements from accounts associated with online publishers and advertising networks on said system.

16. The computer program of claim 13 for improving Internet advertisement response rates and for transforming static online advertisements into user interactive online advertisements, said computer program further comprising at least one of the steps of:

automatically assigning sponsor advertisements upon receiving user solicitations or specific requests, wherein said sponsor advertisements are set with expiration time; automatically sending reminders to accounts associated with said users about approaching expiration of sponsor advertisements; automatically displaying said reminders of expiring sponsor advertisements on account webpages associated with said users within said system; automatically renewing recurring sponsor advertisements to be re-displayed after expiration time upon receiving renewal input from accounts associated with said users within said system; automatically displaying said sponsor advertisements on webpages associated with said users upon said utility receiving searching queries by categories, sub-categories, or by searching incentive key word(s) from said accounts associated with said users; automatically matching incentive key word(s) to sponsor advertisements and automatically displaying said sponsor advertisements for selection wherein said matching key word(s) is found; automatically listing said sponsor advertisements in the descending order of bidding price on webpages associated with said users; automatically rotating sponsor advertisements with the same high bidding price to have equal chances of being displayed on prime advertisement locations of said system, wherein said prime advertisement locations are within webpages and community webpages associated with said users on said system; automatically selecting low bidding price sponsor advertisements for display at designated locations of said system, wherein said designated locations maybe part of said prime advertisement locations and said low bidding price sponsor advertisements are randomly selected to be displayed for a limited time frame; and automatically displaying comments or ratings about said sponsor advertisements received from accounts associated with said users.

17. The computer program of claim 13 for centralizing siloed and distributed user data and for improving Internet advertisement response rates, said computer program further comprising at least one of the steps of:

automatically measuring accumulated score associated with said user on said system according to weighed factors, wherein said weighted factors include but are not limited to membership level, size of communities, available advertisement space in communities, available advertisement space in said account associated with said user within said system including single sign-on web application web pages, level of activeness, and level of prior purchasing activities to effectively centralize siloed and distributed user data among Internet websites and business computer systems; automatically measuring effectiveness of an entity's real return on investment on an online advertisement campaign associated with said entity on said system, wherein said measurement further comprising but not limited to setting calculated costs of said entity's advertisements according to cost per click, cost per thousand impression, cost per action, and cost per time period; automatically measuring effectiveness of said real return on investment using the number of successful purchases, or dollar amount of successful purchases in relation to various cost factors; and automatically measuring effectiveness of an sponsor advertisement campaign associated with said entity through other metrics, including but not limited to number of successful purchases per advertisement dollar, dollar amount of successful purchases per advertisement dollar, number of purchases per click, number of purchases per thousand impressions, dollar of successful purchases per click, dollar of successful purchases per thousand impressions.

18. The computer program of claim 13, wherein said system is any online e-commerce and networking system using different computer and human languages, and can be presented on any electronic display devices, including computers, laptops, netbooks, cell phones, hand-held devices, and the like; and wherein said sponsor advertising utility is activated, said computer program further comprising at least one of the steps of: automatically displaying favorite sponsors associated with said users and sponsorship history data associated with said users in user account webpages associated with said users; automatically posting specific sponsorship requests received from user accounts associated with said users within said system; automatically matching specific sponsorship requests from user accounts associated with said user with sponsor offers to present matching result lists to said user account webpages associated with said users; and automatically selecting qualified user accounts for sponsorships, wherein said user accounts meet sponsorship criteria stored in accounts associated with said sponsors.

* * * * *